(12) United States Patent
Takizawa et al.

(10) Patent No.: US 6,831,813 B2
(45) Date of Patent: Dec. 14, 2004

(54) DISC CARTRIDGE HAVING A DISC HOLDING PORTION AT A SHUTTER

(75) Inventors: Teruyuki Takizawa, Osaka (JP); Yoshito Sazi, Hyogo (JP); Kuniko Nakata, Osaka (JP); Hironori Okazawa, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/293,996

(22) Filed: Nov. 12, 2002

(65) Prior Publication Data

US 2003/0112741 A1 Jun. 19, 2003

Related U.S. Application Data

(63) Continuation of application No. PCT/JP02/00110, filed on Jan. 10, 2002.

(30) Foreign Application Priority Data

| Jan. 12, 2001 | (JP) | 2001-004661 |
| Jan. 22, 2001 | (JP) | 2001-012747 |
| Mar. 27, 2001 | (JP) | 2001-089497 |
| Jul. 6, 2001 | (JP) | 2001-205845 |
| Sep. 12, 2001 | (JP) | 2001-276284 |
| Nov. 9, 2001 | (JP) | 2001-344030 |
| Nov. 29, 2001 | (JP) | 2001-364438 |
| Nov. 29, 2001 | (JP) | 2001-364463 |

(51) Int. Cl.[7] .......................................... G11B 23/03
(52) U.S. Cl. ...................................... 360/133; 369/291
(58) Field of Search .......................... 360/133; 369/291

(56) References Cited

U.S. PATENT DOCUMENTS

| 4,773,061 A | 9/1988 | Stark et al. ............. 369/291 |
| 4,928,271 A | 5/1990 | Verhagen ................ 369/292 |

(List continued on next page.)

FOREIGN PATENT DOCUMENTS

| JP | 04-067486 A | 3/1992 |
| JP | 09-153264 A | 6/1997 |
| JP | 11-238335 A | 8/1999 |
| JP | 11-339424 A | 12/1999 |
| JP | 2000-048520 A | 2/2000 |
| JP | 2000-090628 A | 3/2000 |
| JP | 2000-113630 A | 4/2000 |
| JP | 2001-283558 A | 10/2001 |
| JP | 2003-178544 A | * 6/2003 |

OTHER PUBLICATIONS

U.S. patent application Ser. No. 10/188,233, Okazawa et al., pending.
U.S. patent application Ser. No. 10/289,963, Takizawa, et al., filed Nov. 7, 2002, pending.
U.S. patent application Ser. No. 10/293,994, Takizawa, et al., filed Nov. 13, 2002, pending.
U.S. patent application Ser. No. 10/292,549, Takizawa, et al., filed Nov. 12, 2002, pending.
U.S. patent application Ser. No. 10/292,570, Takizawa, et al., filed Nov. 11, 2002, pending.

Primary Examiner—Jefferson Evans
(74) Attorney, Agent, or Firm—Akin Gump Strauss Hauer & Feld, LLP

(57) ABSTRACT

A disc cartridge according to the present invention includes a cartridge body, a shutter and a disc holding portion. The cartridge body includes a disc storage portion, a chucking opening and a head opening. The disc storage portion stores a disc, having first and second sides, therein so that the disc is rotatable in the disc storage portion. The shutter is supported to, and movable with respect to, the cartridge body between the disc and the bottom of the disc storage portion so as to expose or cover the chucking opening and the head opening. The disc holding portion is provided at a portion of the shutter for fixing the disc onto the shutter or the cartridge body synchronously with a movement of the shutter, by pressing the disc toward the bottom of the disc storage portion when the shutter covers the chucking opening and the head opening.

13 Claims, 64 Drawing Sheets

U.S. PATENT DOCUMENTS

| | | | |
|---|---|---|---|
| 5,499,233 A | 3/1996 | Childers et al. | 369/291 |
| 5,991,261 A * | 11/1999 | Maeda et al. | 369/291 |
| 6,172,962 B1 | 1/2001 | Goto et al. | 369/291 |
| 6,377,538 B1 * | 4/2002 | d'Alayer de Costemore d'Arc | 369/291 |
| 6,463,028 B1 | 10/2002 | Koshiyouji | 369/291 |
| 6,463,029 B1 | 10/2002 | Nishino et al. | 369/291 |

* cited by examiner

DISC CARTRIDGE HAVING A DISC HOLDING PORTION AT A SHUTTER

This is a continuation of International Application PCT/JP02/00110 and international filing date of Jan. 10, 2002.

BACKGROUND OF THE INVENTION

1. Field of the Invention

The present invention relates to a disc cartridge for use to store a disk-shaped signal storage medium such as an optical disc or a magnetic disk therein in a rotatable state.

2. Description of the Related Art

Various disc cartridges have been proposed as protective cases for disk-shaped signal storage media.

For example, Japanese Laid-Open Publication No. 9-153264 discloses a disc cartridge in which a disk-shaped storage medium having a single or double signal recording sides (which will be herein referred to as a "disc" simply) is completely enclosed in a disc storage portion. The disc storage portion is defined inside a cartridge body that is made up of upper and lower halves. The cartridge body includes chucking openings and a head opening. The chucking openings allow the turntable of a spindle motor and a damper to chuck a disc inserted, while the head opening allows a head to read and/or write a signal from/on the disc. The lower one of the chucking openings is continuous with the head opening. Accordingly, while the operator carries such a cartridge, dust easily enters the inside of the cartridge through these openings and the disc is also easily soiled with finger marks. For that reason, the disc cartridge further includes a shutter for closing these openings up.

A disc cartridge having such a structure, however, has the following drawbacks. Firstly, such a disc cartridge cannot be so thin. This is because the disc storage space, defined between the upper and lower halves, should be thick enough to allow a disc drive to accurately read or write a signal (or information) from/onto the disc stored in such a disc cartridge. The reasons why the disc storage space should be relatively thick include the expected flutter or warp of the disc being rotated and an error that may occur in disposing the disc cartridge at a predetermined position inside the disc drive.

Secondly, the shutter for closing up these chucking and head openings at the same time cannot be formed at a low cost, thus increasing the overall manufacturing cost of such a disc cartridge. The reason is as follows. Specifically, the lower half of the disc cartridge is provided with an opening for the turntable of the spindle motor and a head opening, while the upper half thereof is provided with another opening for the clamper. Thus, to close these three openings up at a time, the shutter needs to be formed in a U-shape, which is not so cheap to make.

Thirdly, the disc stored inside such a disc cartridge is not fixed in many cases, thus possibly causing dust or fine particle deposition and scratching problems. Specifically, although a disc with a metal hub can be attracted and fixed in position via a magnetic force so as not to move inconstantly, an optical disc with no hub, e.g., a CD or a DVD, is normally not fixed, and movable freely, inside the disc cartridge. Accordingly, when the shutter of the disc cartridge is opened inside the disc drive, dust may enter the cartridge through its openings and be deposited on the disc easily. Also, if the disc is shaken so much as to contact with the inner walls of the disc cartridge, the signal recording side of the disc may get scratched or fine particles may be stirred up and deposited on the disc.

SUMMARY OF THE INVENTION

In order to overcome the problems described above, an object of the present invention is to provide a disc cartridge that has a reduced thickness and a simplified, much less expensive shutter for a single-sided disc, in particular. Another object of the present invention is to provide a disc cartridge that can drastically reduce the dust to be deposited on the disc stored therein by getting the disc firmly held inside the disc cartridge and eliminating the inconstant movement of the disc. A third object of the present invention is to provide a disc cartridge of a good design by displaying the label side of the disc stored therein.

A disc cartridge according to the present invention includes a cartridge body, a shutter and a disk holding member. The cartridge body includes: a disc storage portion that stores a disc, having first and second sides, therein so that the disc is rotatable in the disc storage portion and that the first side of the disc is exposed; a chucking opening that is formed on the bottom of the disc storage portion so as to get the disc chucked externally; and a head opening that is also formed on the bottom of the disc storage portion so as to allow a head, which reads and/or writes a signal from/on the second side of the disc, to access the second side of the disc. The shutter is supported to, and movable with respect to, the cartridge body so as to expose or cover at least the head opening. The disc holding member holds or releases the disc onto/from the cartridge body.

The disc holding member preferably holds the disc by pressing the second side of the disc against the bottom of the disc storage portion. Also, the disc holding member preferably brings at least the outer periphery and its surrounding portion of the second side of the disc into contact with the bottom of the disc storage portion.

In one embodiment, the disc cartridge includes a plurality of disc holding members, including the disc holding member. Each of the disc holding members is disposed so that a portion thereof is located on the outer periphery of the disc. At least two of the disc holding members may have the same shape. The disc holding members may be interlocked together to perform an operation of holding or releasing the disc.

In one embodiment, the disc holding member is an ellipsoidal ring made of an elastic material. The ring is deformable so as to have an inside diameter that is greater than the diameter of the disc.

The disc holding member preferably has a slope that contacts with the disc. Preferably, by disposing the disc holding member on the cartridge body so that the slope of the disc holding member overhangs the outer periphery of the disc, the slope is brought into contact with a side surface or edge of the disc, thereby gripping the disc thereon, pressing the disc against the bottom of the disc storage portion, and holding the disc thereon.

In one embodiment of the disc cartridge, the cartridge body includes a pair of positioning holes that engages with positioning pins. The positioning pins are provided for a disc drive to define an insert position when the disc cartridge is loaded into the disk drive.

In another embodiment of the disc cartridge, the disc cartridge body includes a concave portion that engages with a convex portion provided for a disk drive and that is used to prevent the disc cartridge from being inserted erroneously.

In another embodiment of the disc cartridge, the disc cartridge body includes a concave portion that engages with a convex portion provided for a disk drive when the disc cartridge is inserted into the disk drive.

While the disc cartridge is being loaded into, and fixed at the insert position inside, the disk drive, the disc holding member may release the disc that the disc holding member has held thereon.

Alternatively, as the positioning pins of the disk drive engage with the positioning holes of the disc cartridge, the disc holding member may release the disc that the disc holding member has held thereon.

As another alternative, as the convex portion that is provided for the disk drive to prevent the disc cartridge from being inserted erroneously engages with the concave portion provided for the disc cartridge, the disc holding member may release the disc that the disc holding member has held thereon.

As still another alternative, as the convex portion provided for the disk drive engages with the concave portion of the disc cartridge, the disc holding member may release the disc that the disc holding member has held thereon.

The disc cartridge may include a pair of disc holding members, each holding the disc thereon at two points. Each of the pair of disc holding members may engage with one of the pair of positioning pins provided for the disk drive, thereby performing the operation of holding or releasing the disc at the two points of the disc holding member substantially simultaneously.

The shutter may include a member that engages with the disc holding member so that the disc having been held is released as the shutter is going to be closed or opened.

The disc holding member may include a deformable elastic portion that has been molded so as to form an integral part of the cartridge body. The disc may be either held or released by deforming the elastic portion.

In one embodiment, the disc cartridge further includes a locking mechanism for fixing and supporting disc holding member onto the cartridge body while the disc holding member is holding the disc thereon.

In one embodiment of the disc cartridge, one of the disc holding members includes a locking mechanism for fixing and supporting the disc holding members onto the cartridge body while the disc holding members are holding the disc thereon.

In one embodiment of the disc cartridge, the disc holding member further includes a stopper portion for preventing the disc from dropping down from the storage portion of the disc cartridge when the disc holding member releases the disc.

In one embodiment, the head opening reaches a side surface of the cartridge body.

In one embodiment, the disc cartridge includes a protective layer for preventing the disc from getting scratched on the bottom of the disc storage portion that contacts with the second side of the disc. The protective layer is preferably selected from the group consisting of an anti-scratching nonwoven fabric, a dustproof nonwoven fabric, an anti-scratching coating layer and a dustproof coating layer.

In one embodiment, the disc cartridge further includes a brush or a dust wiping member on one side of the shutter that moves across the head opening when the shutter is opened or closed.

In one embodiment, the dirt of the disc is removed by rotating the disc while the disc is in contact with the protective layer that is provided on the bottom of the disc storage portion.

In one embodiment, the disc cartridge further includes a disc holding/interlocking member, which is stored inside the disc storage portion to synchronize opening or closing of the shutter with the holding or releasing operation by the disk holding member.

In one embodiment, the shutter is substantially in a fan shape and is held so as to rotate and slide around the chucking opening, and opening or closing of the shutter is synchronized with the holding or releasing operation by the disk holding member.

The disk holding member preferably holds the disc thereon by pressing at least the outer periphery and its surrounding portion of the second side of the disc against the bottom of the disc storage portion, the disc holding/interlocking member or the shutter.

In one embodiment, the disc cartridge includes a plurality of disc holding members, including the disc holding member. Each of the disc holding members is disposed so that a portion thereof is located on the outer periphery of the disc.

The disc holding member preferably has a slope that contacts with the disc. Preferably, by disposing the disc holding member on the cartridge body so that the slope of the disc holding member overhangs the outer periphery of the disc, the slope is brought into contact with a side surface or edge of the disc, thereby gripping the disc thereon, pressing the disc against the bottom of the disc storage portion and holding the disc thereon.

In one embodiment, the disc holding member includes an elastic portion that has been molded so as to form an integral part of the cartridge body and that is deformable in such a manner as to either hold or release the disc.

In one embodiment, the disc holding member further includes a stopper portion for preventing the disc from dropping down from the storage portion of the disc cartridge when the disc holding member releases the disc.

In one embodiment, when the shutter opens to expose the head opening, the disk holding member releases the disc.

In one embodiment, the disc holding/interlocking member is substantially in a fan shape.

In one embodiment, the disc storage portion includes: a first inner surface to be the bottom of the disc storage portion; and a second inner surface that is substantially in a cylindrical shape and that surrounds the outer periphery of the disc when the disc is stored in the disc storage portion.

In one embodiment, the shutter is provided outside of the disc cartridge.

In one embodiment, the shutter is provided on the bottom of the disc storage portion.

In one embodiment, the shutter exposes or covers the chucking opening.

In one embodiment, the number of the shutters is one.

Another disc cartridge according to the present invention includes a cartridge body and a shutter. The cartridge body includes: a disc storage portion that stores a disc, having first and second sides, therein so that the disc is rotatable in the disc storage portion; a chucking opening that is formed on the bottom of the disc storage portion so as to get the disc chucked externally; and a head opening that is also formed on the bottom of the disc storage portion so as to allow a head, which reads and/or writes a signal from/on the second side of the disc, to access the second side of the disc. The shutter is supported to, and movable with respect to, the cartridge body between the second side of the disc and the bottom of the disc storage portion so as to expose or cover the chucking opening and the head opening.

Still another disc cartridge according to the present invention includes a cartridge body, a shutter and a disk holding portion. The cartridge body includes: a disc storage portion that stores a disc, having first and second sides, therein so that the disc is rotatable in the disc storage portion; a chucking opening that is formed on the bottom of the disc storage portion so as to get the disc chucked externally; and a head opening that is also formed on the bottom of the disc storage portion so as to allow a head, which reads and/or writes a signal from/on the second side of the disc, to access the second side of the disc. The shutter is supported to, and movable with respect to, the cartridge body so as to expose or cover the chucking opening and the head opening. The disc holding portion fixes the disc onto the shutter or the cartridge body when the shutter covers the chucking opening and the head opening synchronously with opening or closing of the shutter.

In one embodiment, the disc storage portion includes: a first inner surface to be the bottom of the disc storage portion; a second inner surface that is substantially in a cylindrical shape and that surrounds the outer periphery of the disc when the disc is stored in the disc storage portion; and a disc window through which the disc is inserted or removed. The disc storage portion stores the disc therein so that one side of the disc is exposed inside the disc window.

In one embodiment of the disc cartridge, the shutter includes a disc holding portion for fixing the disc onto the shutter when the shutter covers the chucking opening and the head opening synchronously with opening or closing of the shutter.

In one embodiment, the disk holding portion is provided as a portion of the shutter.

In one embodiment, the disc cartridge includes multiple disk holding portions, which include the disk holding portion and which are disposed on the shutter so as to hold the outer periphery and its surrounding portion of the disc.

In one embodiment, the disc is brought into plane contact with the shutter by the disk holding portion.

In one embodiment, the disk holding portion has a downwardly tapered slope, grips the disc thereon by bringing the slope into contact with a side surface or an edge of the disc, and holds the disc with respect to the cartridge body by bringing the disc into plane contact with the shutter.

In one embodiment, the disc cartridge further includes a locking mechanism for fixing and supporting the shutter onto the cartridge body while the shutter covers the chucking opening and the head opening. The second inner surface is preferably partially notched so as not to interfere with the operation of the shutter.

In one embodiment of the disc cartridge, the cartridge body includes a shutter storage portion that stores a portion of the shutter therein while the shutter exposes the chucking opening and the head opening.

In one embodiment, the disc cartridge further includes multiple stopper portions that protrude toward the disc window to prevent the disc from dropping down through the disc window. The stopper portions may move in a thickness direction of the disc cartridge as the shutter is going to be opened or closed.

In one embodiment, the disc cartridge may include a plurality of shutters, including the shutter. The plurality of shutters may cooperate with each other to expose or cover the chucking opening and the head opening.

In one embodiment, one of the shutters is provided with a locking mechanism that fixes the shutters onto the cartridge body while the shutters are covering the chucking opening and the head opening.

In one embodiment, the shutters cover the chucking opening and the head opening by partially overlapping with each other in a thickness direction of the shutters.

In one embodiment, the disc cartridge includes an erroneous insertion preventing mechanism for the disc cartridge.

In one embodiment, the head opening reaches a side surface of the cartridge body.

In one embodiment, the shutters rotate on multiple rotation shafts that are provided on the disc cartridge body. The rotation shafts are preferably provided in respective portions of the disc cartridge body other than the disc storage portion. Also, the head opening may reach a side surface of the cartridge body, and the rotation shafts may be provided near another side surface thereof that is opposed to the former side surface.

In one embodiment, the shutters include interlocking portions that open or close the shutters while being interlocked with each other. The interlocking portions may be cam-shaped or gear-shaped portions that are provided for the respective shutters. Alternatively, the interlocking portions may also be belts or links.

In one embodiment, the disc cartridge further includes an elastic member that applies a force in such a manner as to keep the shutters opened or closed. The elastic member is preferably provided in a portion of the disc cartridge body other than the disc storage portion. The elastic member may have been molded so as to form an integral part of the shutter.

In one embodiment, the stopper members may be removable and may have been molded so as to form integral parts of the cartridge body.

In one embodiment, the stopper members are provided so as to be removable from the cartridge body.

In one embodiment, the disc cartridge includes a protective layer for preventing the disc from getting scratched on a portion of the shutter that contacts with the second side of the disc. The protective layer is preferably selected from the group consisting of an anti-scratching nonwoven fabric, a dustproof nonwoven fabric, an anti-scratching coating layer and a dustproof coating layer.

In one embodiment, the dirt of the disc is removed by rotating the disc while the disc is in plane contact with the shutter. Alternatively, the dirt of the disc may also be removed by the opening or closing operation that is performed by the shutter to expose or cover the chucking opening and the head opening.

In one embodiment, the erroneous insertion preventing mechanism includes convex portions or concave portions that are provided on outer side surfaces of the cartridge body so as to be asymmetrically disposed in a direction in which the disc cartridge is inserted into an external apparatus.

In one embodiment, the locking mechanism includes: a locking hole that is formed through the disc cartridge body; and a locking protrusion portion that is provided for the shutter so as to engage with the locking hole when the shutter is located at such a position as to cover the chucking opening and the head opening.

In one embodiment, the locking protrusion portion is provided for the shutter by way of an elastic member and the elastic member applies a force to the locking protrusion portion toward the locking hole and makes the locking protrusion portion engage with the locking hole.

In one embodiment, the locking mechanism includes: a locking hole that is formed through the disc cartridge body; a locking protrusion portion that is provided so as to engage with the locking hole when the shutter is located at such a position as to cover the chucking opening and the head opening; a locking lever provided for the disc cartridge body; a first convex portion or first concave portion that is formed on the locking lever; and a second concave portion or second convex portion that is formed on the shutter so as to engage with the first convex portion or first concave portion at the covering position.

The locking lever may be provided for the disc cartridge body by way of an elastic member. The elastic member may apply a force to the locking protrusion portion toward the locking hole to make the locking protrusion portion engage with the locking hole. The elastic member may also apply a force to the first convex portion or first concave portion toward the second concave portion or second convex portion to make the first convex portion or first concave portion engage with the second concave portion or second convex portion. Also, the locking protrusion portion and the elastic member may have been molded so as to form integral parts of the shutter. Alternatively, the locking lever and the elastic member may have been molded so as to form integral parts of the disc cartridge body.

In one embodiment, the shutter includes a convex portion that is provided for the shutter so as to protrude into a center hole of the disc while the shutter is keeping plane contact with the disc and covering the chucking opening and the head opening. As the shutter is going to be opened, the convex portion lifts the disc in a thickness direction of the cartridge while contacting with the lower surface of the disc, thereby getting the disc and the shutter out of plane contact from each other.

In one embodiment, the disc cartridge includes a plurality of shutters, including the shutter. Each of the shutters includes a convex portion that is provided for the shutter so as to protrude into a center hole of the disc while the shutters are keeping plane contact with the disc and covering the chucking opening and the head opening. As the shutters are going to be opened, the convex portions lift the disc in a thickness direction of the cartridge while contacting with the lower surface of the disc, thereby getting the disc and the shutters out of plane contact from each other.

The convex portion may have a shape that is selected from the group consisting of a spherical shape, a conical shape, a ring shape and a shape made up of multiple spheres.

In one embodiment, the stopper members form integral parts of the shutter. The stopper members may be formed integrally with the shutter by way of flexible members or elastic members. Each of the stopper members may include a convex portion or a concave portion. An inner sidewall or an inner upper wall of the cartridge body may include a guide concave portion or a guide convex portion that engages with the convex portion or the concave portion of the stopper member. The stopper members may move in the thickness direction of the disc cartridge as the shutter is going to be opened or closed.

In one embodiment, the stopper members form integral parts of the cartridge body. The stopper members may be formed integrally with the cartridge body by way of elastic members. Each of the stopper members may be an elastic member that is obtained by separating a portion of the cartridge body via a slit. Each of the stopper members may include a first convex portion or a first sloped portion while the shutter may include a second sloped portion or a second convex portion. The first convex portion and the second sloped portion or the first sloped portion and the second convex portion may contact with each other.

Also, when the shutter exposes the chucking opening and the head opening, the first convex portion and the second sloped portion or the first sloped portion and the second convex portion may contact with each other.

A concave portion, which engages with the second convex portion or the first convex portion, may be provided near the first sloped portion or the second sloped portion.

In one embodiment, the stopper members hold the disc onto the cartridge body by pressing the disc in the thickness direction thereof and bringing the disc into plane contact with the shutter while the shutter covers the chucking opening and the head opening.

In one embodiment, an opening/closing lever for use to open or close the shutters and a locking mechanism for use to fix and support the shutters to the cartridge body when the shutters are located in such a position as to cover the chucking opening and the head opening are provided for two different ones of the shutters.

Still another disc cartridge according to the present invention includes a cartridge body, a shutter and a disc holding portion. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The shutter is supported, and movable with respect to the cartridge body, between the second side of the disc and the bottom of the disc storage portion so as to expose or cover the chucking and head openings, and defines a hole in a region corresponding to a center hole of the disc while the shutter is closed. The disc holding portion is provided for the shutter, presses the disc against the shutter, and holds the disc thereon while the chucking and head openings are covered with the shutter.

In one embodiment, the hole of the shutter has a diameter that is approximately equal to that of the center hole of the disc.

Yet another disc cartridge according to the present invention includes a cartridge body, a shutter, a disc holding portion and a rim. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The shutter is supported, and movable with respect to the cartridge body, between the second side of the disc and the bottom of the disc storage portion so as to expose or cover the chucking and head openings. The disc holding portion is provided for the shutter, presses the disc against the shutter, and holds the disc thereon while the chucking and head openings are covered with the shutter. The rim extends from an inner side surface of the disc storage portion toward the center of the disc and contacts with an outer edge portion of the disc while the shutter is closed.

In one embodiment, the shutter defines a hole in an area corresponding to a center hole of the disc while the shutter is closed. The rim may contact with the second side of the disc. The cartridge body may have a gap between the rim and the inner lower surface of the disc storage portion so that a portion of the shutter is stored in the gap while the chucking and head openings are exposed by the shutter.

In one embodiment, the disc cartridge further includes a convex portion around the hole of the shutter. The convex portion contacts with the second side of the disc while the chucking and head openings are covered with the shutter.

In one embodiment, the shutter includes a convex portion that closes a gap between the second side of the disc and the shutter while the shutter is closed. The convex portion may be located closer to the center of the disc storage portion than the rim is while the chucking and head openings are exposed by the shutter. The convex portion may be a protective layer that prevents the disc from getting scratched.

In one embodiment, a protective layer is provided on the rim to prevent the disc from getting scratched. The protective layer may be selected from the group consisting of an anti-scratching nonwoven fabric, a dustproof nonwoven fabric, an anti-scratching coating layer and a dustproof coating layer.

In one embodiment, the convex portion forms an integral part of the shutter.

Yet another disc cartridge according to the present invention includes a cartridge body, a pair of shutters and a disc holding portion. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portion is provided for the shutters, presses the disc against the shutters, and holds the disc thereon while the chucking and head openings are covered with the shutters. The head opening reaches a side surface of the cartridge body. An operating portion for use to open and close the shutters is provided for the shutters and is located inside the head opening.

Yet another disc cartridge according to the present invention includes a cartridge body, a pair of shutters and a disc holding portion. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portion is provided for the shutters, presses the disc against the shutters, and holds the disc thereon while the chucking and head openings are covered with the shutters. The shutters have first and second pairs of contact surfaces. Each pair of contact surfaces contacts with each other. The first and second pairs are not aligned with each other.

In one embodiment, the contact surfaces of each of the first and second pairs are sloped, and overlap with each other, in a thickness direction of the disc.

Yet another disc cartridge according to the present invention includes a cartridge body, a pair of shutters and a number of disc holding portions. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. At least one of the disc holding portions is movable toward the center of the disc storage portion with respect to one of the shutters.

Yet another disc cartridge according to the present invention includes a cartridge body, a pair of shutters, a number of disc holding portions and a number of stopper members. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters. Each of the disc holding portions has a downwardly tapered slope that presses the disc against the shutters and holds the disc thereon while the chucking and head openings are covered with the shutters. Each of the stopper members has a disc contact surface that prevents the disc from dropping down from the disc storage portion and provided for the cartridge body to protrude over the disc. A portion of the slope of each of the disc holding portions is located over the contact surface of each of the stopper members.

In one embodiment, the pair of shutters is locked together while closed.

In one embodiment, the disc cartridge further includes a shutter contact portion that regulates the positions of the shutters being closed.

Yet another disc cartridge according to the present invention includes a cartridge body, a pair of shutters and a number of disc holding portions. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. Each of the disc holding portions includes a first portion with a first height and a second portion with a second height that is lower than the first height. An upper surface of the cartridge body has a recessed portion to receive the top of the first portion of each disc holding portion that moves as the shutters are going to be opened or closed. The recessed portion is thinner than another portion of the upper surface of the cartridge body under which the second portion of the disc holding portion moves.

In one embodiment, as the shutters are going to be closed, the first portion contacts with the disc earlier than the second portion.

Yet another disc cartridge according to the present invention includes a cartridge body, a pair of shutters, a number of disc holding portions and a stopper member. The cartridge body includes a disc storage portion, a chucking opening and a head opening. The disc storage portion stores a disc, having first and second sides, therein so that the disc is rotatable in the disc storage portion and that the first side of the disc is exposed. The disc storage portion also has a disc window through which the disc is inserted or removed into/from the disc storage portion. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. The stopper member is secured to the cartridge body so as to be movable between a state of protruding into the disc window and a state of not protruding into the disc window.

In one embodiment, the stopper member is movable on a plane that is parallel to the upper surface of the cartridge body. The stopper member may be rotatable on the upper surface of the cartridge body.

Yet another disc cartridge according to the present invention includes a cartridge body, a pair of shutters, a number of disc holding portions and a disc receiving portion. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. The disc receiving portion is provided along the inner circumference of an inner lower surface of the disc storage portion so as to contact with an outer edge portion of the second side of the disc that is being held while the shutters are closed.

In one embodiment, at least a part of the disc receiving portion is parallel to the inner lower surface of the disc storage portion and contacts with the other side of the disc. The disc receiving portion may be a taper that is provided between an inner side surface and the inner lower surface of the disc storage portion. While the shutters are closed and the disc is held, the outer edge of the disc may be in contact with the disc receiving portion.

Yet another disc cartridge according to the present invention includes a cartridge body, a pair of shutters and a number of disc holding portions. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. An inner lower surface of the disc storage portion includes first regions, through which respective bottoms of the disc holding portions pass while the shutters are going to be opened or closed. The first regions are recessed.

Yet another disc cartridge according to the present invention includes a cartridge body, a pair of shutters and a number of disc holding portions. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. An inner lower surface of the disc storage portion includes second regions that are located in the vicinity of the outer periphery of the shutters while the shutters are closed. The second regions are recessed.

Yet another disc cartridge according to the present invention includes a cartridge body, a pair of shutters and a number of disc holding portions. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. An inner lower surface of the disc storage portion includes third regions that are located around the chucking and head openings and/or near an inner side surface of the disc storage portion. The third regions are recessed.

Yet another disc cartridge according to the present invention includes a cartridge body, a shutter, a number of disc holding portions and first and second operating portions. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The shutter is supported, and movable with respect to the cartridge body, between the second side of the disc and the bottom of the disc storage portion so as to expose or cover the chucking and head openings. The disc holding portions are provided for the shutter, press the disc against the shutter and hold the disc thereon while the chucking and head openings are covered with the shutter. The first and second operating portions are used to open and close the shutter.

In one embodiment, the first and second operating portions are respectively provided for first and second side surfaces of the cartridge body. The first and second side surfaces may be adjacent to each other. The first operating portion may be a protrusion that is connected to the shutter, and the shutter may be opened or closed by sliding the first operating portion along a portion of the first side surface. Also, the second operating portion may be a rotational member that is engaged with the shutter. Then, the shutter may be opened or closed by rotating the second operating portion. Alternatively, the second operating portion may also be a sliding link member that is engaged with the shutter. Then, the shutter may be opened or closed by sliding the second operating portion along the second side surface.

In one example, the second operating portion may also be a belt member that is connected to the shutter. Then, the shutter may be opened or closed by sliding the second operating portion along the second side surface.

In one example, the disc cartridge includes a pair of shutters, including the shutter. The first and second operating portions may be connected to, or engaged with, the pair of shutters, respectively.

Yet another disc cartridge according to the present invention includes a cartridge body, a pair of shutters, a number of disc holding portions and a rotation stopper member. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. The rotation stopper member is provided for at least one of the disc holding portions to prevent the disc from rotating while the shutters are closed.

In one example, the rotation stopper member is made of a material having a large coefficient of friction and is provided for the at least one of the disc holding portions so as to contact with the disc while the shutters are closed.

In one example, the rotation stopper member is made of rubber.

Yet another disc cartridge according to the present invention includes a cartridge body, a pair of shutters, a number of disc holding portions and at least one stopper member. The cartridge body includes a disc storage portion, a chucking opening and a head opening. The disc storage portion has a disc window and stores a disc, having first and second sides, therein so that the disc is rotatable in the disc storage portion and that the first side of the disc is exposed inside the disc disc window. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holding portions are provided for the shutters, press the disc against the shutters, and hold the disc thereon while the chucking and head openings are covered with the shutters. The at least one stopper member is provided for the cartridge body so as to protrude at least partially into the disc window. The head opening reaches a side surface of the cartridge body. An operating portion for use to open and close the shutters is provided for the shutters and is located inside the head opening.

In one example, the shutters have first and second pairs of contact surfaces, each pair contacting with each other. The first and second pairs are not aligned with each other. The contact surfaces of each of the first and second pairs may be sloped, and overlap with each other, in a thickness direction of the disc. In the first pair of contact surfaces, the contact surface of one of the two shutters may be located over the contact surface of the other shutter. In the second pair of contact surfaces on the other hand, the contact surface of the one shutter may be located under the contact surface of the other shutter. While closed, the shutters may define a hole in a region corresponding to a center hole of the disc. Specifically, the hole defined by the shutters may have a diameter that is approximately equal to that of the center hole of the disc.

In one example, the disc holding portions are provided at two ends of the shutters, and each of the disc holding portions has a downwardly tapered slope. At least one of the disc holding portions may be provided so as to be movable toward the center of the disc.

In one example, each of the disc holding portions includes a first portion with a first height and a second portion with a second height that is lower than the first height. An upper surface of the cartridge body has a recessed portion to receive the top of the first portion of each of the disc holding portions that moves as the shutters are going to be opened or closed. The recessed portion is thinner than another portion of the upper surface of the cartridge body under which the second portion of each of the disc holding portions moves.

As the shutters are going to be closed, the first portion may contact with the disc earlier than the second portion.

In one example, the stopper member has a contact surface that contacts with the disc 100. A portion of the slope of at least one of the disc holding portions is located over the contact surface of the stopper member.

In one example, the shutters rotate on a pair of rotation shafts that are provided for the disc cartridge body. The shutters may include interlocking portions that interlock with each other to open or close the shutters. The disc cartridge may further include an elastic member that applies a force to the shutters to keep the shutters closed.

DETAILED DESCRIPTION OF PREFERRED EMBODIMENTS

Embodiment 1

Figure 1:
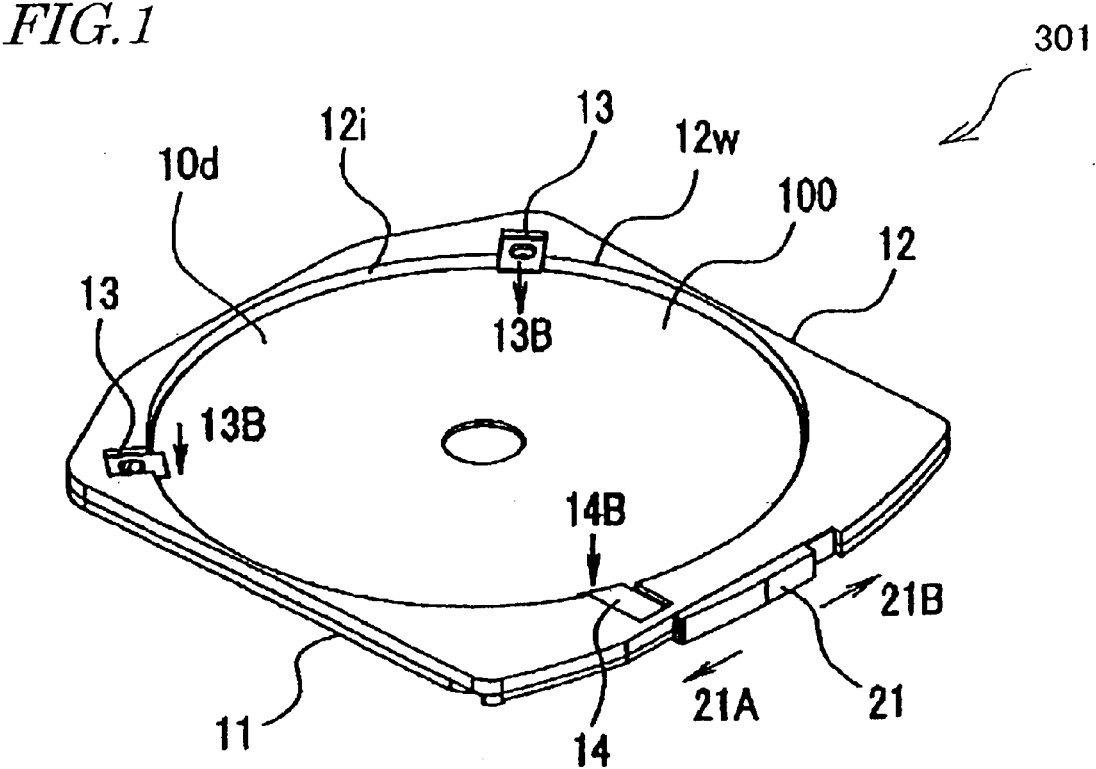
FIG. 1 is a perspective view illustrating an overall configuration for a disc cartridge according to a first embodiment of the present invention.
Figure 2:
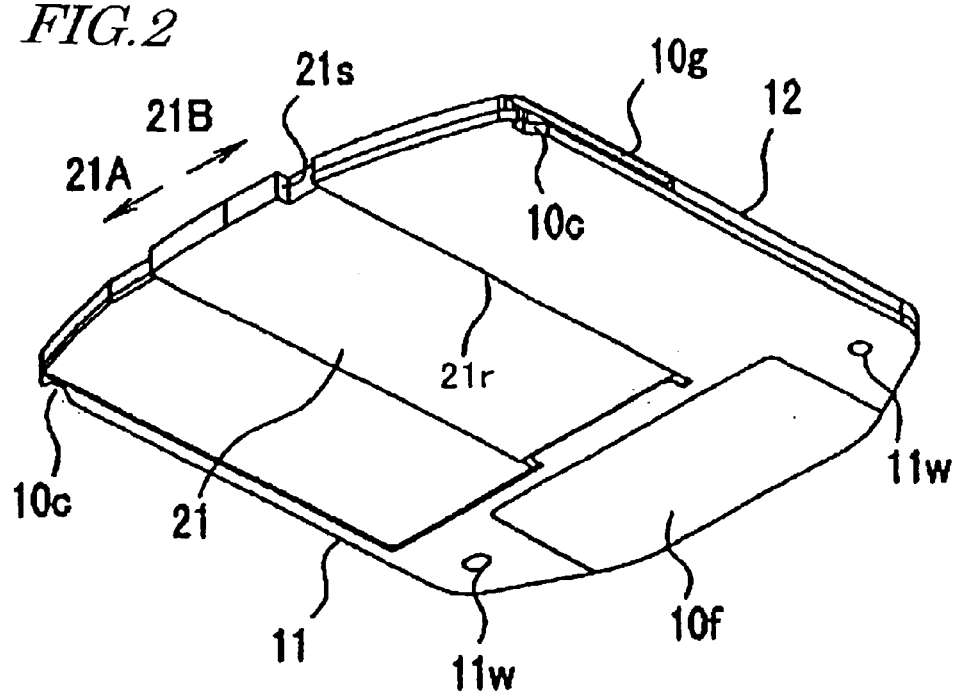
FIG. 2 is a perspective view of the disc cartridge, shown in FIG. 1 as viewed from below it.
Figure 3:
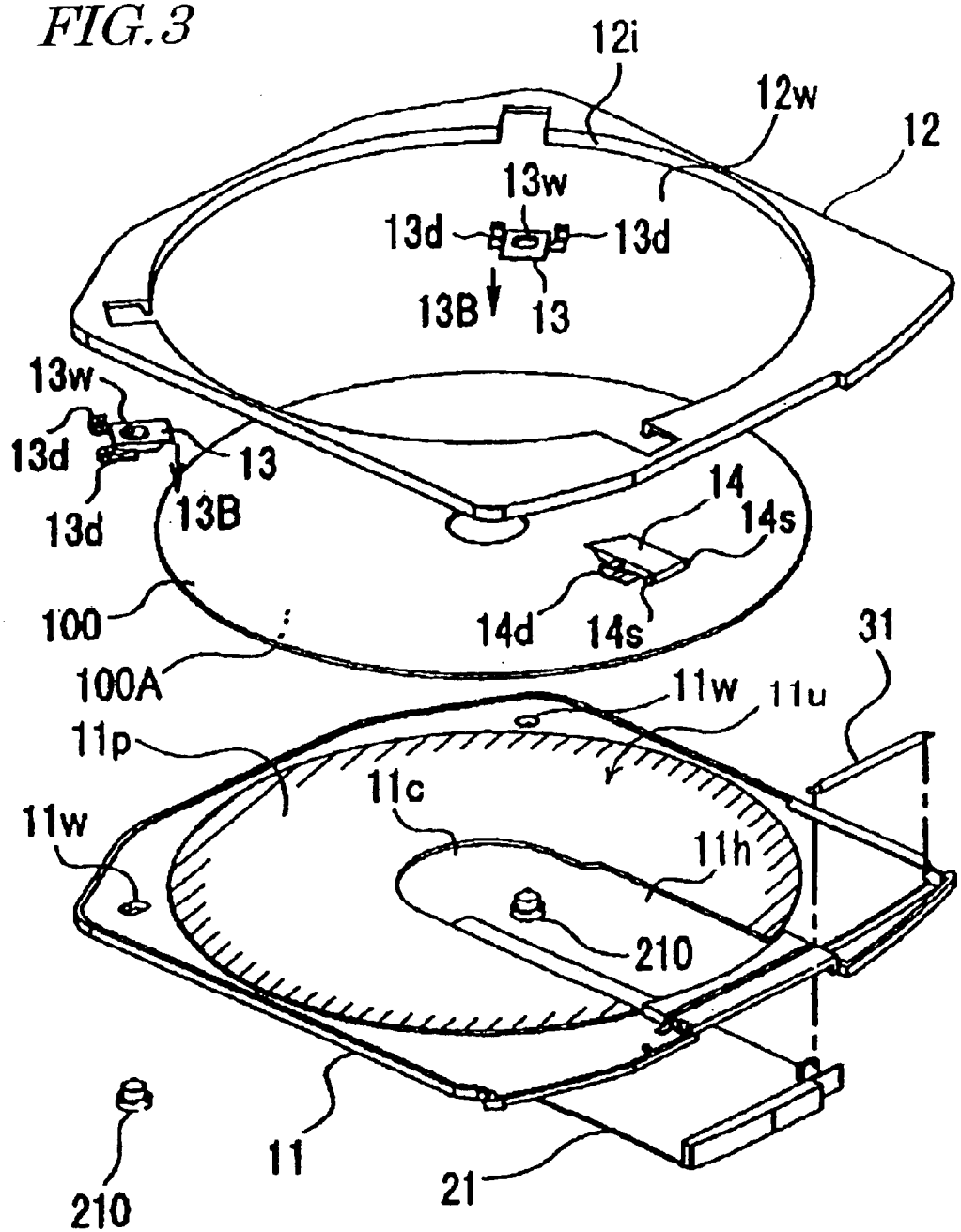
FIG. 3 is an exploded perspective view illustrating an exploded state of the disc cartridge shown in FIG. 1.

Hereinafter, a disc cartridge 301 according to a first embodiment of the present invention will be described with reference to FIGS. 1, 2 and 3. FIG. 1 is a perspective view illustrating an overall configuration of the disc cartridge 301, including a disc 100 stored, as viewed from above the cartridge 301. FIG. 2 is a perspective view of the disc cartridge 301 as viewed from below the cartridge 301. FIG. 3 is an exploded perspective view illustrating respective parts of the disc cartridge 301.

The disc 100 includes first and second sides. The first side of the disc 100, on which its label, for example, is normally printed, is illustrated in FIG. 1, while the second side of the disc 100, i.e., the signal recording side 100A, is illustrated as the back surface in FIG. 3.

As shown in FIG. 1, the disc cartridge 301 includes a cartridge lower shell 11, a cartridge upper shell 12, disc holding members 13, 14 and a shutter 21.

As shown in FIG. 3, the cartridge lower shell 11 includes a chucking opening 11c and a head opening 11h. The chucking opening 11c is provided to allow a chucking member (e.g., a spindle motor for rotating the disc 100) to enter the disc cartridge 301 externally. The head opening 11h is provided to allow a head, which reads and/or writes a signal from/on the signal recording side 100A of the disc 100, to enter the disc cartridge 301 and access the signal recording side 100A. The cartridge lower shell 11 also includes two positioning holes 11w, which engage with cartridge positioning pins 210 of a disc drive, thereby defining the position of the disc cartridge 301 with respect to the disc drive. The cartridge lower shell 11 faces the signal recording side 100A of the disc 100.

The cartridge upper shell 12 includes a circular disc window 12w, through which the disc 100 can be introduced and removed into/from the disc cartridge 301 and which expands over the entire projection area of the disc 100 to expose the upper surface of the disc 100. The cartridge upper and lower shells 12 and 11 are adhered or welded together at their outer periphery, thereby forming a cartridge body 10.

A disc storage portion 10d for storing the disc 100 therein (see FIG. 1) is defined by a first inner surface 11u of the cartridge lower shell 11 and a second inner surface 12i of the cartridge upper shell 12. The first inner surface 11u is opposed to the signal recording side 100A of the disc 100, while the second inner surface 12i has a substantially cylindrical shape and defines the disc window 12w inside. That is to say, the first inner surface 11u becomes the bottom of the disc storage portion 10d. The first inner surface 11u of the cartridge lower shell 11 is provided with a protective layer 11p for the purpose of preventing the disc 100 from getting scratched or any dust from reaching the signal recording side 100A.

The protective layer 11p may be appropriately selected from the group consisting of an anti-scratching nonwoven fabric, a dustproof nonwoven fabric, an anti-scratching coating layer and a dustproof coating layer. In this embodiment, a sheet of a dustproof nonwoven fabric is adhered or ultrasonic welded as the protective layer 11p.

In the disc storage portion 10d, a gap, which is wide enough to allow the disc 100 to rotate freely, is provided between the second inner surface 12i and the disc 100. Also, the top of the disc storage portion 10d is the disc window 12w so that the disc 100 stored in the disc storage portion 10d has one side thereof exposed inside the disc window 12w.

As shown in FIG. 3, the disc cartridge 301 includes two disc holding members 13 of the same shape. Each of the disc holding members 13 includes a pair of elastic portions 13d and a hole portion 13w that runs obliquely through the disc holding member 13. When the elastic portions 13d of the disc holding members 13 are sandwiched between the cartridge upper and lower shells 12 and 11, an elastic force is applied to the respective ends of the disc holding members 13 in the direction indicated by the arrows 13B in FIG. 3. As a result, the disc 100 is pressed against the first inner surface 11u. Also, these two disc holding members 13 are disposed so that the hole portions 13w thereof are located substantially over the positioning holes 11w.

The disc holding member 14 includes a rotation shaft 14s and two elastic portions 14d. The disc holding member 14 is secured to the cartridge body 10 so as to rotate on the rotation shaft 14s. When the elastic portions 14d are sandwiched between the cartridge upper and lower shells 12 and 11, an elastic force is applied to the respective ends of the disc holding member 14 in the direction indicated by the arrow 14B. As a result, the disc 100 is pressed against the first inner surface 11u.

The shutter 21 is externally fitted with the cartridge lower shell 11 so as to face the signal recording side 100A of the disc 100. As shown in FIGS. 1 and 2, when the shutter is moved in the direction indicated by the arrow 21A or 21B, the chucking opening 11c and the head opening 11h are exposed or covered. A shutter spring 31 is extended between the shutter 21 and the cartridge body 10 to apply an elastic force to the shutter 21 in such a direction as to close the shutter 21.

As shown in FIG. 2, a label plane or concave portion 10f, on which the contents that have been written on the disc 100 being stored can be noted down, is provided on the surface of the cartridge body 10 (i.e., the cartridge lower shell 11). Also, a pair of concave portions 10c, provided on the right- and left-hand sides of the cartridge body 10, may be used as either pull-in notches or positioning recesses when the disc cartridge 301 is pulled in and loaded into a disk drive or when the disc cartridge 301 is stored in a changer. Another concave portion 10g, provided on just one side, has such a shape as to prevent erroneous insertion of the disc cartridge 301. That is to say, this concave portion 10g is just fitted with a convex portion provided for the disc drive only when the disc cartridge 301 is inserted in the correct direction. Suppose the disc cartridge 301 is being inserted into the disc drive upside down or the wrong way round by mistake. In that case, these concave and convex portions are never fitted with each other and the disc cartridge 301 cannot be inserted thereto correctly. In this manner, the erroneous insertion can be prevented.

Figure 4:
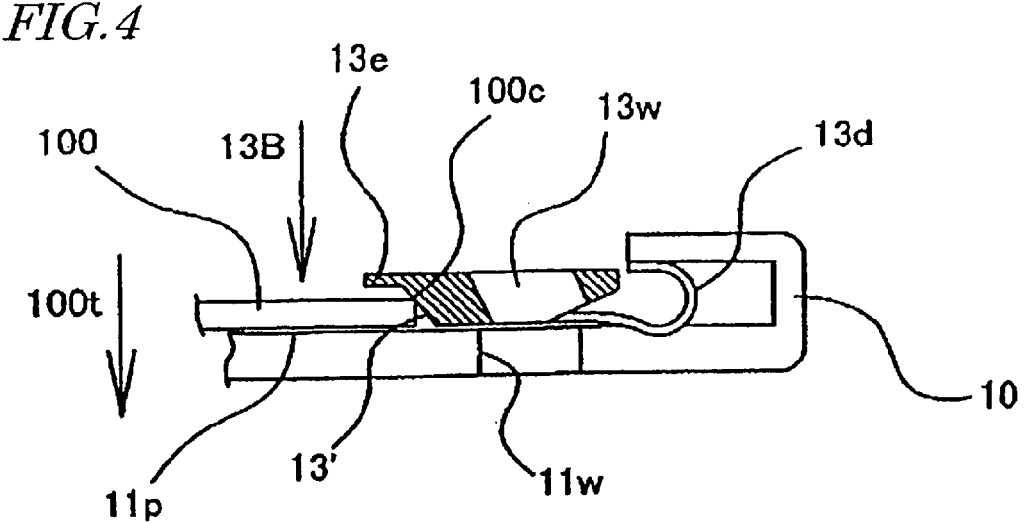
FIG. 4 is a cross-sectional view illustrating a disc holding member and a surrounding portion of the disc cartridge shown in FIG. 1.
Figure 5:
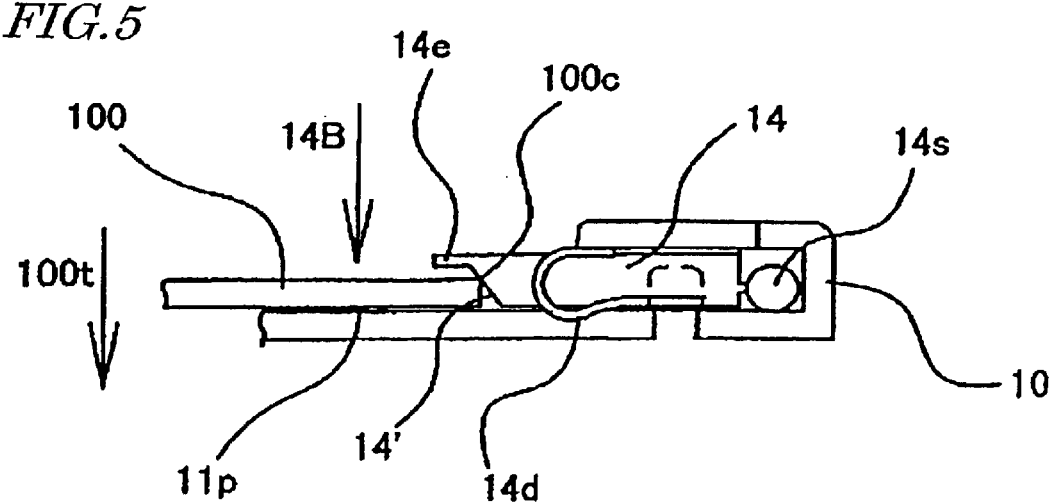
FIG. 5 is a cross-sectional view illustrating another disc holding member and a surrounding portion of the disc cartridge shown in FIG. 1.

Next, it will be described in further detail with reference to FIGS. 4 and 5 how the disc holding members 13 and 14 hold the disc 100 thereon. FIG. 4 is a cross-sectional view of the disc holding member 13 in a state where the disc 100 has been mounted thereon as shown in FIGS. 1 through 3, while FIG. 5 is a cross-sectional view of the disc holding member 14 in the state where the disc 100 has been mounted thereon. FIGS. 4 and 5 are both taken in a disc radial direction.

As shown in FIGS. 4 and 5, the disc holding members 13 and 14 include slopes 13' and 14', which overhang a portion of the projection area of the disc 100 (i.e., over the outer periphery of the disc 100), at the respective ends thereof. An elastic force is applied from the elastic portions 13d or 14d to the disc holding member 13 or 14 in the direction indicated by the arrow 13B or 14B. In that situation, the slope 13' or 14' contacts with the outer edge 100c of the disc 100, thereby gripping the disc 100 thereon and pressing the disc 100 in a thickness direction 100t thereof. As a result, the signal recording side 100A is brought into plane contact with the sheet 11p. In this manner, the disc 100 is held and fixed inside the cartridge body 10. In this state, the outer periphery of the signal recording side 100A of the disc 100 keeps a close contact with the sheet 11p. Thus, no dust will be deposited on the signal recording side 100A.

Next, it will be described in detail with reference to FIGS. 6, 7 and 8 how the disc 100 is released from the disc holding members 13 and 14.

Figure 6:
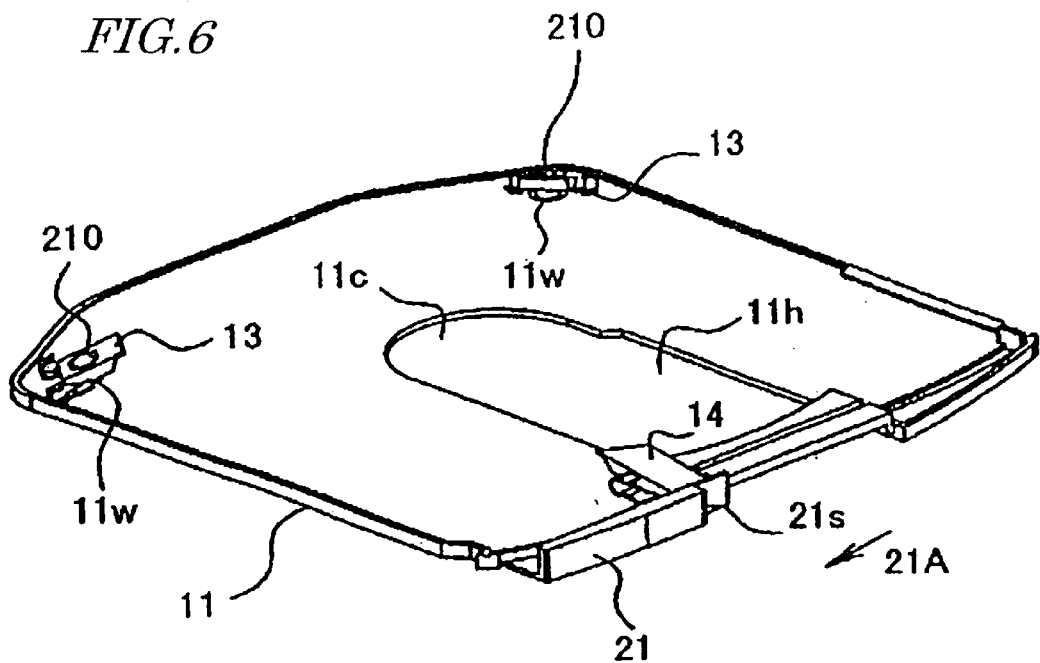
FIG. 6 is a perspective view illustrating a state of the disc cartridge shown in FIG. 1 in which its shutter is opened and positioning pins have been inserted.

FIG. 6 is a perspective view illustrating the disc cartridge with the cartridge upper shell 12 and the disc 100 removed therefrom. As shown in FIG. 6, the shutter 21 has its L-shaped portion 21s pressed by a shutter opening mechanism (not shown) of the disc drive in the direction indicated by the arrow 21A. As a result, the chucking opening 11c and the head opening 11h are now exposed. Also, the pair of cartridge positioning pins 210 of the disc drive is engaged with the positioning holes 11w of the cartridge body 10.

Figure 7:
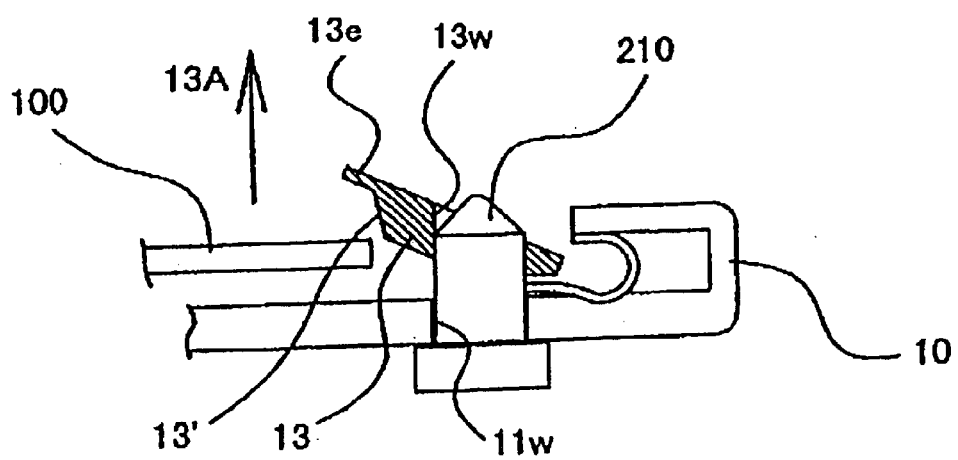
FIG. 7 is a cross-sectional view illustrating the disc holding member and its surrounding portion shown in FIG. 6.

FIG. 7 is a cross-sectional view of the disc holding member 13 in the state shown in FIG. 6 and is taken in a disc radial direction. FIG. 8 is an enlarged view illustrating the main parts, or the disc holding member 14 and the shutter 21 in the state shown in FIG. 6.

As shown in FIG. 7, when the cartridge positioning pin 210 of the disc drive is inserted into the positioning hole 11w, the cartridge positioning pin 210 engages with the obliquely running hole portion 13w of the disc holding member 13. As a result, the disc holding member 13 is lifted in the direction 13A, and the disc 100 is released from the grip of the slope 13' and is now freely rotatable. At this point in time, the rim 13e at the end of the disc holding member 13 still overhangs a portion of the projection area of the disc (i.e., the outer periphery thereof). Accordingly, even if the disc 100 is released in a disk drive that is so constructed as to mount the disc 100 vertically, the disc 100 will not drop down from the disc cartridge 301.

Figure 8:
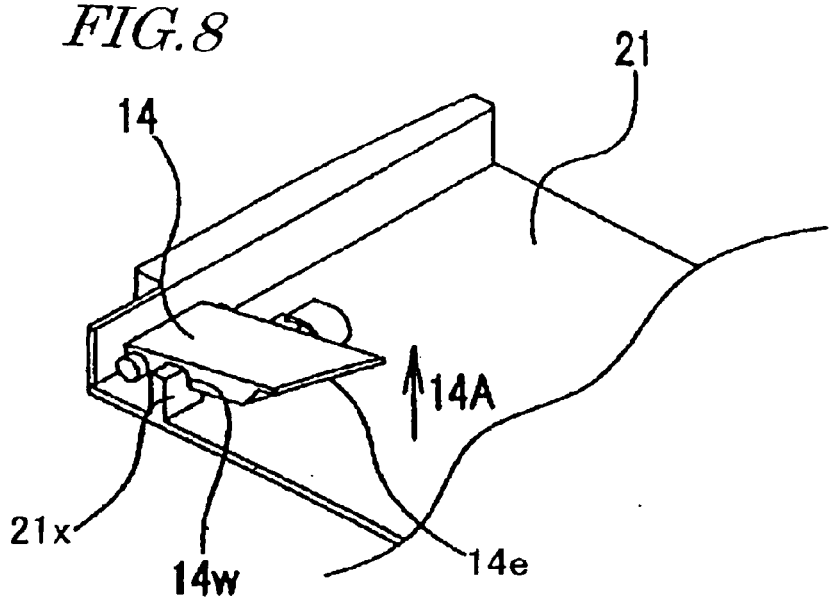
FIG. 8 is a perspective view illustrating the disc holding member and its surrounding portion shown in FIG. 6.

On the other hand, when the shutter 21 is opened, a guide rib 21x provided on the shutter 21 enters a concave portion 14w of the disc holding member 14, thereby lifting the ceiling of the concave portion 14w as shown in FIG. 8. As a result, the disc holding member 14 is lifted to the direction 14A and the disc 100 is released from the grip of the slope 14' and becomes freely rotatable. At this point in time, the rim 14e at the end of the disc holding member 14 still overhangs a portion of the projection area of the disc (i.e., the outer periphery thereof). Accordingly, even if the disc is released in a disk drive that is so constructed as to mount the disc 100 vertically, the disc 100 will not drop down from the disc cartridge 301.

Also, to remove the disc intentionally, the operator must release the disc from the three disc holding members 13 and 14 at the same time. Accordingly, it is possible to prevent the operator from removing the disc accidentally.

In this embodiment, the end 21r of the shutter 21, which is opposed to the disc 100, may be provided with a brush or a dust cleaning member as shown in FIG. 2 so that dust is removed from the signal recording side 100A of the disc 100 every time the shutter 21 is opened and closed. Optionally, the disc cartridge 301 may further include a locking mechanism for fixing and supporting the disc holding members onto the cartridge body 10 when the disc is held.

Embodiment 2

Figure 9:
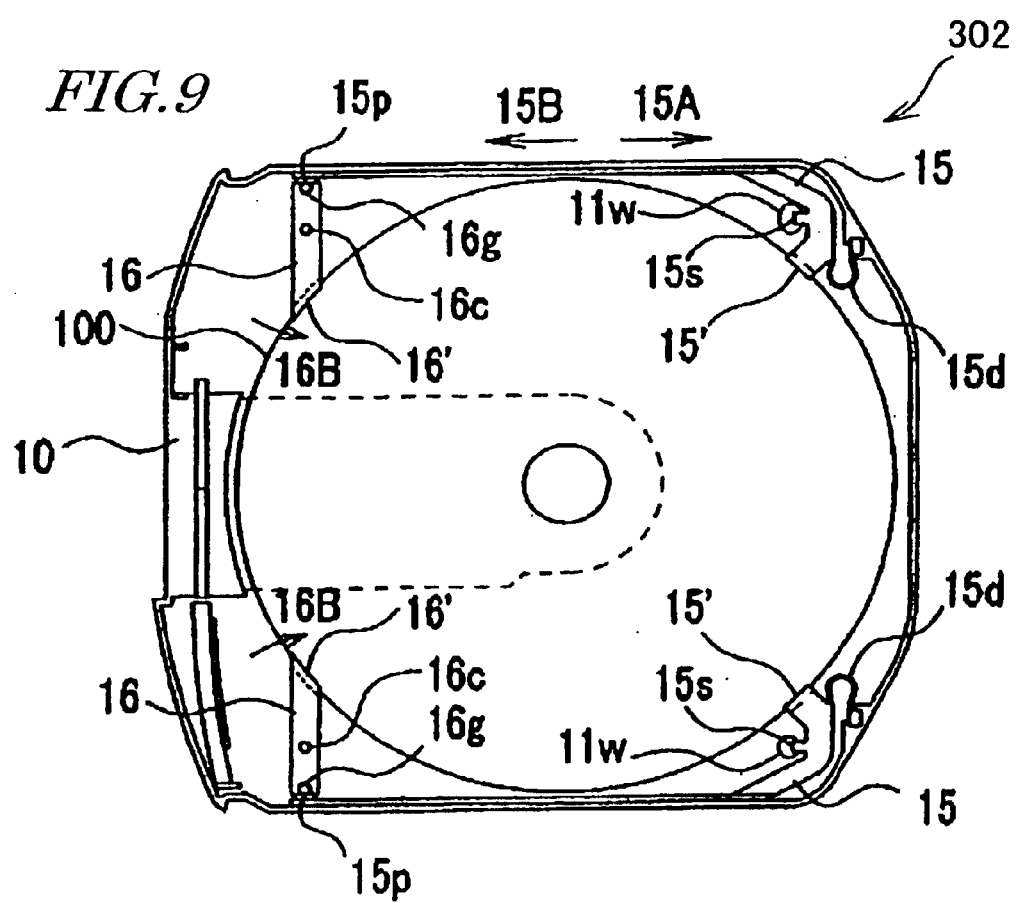
FIG. 9 is a plan view illustrating an overall configuration for a disc cartridge according to a second embodiment of the present invention.
Figure 10:
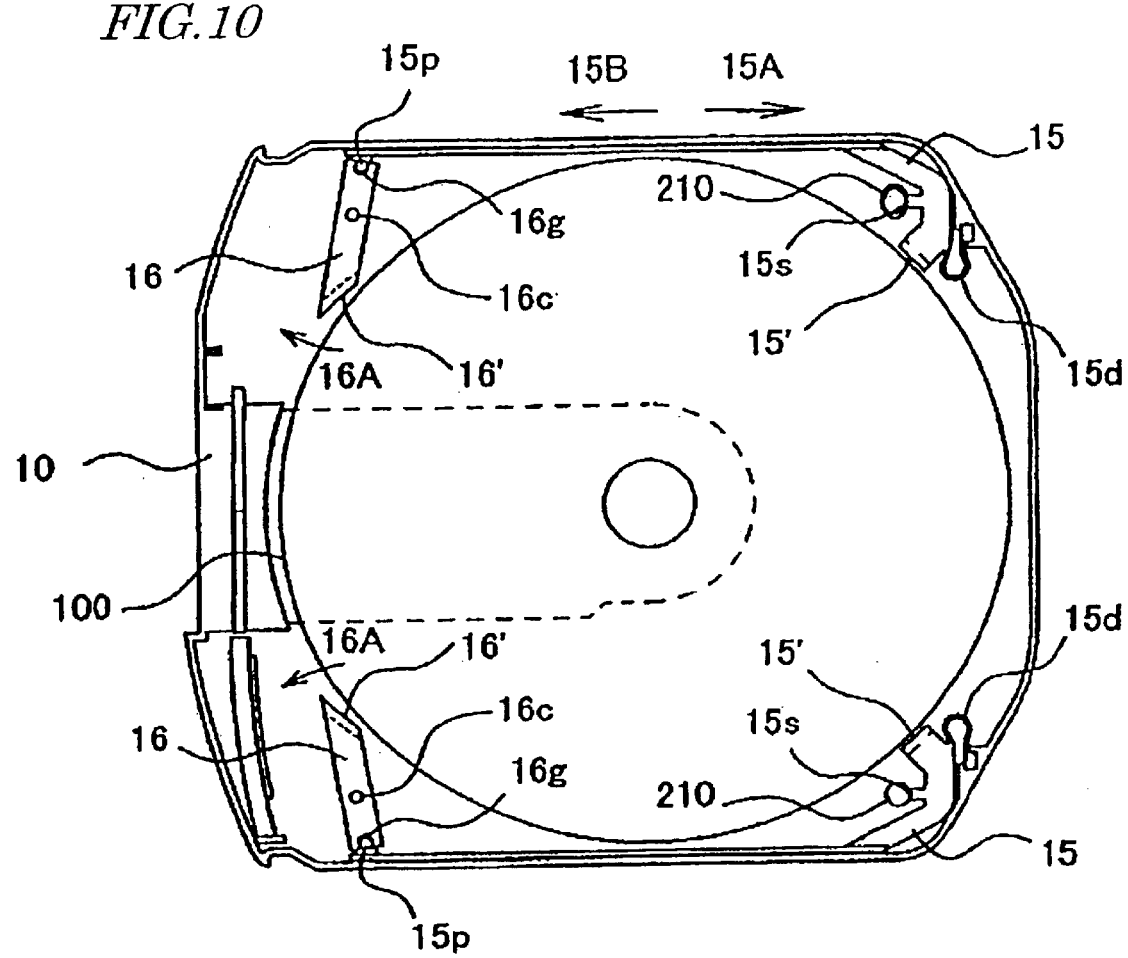
FIG. 10 is a plan view illustrating a state of the disc cartridge shown in FIG. 9 in which the disc has been released.

Hereinafter, a disc cartridge 302 according to a second embodiment of the present invention will be described with reference to FIGS. 9 and 10. Specifically, FIG. 9 is plan view illustrating an overall configuration for the disc cartridge 302 in which the disc 100 is held. FIG. 10 is a plan view illustrating an overall configuration for the disc cartridge 302 in which the disc 100 has been released. In FIGS. 9 and 10, each member equivalent to the counterpart of the first embodiment described above is identified by the same reference numeral and the description thereof will be omitted herein.

The disc cartridge 302 is different from the disc cartridge 301 of the first embodiment in the disc holding members. Specifically, the disc cartridge 302 includes two pairs of disc holding members 15 and 16, which slide in the direction indicated by the arrow 15A or 15B, as shown in FIG. 9.

Each of the disc holding members 15 includes an elastic portion 15d, which applies an elastic force to the disc holding member 15 in the direction indicated by the arrow 15B. Just like the disc holding members 13 and 14 of the first embodiment, a slope 15' provided at the end thereof holds and fixes the disc 100 onto the cartridge body 10.

Each of the disc holding members 16 includes a rotation shaft 16c. That is to say, the disc holding member 16 is provided for the cartridge body 10 so as to rotate on its rotation shaft 16c. Just like the disc holding members 13 and 14 of the first embodiment, a slope 16' provided at the end of each disc holding member 16 holds and fixes the disc 100 onto the cartridge body 10. Each of the disc holding members 15 further includes a coupling pin 15p, which is engaged and interlocked with a groove 16g provided for its associated disc holding member 16.

When the two cartridge positioning pins 210 of the disc drive are engaged with the positioning holes 11w of the cartridge body 10, respective protrusions 15s of the disc holding members 15 are pushed by the positioning pins 210 as shown in FIG. 10. As a result, the disc holding members 15 are moved in the direction indicated by the arrow 15A and the disc 100 is released from the grip of the slopes 15'. In the meantime, as the disc holding members 15 are moved, the disc holding members 16 are rotated to the direction indicated by the arrow 16A. Consequently, the disc 100 is also released from the grip of the slopes 16'.

Embodiment 3

Figure 11:
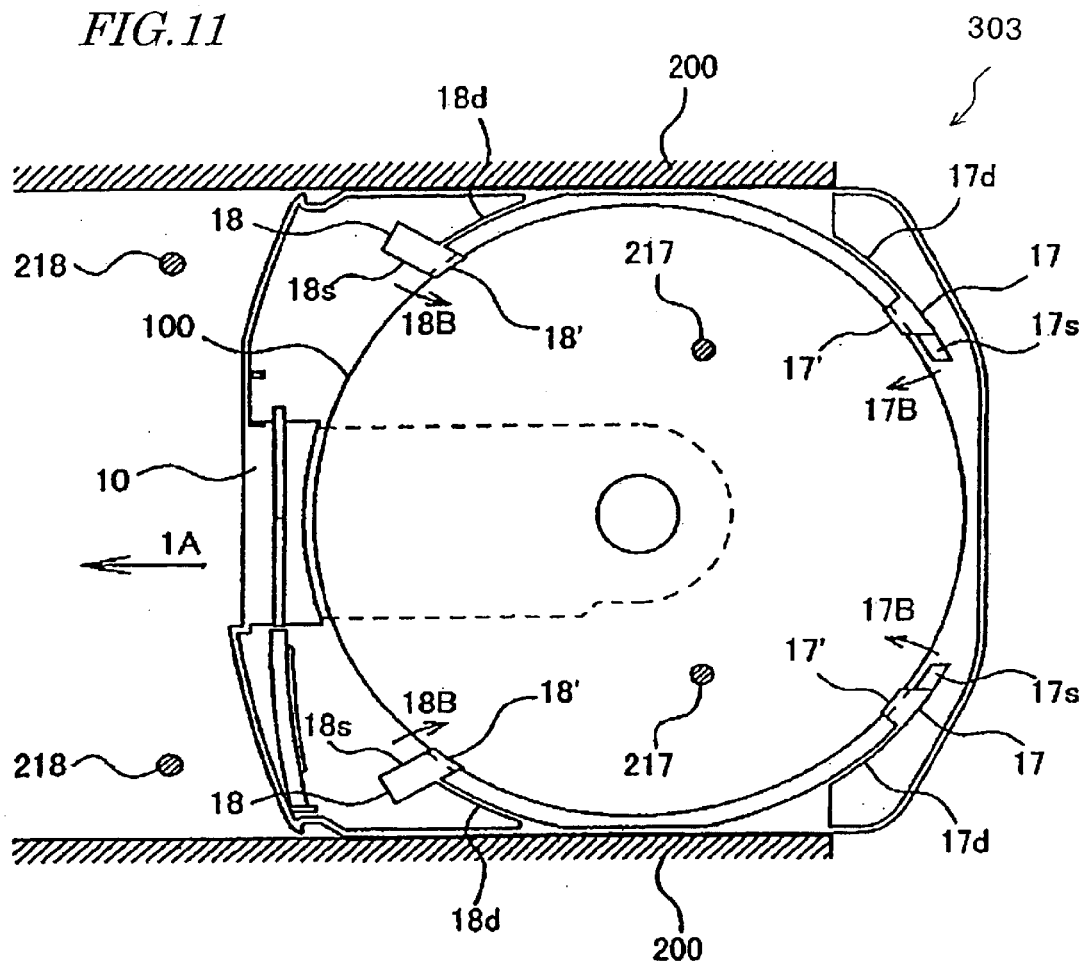
FIG. 11 is a plan view illustrating an overall configuration for a disc cartridge according to a third embodiment of the present invention.
Figure 12:
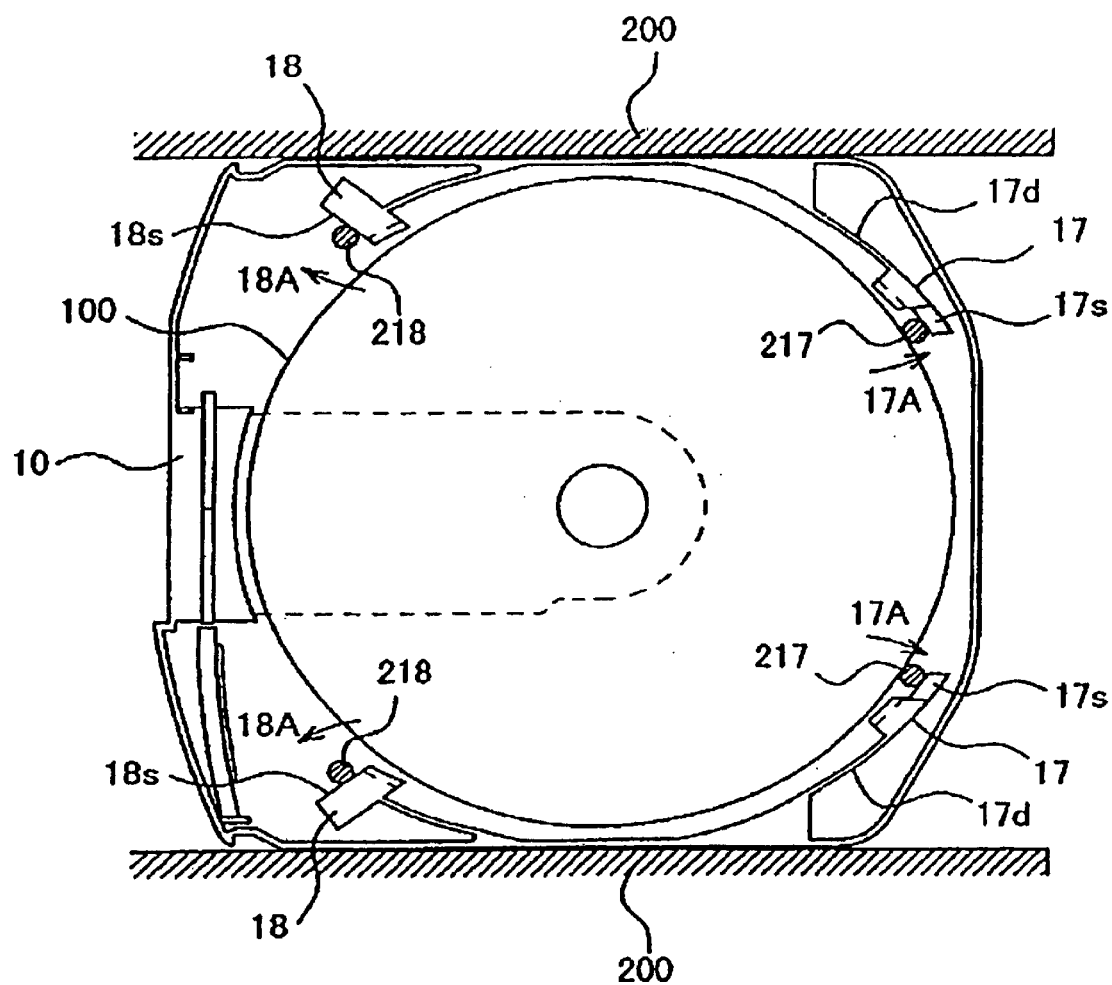
FIG. 12 is a plan view illustrating a state of the disc cartridge shown in FIG. 11 in which the disc has been released.

Hereinafter, a disc cartridge 303 according to a third embodiment of the present invention will be described with reference to FIGS. 11 and 12. Specifically, FIG. 11 is plan view illustrating an overall configuration for the disc cartridge 303 in which the disc 100 is held. FIG. 12 is a plan view illustrating an overall configuration for the disc cartridge 303 in which the disc 100 has been released. In FIGS. 11 and 12, each member equivalent to the counterpart of the first embodiment is identified by the same reference numeral and the description thereof will be omitted herein.

The disc cartridge 303 is different from the disc cartridge 301 of the first embodiment in the disc holding members. Specifically, the disc cartridge 303 includes two pairs of disc holding members 17 and 18, to which an elastic force is applied in the directions indicated by the arrows 17B and 18B, respectively, as shown in FIG. 11. These disc holding members 17 and 18 have been molded together with the cartridge body 10 so as to form integral parts of the cartridge body 10.

Each of the disc holding members 17 includes an elastic portion 17d, which applies an elastic force to the disc holding member 17 in the direction indicated by the arrow 17B. Just like the disc holding members 13 and 14 of the first embodiment, a slope 17' provided at the end of each disc holding member 17 holds and fixes the disc 100 onto the cartridge body 10.

Each of the disc holding members 18 also includes an elastic portion 18d, which applies an elastic force to the disc holding member 18 in the direction indicated by the arrow 18B. A slope 18' provided at the end of each disc holding member 18 also holds and fixes the disc 100 onto the cartridge body 10.

When this disc cartridge 303 is inserted into a disc drive 200, a pair of disc releasing pins 217, provided for the disc drive 200, presses protrusions 17s of the disc holding members 17. As a result, the disc 100 is released from the disc holding members 17 as shown in FIG. 12. At the same time, another pair of disc releasing pins 218, also provided for the disc drive 200, contacts with the side surfaces 18s of the disc holding members 18. Consequently, the disc 100 is also released from the disc holding members 18.

Embodiment 4

Figure 13:
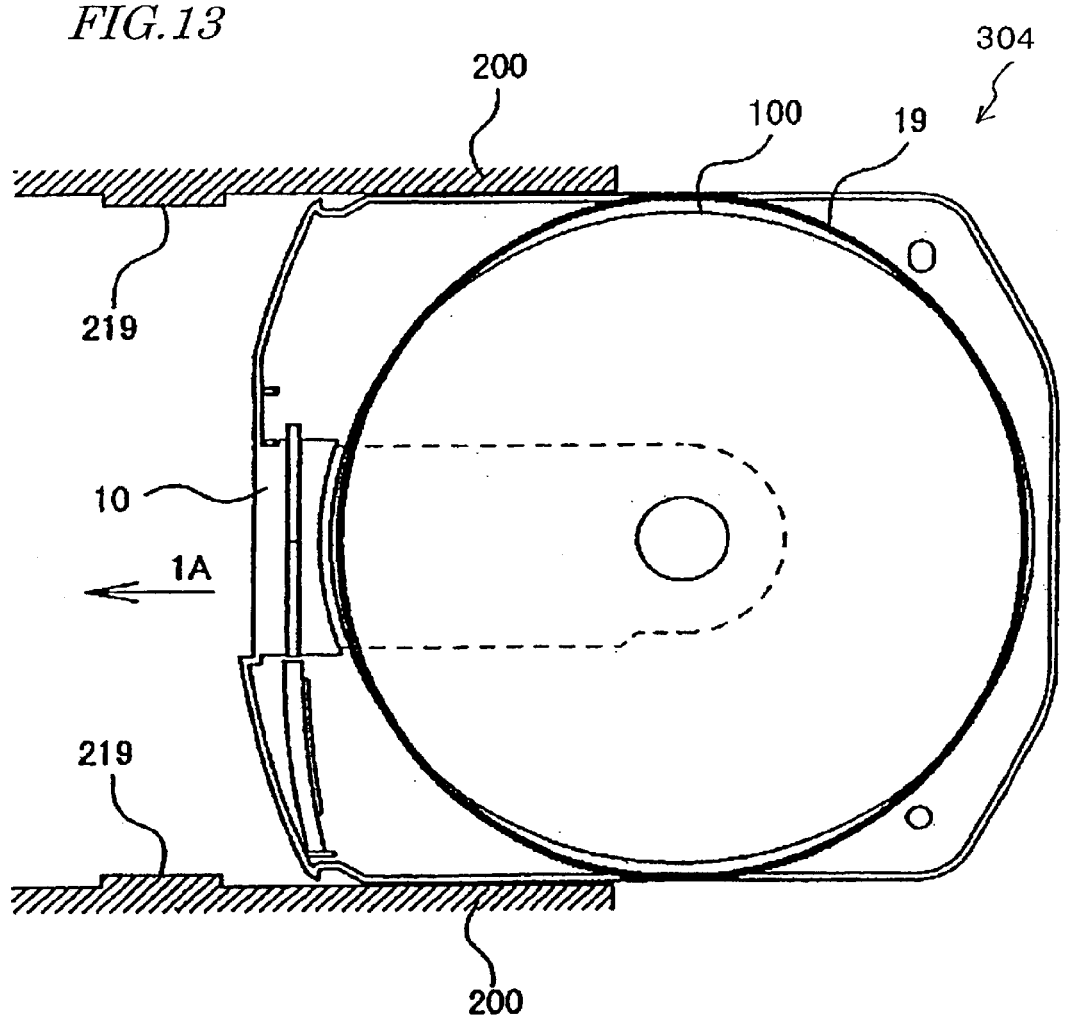
FIG. 13 is a plan view illustrating an overall configuration for a disc cartridge according to a fourth embodiment of the present invention.
Figure 14:
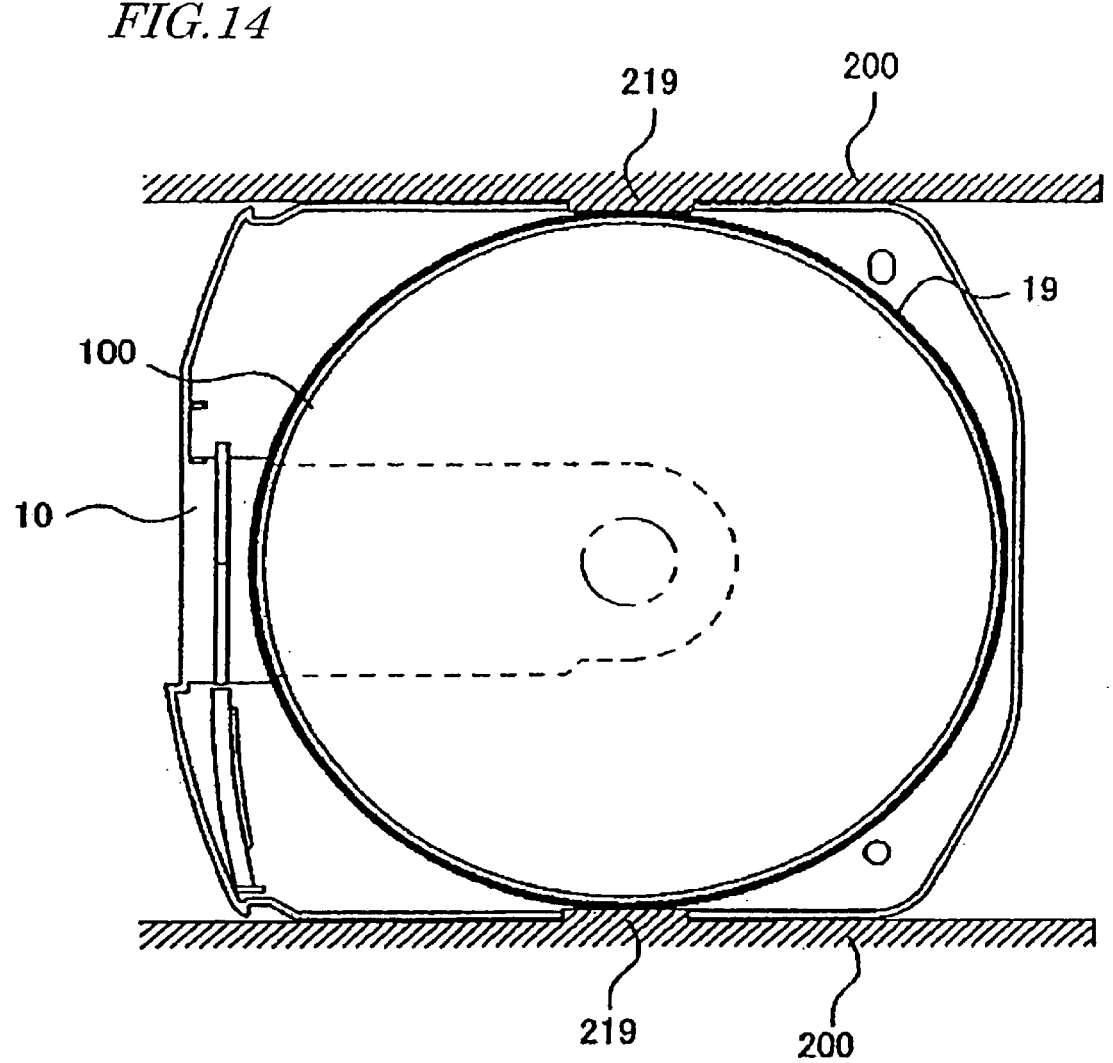
FIG. 14 is a plan view illustrating a state of the disc cartridge shown in FIG. 13 in which the disc has been released.

Hereinafter, a disc cartridge 304 according to a fourth embodiment of the present invention will be described with reference to FIGS. 13 and 14. Specifically, FIG. 13 is plan view illustrating an overall configuration for the disc cartridge 304 in which the disc 100 is held. FIG. 14 is a plan view illustrating an overall configuration for the disc cartridge 304 in which the disc 100 has been released. In FIGS. 13 and 14, each member equivalent to the counterpart of the first embodiment is identified by the same reference numeral and the description thereof will be omitted herein.

The disc cartridge 304 is different from the disc cartridge 301 of the first embodiment in the disc holding member. Specifically, the disc cartridge 304 includes a ringlike disc holding member 19.

As shown in FIG. 13, the disc holding member 19 is a ringlike elastic member, which is made of rubber, for example, and which can change its shape freely. When no force is externally applied thereto, the disc holding member 19 has an ellipsoidal shape. However, by applying an external force thereto, the disc holding member 19 may be deformed into a substantially completely round shape. When the disc holding member 19 is deformed into a substantially completely round shape, the inside diameter thereof is greater than the diameter of the disc 100.

As shown in FIG. 13, the ellipsoidal disc holding member 19 is in contact with the disc 100 at multiple points, thereby holding and fixing the disc 100 onto the cartridge body 10. However, when this disc cartridge 304 is inserted into a disc drive 200, a pair of convex portions 219, provided for the disc drive 200, presses the major axis portion of the ringlike disc holding member 19, thereby deforming the disc holding member 19 as shown in FIG. 14. As a result, the disc holding member 19 is deformed into an approximately completely round shape and is no longer in contact with the disc 100. That is to say, the disc 100 is released from the disc holding member 19.

To release the disc 100 from the disc holding member 19, the force that deforms the disc holding member 19 may also be applied from the convex portion of the disc drive, which engages with the concave portion 10g (see FIG. 2) provided for preventing the erroneous insertion, to the disc holding member 19. Alternatively, that force may also be applied from a pair of convex portions of the disc drive, which engages with the concave portions 10c (see FIG. 2) provided on the right- and left-hand sides of the disc cartridge 1 for pulling in the disc cartridge 304, to the disc holding member 19.

Embodiment 5

Figure 15:
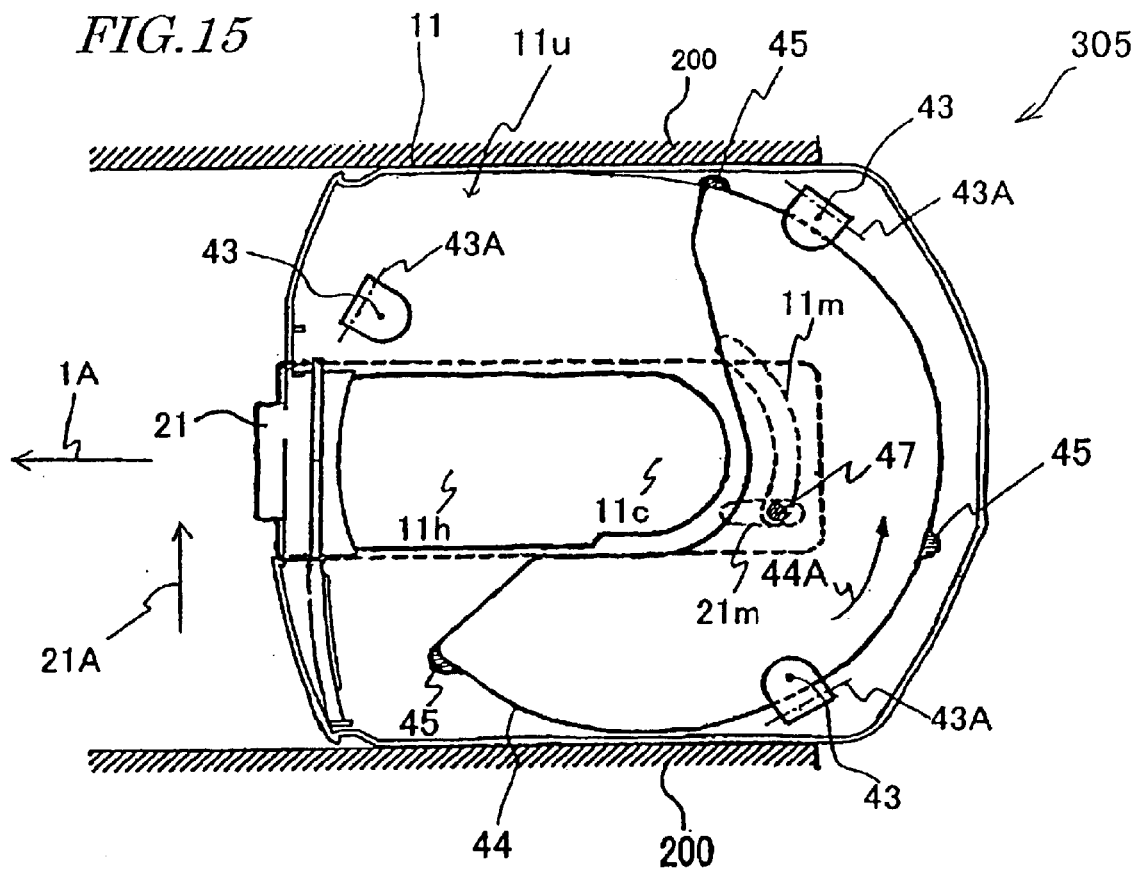
FIG. 15 is a plan view illustrating an overall configuration for a disc cartridge according to a fifth embodiment of the present invention in a state where its shutter is closed.
Figure 16:
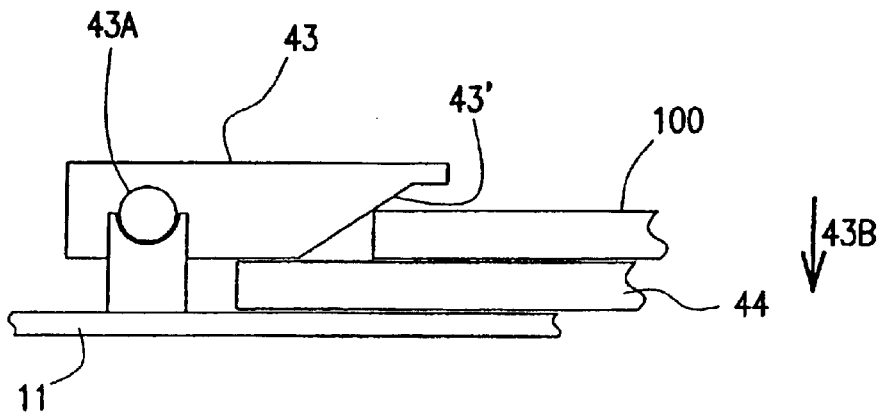
FIG. 16 is a cross-sectional view of a disc holding member of the disc cartridge shown in FIG. 15.
Figure 17:
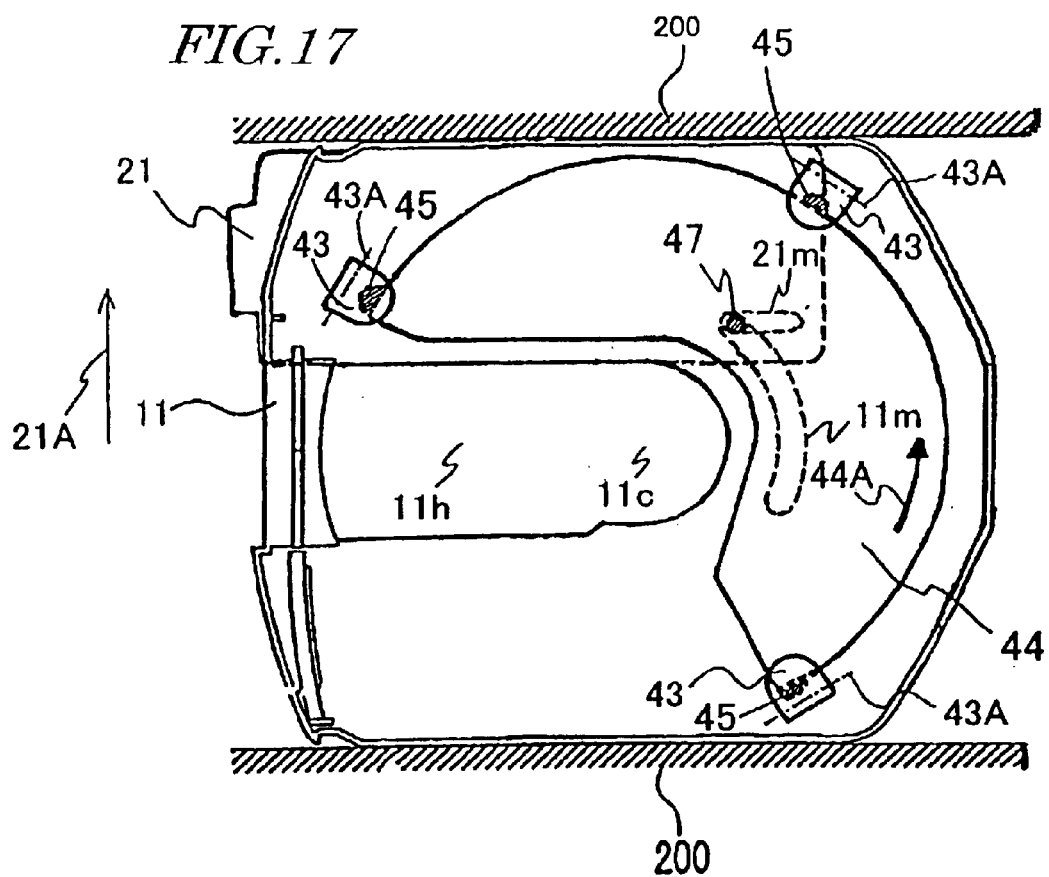
FIG. 17 is a plan view illustrating an overall configuration for the disc cartridge shown in FIG. 15 in a state where its shutter is opened.
Figure 18:
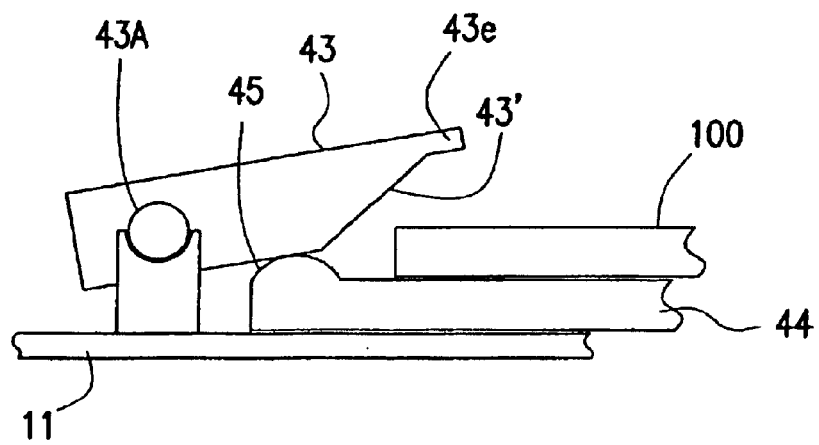
FIG. 18 is a cross-sectional view of the disc holding member of the disc cartridge shown in FIG. 17.

Hereinafter, a fifth embodiment of the present invention will be described with reference to FIGS. 15 through 18. FIGS. 15 and 17 are plan views illustrating the structure of a portion of a disc cartridge 305 according to this embodiment from which the cartridge upper shell has been removed. Specifically, FIG. 15 illustrates a state where the shutter 21 covers the openings 11h and 11c, while FIG. 17 illustrates a state where the shutter 21 exposes the openings 11h and 11c. FIGS. 16 and 18 illustrate states of a disc holding portion 43 when the shutter 21 is closed and when the shutter 21 is opened, respectively.

In this embodiment, each member equivalent to the counterpart of the disc cartridge of the first embodiment is identified by the same reference numeral.

The disc cartridge of this embodiment is characterized in that the disc holding and releasing operations by disc holding members 43 are synchronized with the opening and closing operations by the shutter 21 by way of a disc holding/interlocking member 44.

The disc holding/interlocking member 44 is provided over the first inner surface 11u of the cartridge lower shell 11 so as to rotate and slide around the chucking opening 11c of the cartridge lower shell 11 as indicated by the arrow 44A in FIGS. 15 and 17. The disc holding/interlocking member 44 has a fan shape, or in the shape of a partially notched ring that has an inside diameter equal to the diameter of the chucking opening 11c.

The disc holding/interlocking member 44 includes an engaging pin 47 that extends toward the cartridge lower shell 11 (i.e., in the direction going into the paper of FIGS. 15 and 17). The cartridge lower shell 11 and the shutter 21 are respectively provided with guide grooves 11m and 21m that both engage with this engaging pin 47. Also, multiple protrusions 45, which extend outward and toward the cartridge upper shell (i.e., in the direction coming out of the paper of FIGS. 15 and 17), are provided on the outer periphery of the disc holding/interlocking member 44. Furthermore, the upper surface of the disc holding/interlocking member 44 is covered with a nonwoven fabric or a coating to prevent the disc 100 from getting scratched or dust from being deposited on the signal recording side thereof.

A number of disc holding members 43 are disposed at predetermined intervals on respective regions of the cartridge lower shell 11 so as to hold the outer edge portion of the disc thereon when the disc is stored in the disc cartridge. In FIGS. 15 and 17, three disc holding members 43 are provided. Alternatively, two, four or more disc holding members 43 may also be provided. In any case, each of those disc holding members 43 is secured to the cartridge lower shell 11 so as to rotate on the rotation shaft 43A thereof.

As shown in FIG. 16, the disc holding member 43 is located at such a position as to partially overlap with the outer periphery and its surrounding portion of the disc holding/interlocking member 44. Also, a mechanism (not shown in FIG. 16) such as the elastic portion 14d shown in FIG. 5, for example, presses the disc holding member 43 in the direction 43B (i.e., toward the cartridge lower shell 11). Accordingly, while contacting with the edge of the disc 100, the slope 43' of the disc holding member 43 not only presses the disc 100 in the direction 43B so that the disc 100 is brought into contact with the disc holding/interlocking member 44 but also holds the disc 100 thereon.

As shown in FIG. 15, when the disc cartridge holding the disc (not shown) thereon is inserted into a disc drive 200 in the direction indicated by the arrow 1A, a shutter opening/closing lever (not shown), provided for the disc drive 200, moves the shutter 21 in the direction 21A, thereby opening the shutter 21. When the shutter 21 starts to move in the direction 21A, a force is also applied in the arrowed direction 21A to the engaging pin 47 of the disc holding/interlocking member 44 that is inserted into the guide groove 21m of the shutter 21. As a result, the engaging pin 47 is moved along the guide groove 11m of the cartridge lower shell 11, and the disc holding/interlocking member 44 starts to rotate around the chucking opening 11c as indicated by the arrow 44A. The guide groove 11m preferably extends approximately in the direction in which the shutter 21 is moved so that the disc holding/interlocking member 44 moves synchronously with the shutter 21.

When the shutter 21 is completely open, the protrusions 45 on the outer periphery of the disc holding/interlocking member 44 are located under the disc holding members 43 as shown in FIG. 17. Then, as shown in FIG. 18, the disc holding members 43 are pushed up by the protrusions 45 and the slopes 43' of the disc holding members 43 separate themselves from the outer edge of the disc 100. As a result, the force 43B that has pressed the disc 100 vertically to the disc plane is removed and the disc 100 is released to be freely rotatable. At this point in time, the rim 43e at the end of the disc holding member 43 still overhangs a portion of the projection area of the disc 100 (i.e., the outer periphery thereof). Accordingly, even if the disc 100 is released in a disc drive that is supposed to mount the disc thereon vertically, the disc will not drop down from the cartridge.

In the disc cartridge 305 of this embodiment, the disc can be released even if the disc cartridge is not inserted into the disc drive 200. For example, if the shutter 21 is opened manually, the disc holding members 43 will release the disc 100 synchronously with the movement of the shutter 21. Thus, the user can remove the existing disc from the cartridge and insert another disc thereto intentionally.

Embodiment 6

Figure 19:
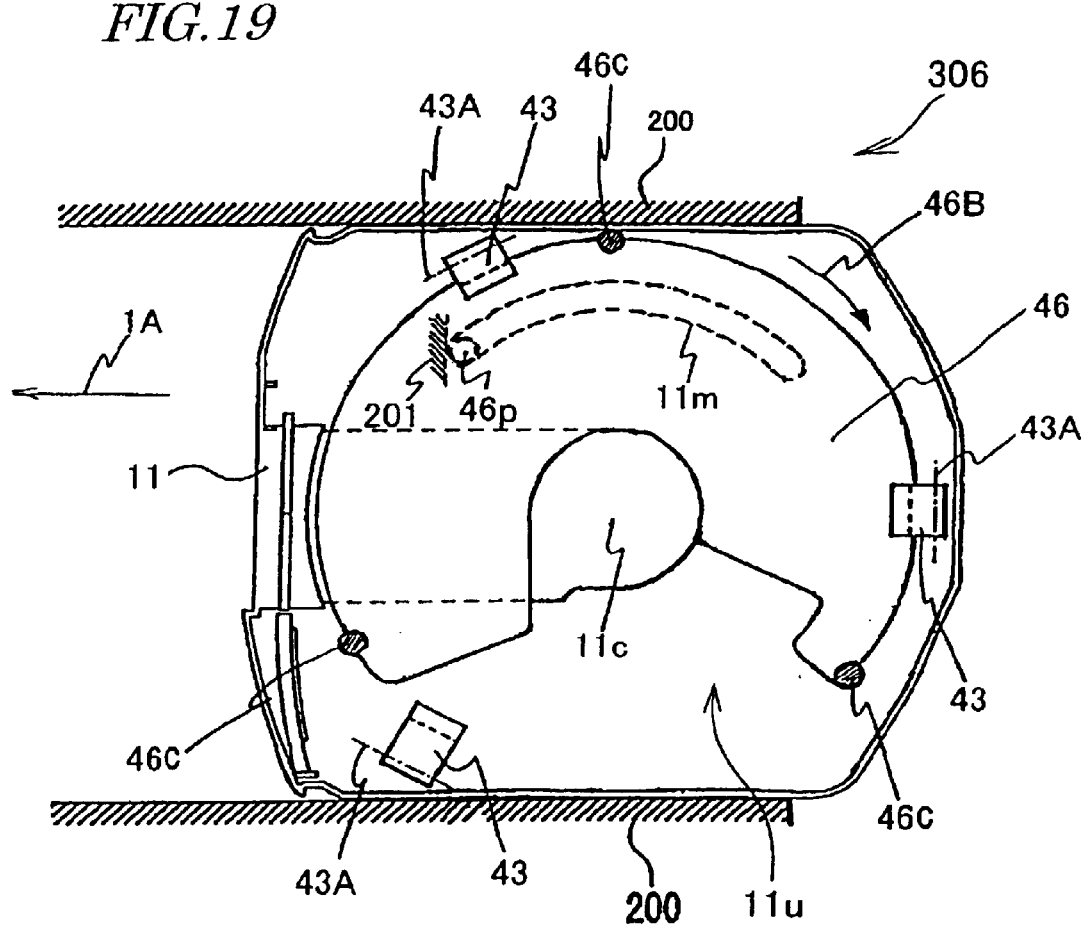
FIG. 19 is a plan view illustrating an overall configuration for a disc cartridge according to a sixth embodiment of the present invention in a state where its shutter is closed.
Figure 20:
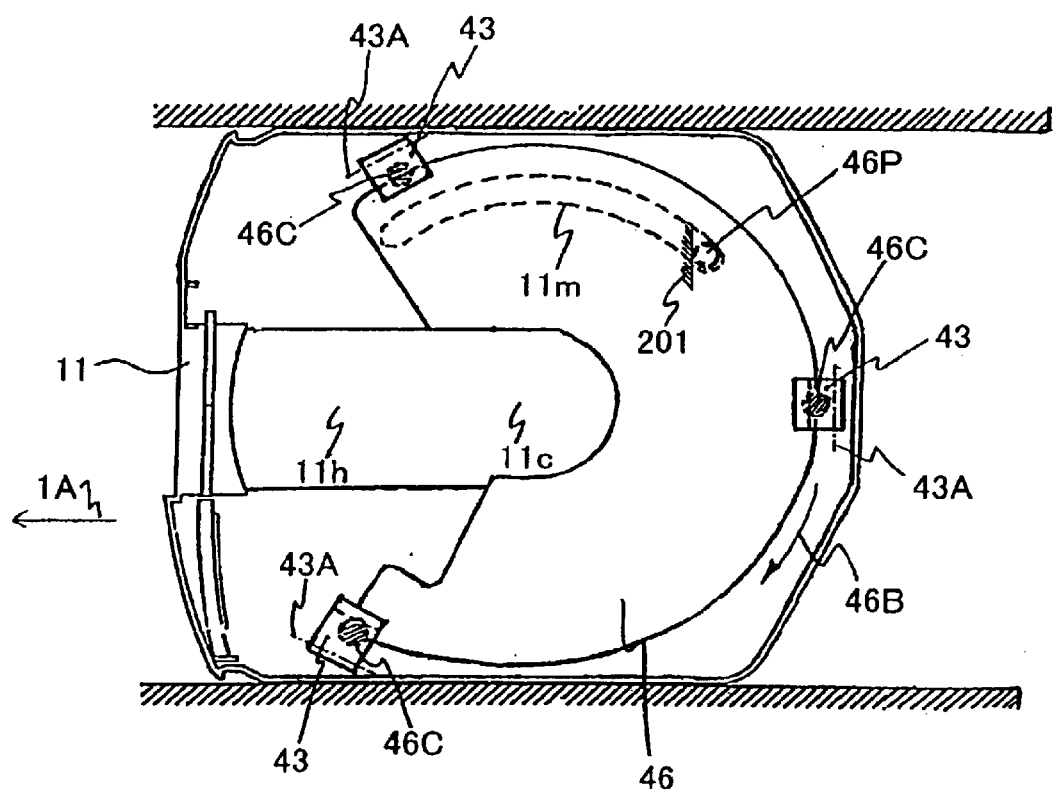
FIG. 20 is a plan view illustrating an overall configuration for the disc cartridge shown in FIG. 19 in a state where its shutter is opened.

Hereinafter, a sixth embodiment of the present invention will be described. FIGS. 19 and 20 are plan views illustrating the structure of a portion of a disc cartridge 306 according to this embodiment from which the cartridge upper shell has been removed. Specifically, FIG. 19 illustrates a state where the shutter covers the head opening, while FIG. 20 illustrates a state where the shutter exposes the head opening. In FIGS. 19 and 20, each member equivalent to the counterpart of the disc cartridge of the first or fifth embodiment is identified by the same reference numeral.

The disc cartridge of this embodiment is characterized in that the disc holding/interlocking member of the fifth embodiment described above also functions as a shutter. The shutter 46 is provided over the first inner surface 11u of the cartridge lower shell 11 so as to rotate and slide around the chucking opening 11c of the cartridge lower shell 11 as indicated by the arrow 46B in FIGS. 19 and 20. The shutter 46 has a fan shape, or in the shape of a partially notched ring that has an inside diameter equal to the diameter of the chucking opening 11c.

The shutter 46 includes an engaging pin 46p that extends toward the cartridge lower shell 11 (i.e., in the direction going into the paper of FIGS. 19 and 20). The cartridge lower shell 11 is provided with a guide groove 11m that engages with this engaging pin 46p. When the engaging pin 46p is located at one end of the guide groove 11m, the head opening 11h is closed up by the shutter 46. And when the engaging pin 46p is located at the other end of the guide groove 11m, the head opening 11h is exposed. The guide groove 11m is provided along a portion of an arc that is concentric with the chuck opening 11c. The guide groove 11m preferably extends approximately in the direction 1A in which the disc cartridge is inserted so that the shutter 46 is opened as the disc cartridge is inserted into the disc drive.

Multiple protrusions 46c, which extend outward and toward the cartridge upper shell 12 (i.e., in the direction coming out of the paper of FIGS. 19 and 20), are provided on the outer periphery of the shutter 46. Furthermore, the upper surface of the shutter 46 is covered with a nonwoven fabric or a coating material to prevent the disc 100 from getting scratched or any dust from being deposited on the signal recording side thereof.

A number of disc holding members 43, having a structure similar to that of the disc holding members of the fifth embodiment, are disposed at predetermined intervals on respective regions of the cartridge lower shell 11. The disc holding members 43 and the protrusions 46c of the shutter 46 together hold or release the disc synchronously with the movement of the shutter 46 as already described for the fifth embodiment.

When the disc cartridge of this embodiment is inserted into the disc drive 200 as indicated by the arrow 1A in FIG. 19, the engaging pin 46p of the shutter 46 will soon contact with a contact member 201 provided for the disc drive 200. And when the disc cartridge is inserted deeper into the disc drive 200, the engaging pin 46p is pressed by the contact member 201 to start to move along the guide groove 11m. Then, the shutter 46 starts to rotate around the chucking opening 11c of the cartridge lower shell 11 as indicated by the arrow 46B. As the shutter 46 rotates, the head opening 11h is opened little by little.

As shown in FIG. 20, when the disc cartridge has been fully inserted into the disc drive 200, the engaging pin 46p will reach the other end of the guide groove 11m. As a result, the head opening 11h is completely exposed. At this point in time, as already described for the fifth embodiment, the protrusions 46c are located under the disc holding members 43. Then, the disc holding portions are pushed up by the protrusions 46c toward the cartridge upper shell 12 (i.e., in the direction coming out of the paper of FIG. 20). As a result, the disc 100 that has been held by the disc holding members 43 is released and now freely rotatable.

The disc cartridge of this embodiment needs no disc holding/interlocking member. Thus, compared to the disc cartridge of the fifth embodiment, the disc cartridge can be thinner. Also, if the engaging pin 46p is moved manually along the guide groove 11m, the shutter 46 can be opened and the disc can be released from the disc holding members and removed.

In this embodiment, the shutter 46 rotates clockwise as viewed from over the cartridge upper shell. However, the shutter 46 may also be rotated counterclockwise if the position of the guide groove 11m is changed.

Embodiment 7

Figure 21:
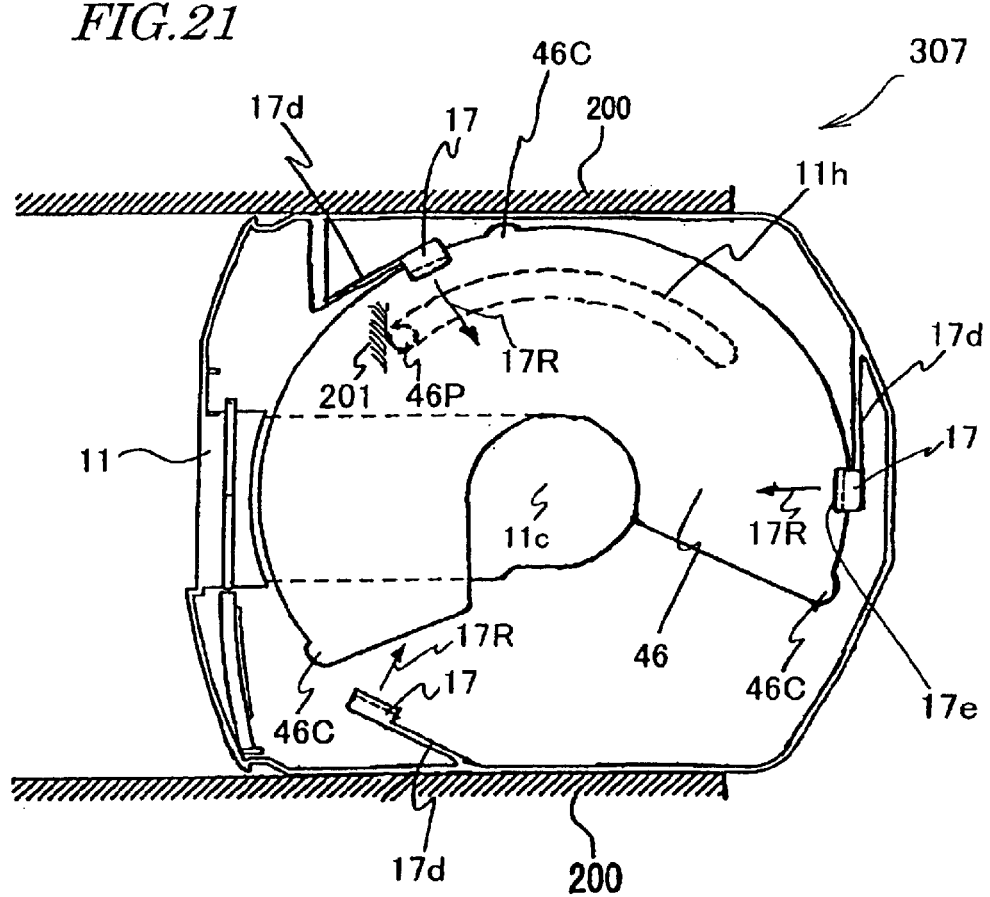
FIG. 21 is a plan view illustrating an overall configuration for a disc cartridge according to a seventh embodiment of the present invention in a state where its shutter is closed.
Figure 22:
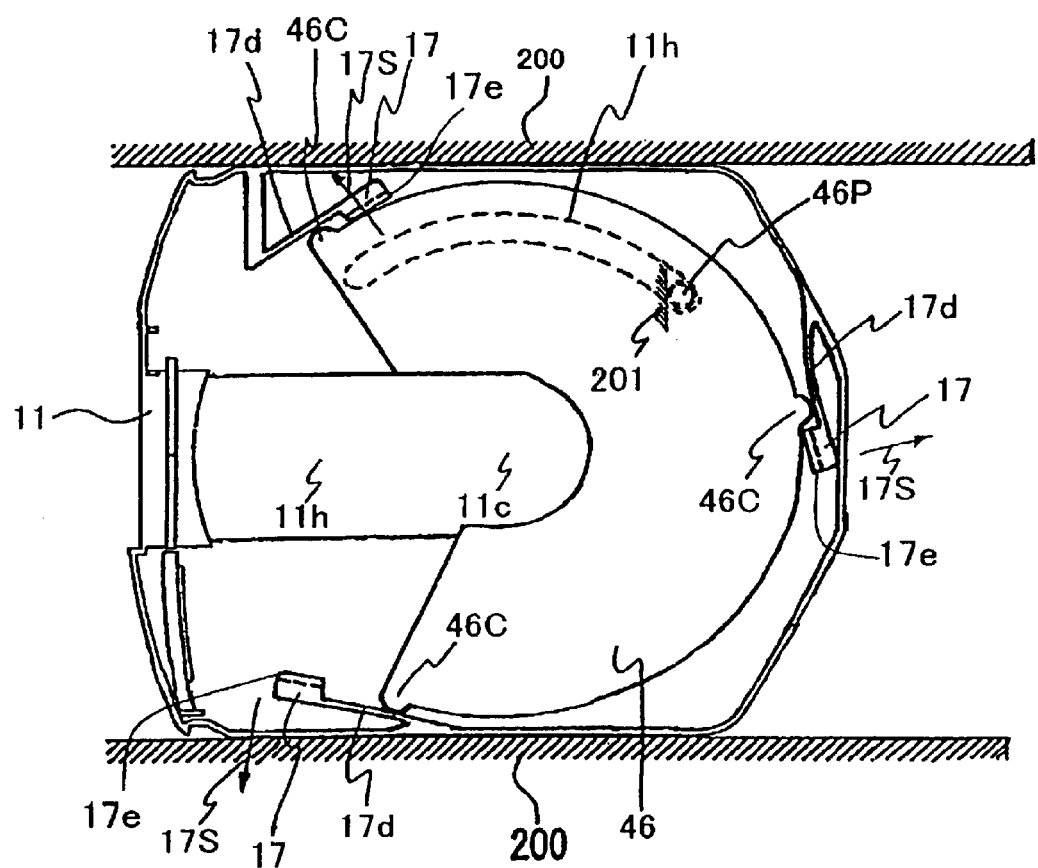
FIG. 22 is a plan view illustrating an overall configuration for the disc cartridge shown in FIG. 21 in a state where its shutter is opened.

Hereinafter, a seventh embodiment of the present invention will be described. FIGS. 21 and 22 are plan views illustrating the structure of a portion of a disc cartridge 307 according to this embodiment from which the cartridge upper shell has been removed. Specifically, FIG. 21 illustrates a state where the shutter covers the head opening, while FIG. 22 illustrates a state where the shutter exposes the head opening. In FIGS. 21 and 22, each member equivalent to the counterpart of the disc cartridge of the third or sixth embodiment is identified by the same reference numeral.

The disc cartridge of this embodiment is different from the disc cartridge of the sixth embodiment in the structure of the disc holding members. Specifically, as shown in FIGS. 21 and 22, the disc cartridge of this embodiment includes a plurality of disc holding members 17. Just like the disc holding members of the third embodiment described above, each of these disc holding members 17 also includes an elastic portion 17d. While the shutter 46 is closed, the elastic force applied from the elastic portions 17d holds the disc in such a manner as to press the disc 100 toward the center of the disc (17R). In this embodiment, the disc holding members 17 form integral parts of the cartridge lower shell 11. Alternatively, the disc holding members 17 may also be formed separately from the cartridge lower shell 11.

When a cross section thereof is taken in the disc radial direction, each of these disc holding members 17 also has a slope that tilts to overhang a portion of the projection area of the disc (i.e., the outer periphery of the disc) just like the disc holding member 43 shown in FIG. 18. Accordingly, if the disc gets held by the disc holding members 17 so as to have its outer edge contact with the respective slopes, then the disc is pressed against the shutter 46.

The shutter 46 includes a plurality of protrusions 46c on the outer periphery thereof. In this embodiment, the protrusions 46c protrude outward. Also, the protrusions 46c are located at such positions on the outer periphery of the shutter 46 as to contact with the elastic portions 17d of the disc holding members 17 when the shutter 46 is opened.

As shown in FIG. 22, when the shutter 46 is opened, the protrusions 46c dominate the elastic force of the elastic portions 17d, thereby pushing the elastic portions 17d outward from the disc 100 (i.e., in the directions 17s). As a result, the disc 100 is released. However, each of the disc holding members 17 also includes a rim 17e at the end thereof. Even after the disc 100 has been released, the rim 17e still overhangs a portion of the projection area of the disc. Accordingly, even if the disc cartridge has been loaded into the disk drive 200 that is supposed to mount the disc 100 thereon vertically, the disc 100 will not drop down from the disc cartridge.

The disc cartridge of this embodiment has all the features of the sixth embodiment described above. In addition, the disc holding members 17 may form integral parts of the cartridge lower shell 11. Thus, the disc cartridge can have a simplified structure and its manufacturing cost can be reduced.

Embodiment 8

Hereinafter, a disc cartridge 308 according to an eighth embodiment of the present invention will be described with reference to the drawings.

Figure 23:
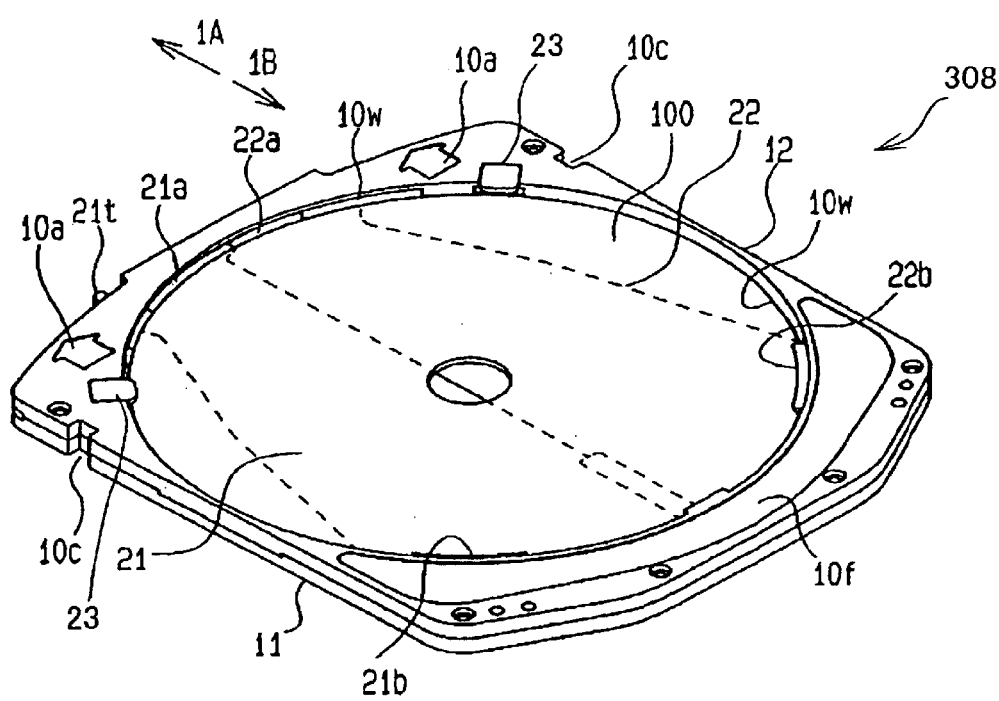
FIG. 23 is a perspective view illustrating an overall configuration for a disc cartridge according to an eighth embodiment.
Figure 24:
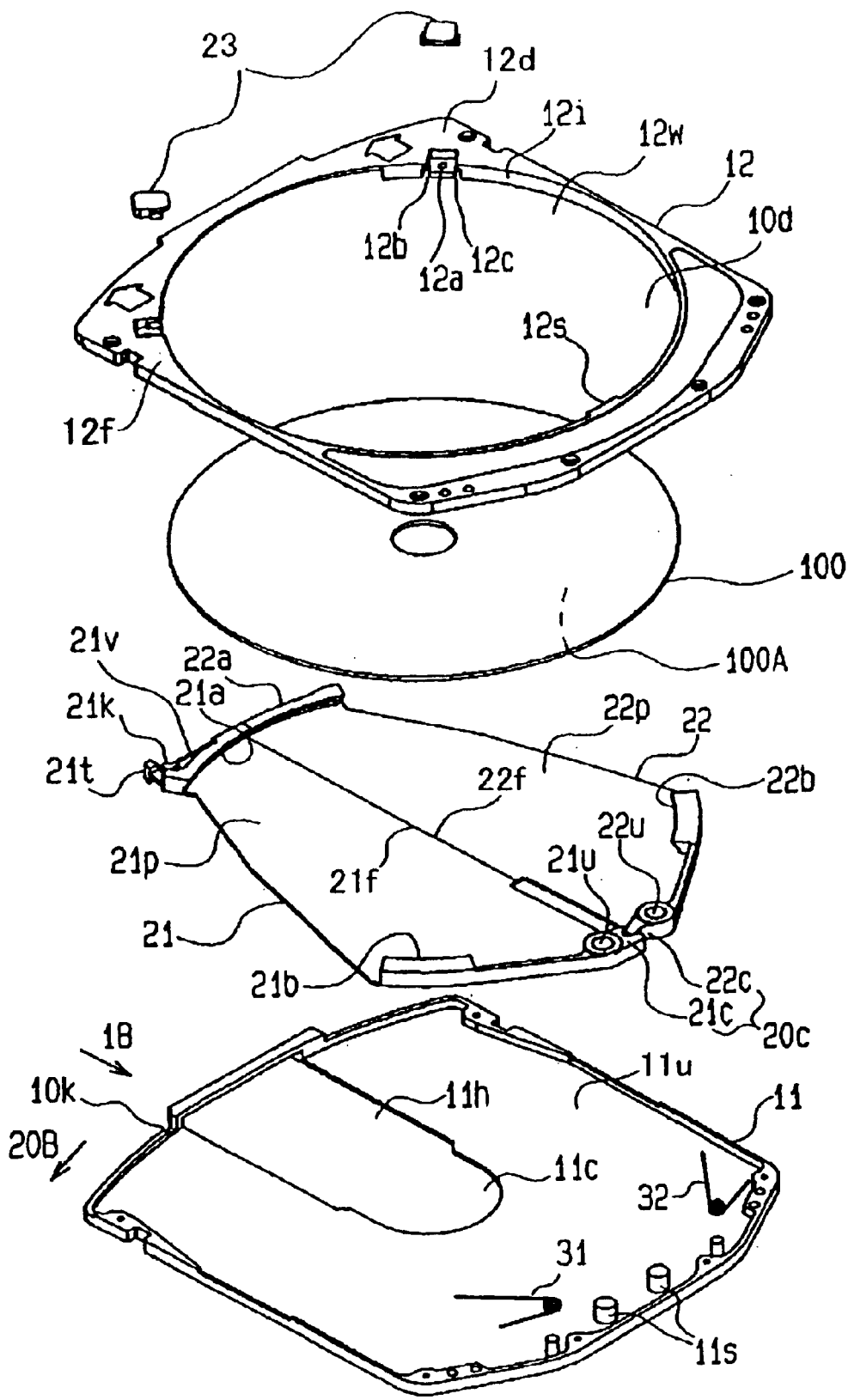
FIG. 24 is an exploded perspective view illustrating an exploded state of the disc cartridge shown in FIG. 23.

First, the structure of the disc cartridge 308 will be outlined with reference to FIGS. 23 and 24. As in the first embodiment, the disc 100 shown in FIGS. 23 and 24 also includes first and second sides. The first side of the disc, on which its label, for example, is normally printed, is illustrated in FIG. 23, while the second side of the disc 100, i.e., the signal recording side 100A, is illustrated as the back surface in FIG. 24.

As shown in FIGS. 23 and 24, the disc cartridge 308 includes a cartridge lower shell 11, a cartridge upper shell 12, a pair of shutters 21 and 22 and stopper members 23.

As shown in FIG. 24, the cartridge lower shell 11 includes a chucking opening 11c and a head opening 11h. The chucking opening 11c is provided to allow a chucking member (e.g., a spindle motor for rotating the disc 100) to enter the disc cartridge 308 externally. The head opening 11h is provided to allow a head, which reads and/or writes a signal from/on the signal recording side 100A of the disc 100, to enter the disc cartridge 308 and access the signal recording side 100A. The cartridge lower shell 11 faces the signal recording side 100A of the disc 100. Also, the head opening 11h reaches a side surface of the cartridge lower shell 11.

The cartridge upper shell 12 includes a circular disc window 12w, through which the disc 100 can be introduced and removed into/from the disc cartridge 308 and which expands over the entire projection area of the disc 100 to expose the upper surface of the disc. The cartridge upper and lower shells 12 and 11 are adhered or welded together at their outer periphery, thereby forming a cartridge body 10.

A disc storage portion 10d for storing the disc 100 therein is defined by a first inner surface 11u of the cartridge lower shell 11 and a second inner surface 12i of the cartridge upper shell 12. The first inner surface 11u is opposed to the signal recording side 100A of the disc 100, while the second inner surface 12i has a substantially cylindrical shape and defines the disc window 12w inside. That is to say, the first inner surface 11u becomes the bottom of the disc storage portion 10d.

In the disc storage portion 10d, a gap, which is wide enough to allow the disc 100 to rotate freely, is provided between the second inner surface 12i and the disc 100. Also, the top of the disc storage portion 10d is the disc window 12w so that the disc 100 stored in the disc storage portion 10d has one side thereof exposed inside the disc window 12w.

The stopper members 23 are provided in a removable state for the cartridge upper shell 12 so as to partially protrude into the disc window 12w. In this embodiment, two stopper members 23 are provided as shown in FIGS. 23 and 24. On the other hand, a stopper portion 12s is provided for the cartridge upper shell 12 so as to protrude into the disc window 12w. The stopper portion 12s forms an integral part of the cartridge upper shell 12. The two stopper members 23 and the stopper portion 12s are arranged approximately at regular intervals around the circumference of the disc window 12w for the purpose of preventing the disc 100 from dropping down from the disc window 12w. These stopper members 23 and stopper portion 12s can prevent the dropping particularly effectively when this disc cartridge is vertically loaded into a disc drive and used.

The shutters 21 and 22 are disposed between the signal recording side 100A of the disc 100 and the inner surface 11u of the disc storage portion 10d. The shutters 21 and 22 include rotation holes 21u and 22u, respectively. These rotation holes 21u and 22u are engaged in a freely rotatable state with a pair of rotation shafts 11s, which is located outside of the disc storage portion 10d of the cartridge body 10 and opposite to the head opening 11h. Thus, the shutters 21 and 22 rotate on the rotation shafts 11s in such a manner as to expose or cover the chucking and head openings 11c and 11h.

A cam 21c and a follower 22c are provided near the rotation holes 21u and 22u of the shutters 21 and 22, respectively. The cam 21c and the follower 22c have mutually engaging shapes and together make up an interlocking mechanism 20c for opening and closing the shutters 21 and 22 while interlocking them with each other.

The respective surfaces of the shutters 21 and 22, which are opposed to the signal recording side 100A of the disc, are covered with protective layers 21p and 22p for the purpose of preventing the disc 100 from getting scratched or any dust from entering the signal recording side 100A thereof.

The protective layers 21p and 22p may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 21p and 22p.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. Optionally, the elastic force may also be applied from any other type of elastic members to the shutters 21 and 22 in that closing direction.

As shown in FIG. 24, the disc cartridge 308 includes disc holding portions 21a, 21b, 22a and 22b at both ends of the shutters 21 and 22. Each of these disc holding portions 21a, 21b, 22a and 22b has a downwardly tapered slope at the end of the shutter 21 or 22 to grip the outer edge of the disc 100 while the shutters 21 and 22 are closed. The structure and operation of the disc holding portions 21a, 21b, 22a and 22b will be described in further detail later.

As shown in FIG. 23, the upper surface of the cartridge body 10 (or the cartridge upper shell 12) has a label plane 10f, on which the contents that have been written on the disc 100 being stored can be noted down, and embossed arrow marks (or concave portions) 10a that indicate the direction (the arrow 1A) in which this disc cartridge 308 should be inserted into a disc drive. In addition, two concave portions 10c are further provided on two of the side surfaces of the cartridge body 10 that are parallel to the direction 1A in which the cartridge body 10 is inserted. These concave portions 10c may be used as either pull-in notches or positioning recesses when the disc cartridge 308 is loaded into a disk drive or when the disc cartridge 308 is stored in a changer.

Figure 25:
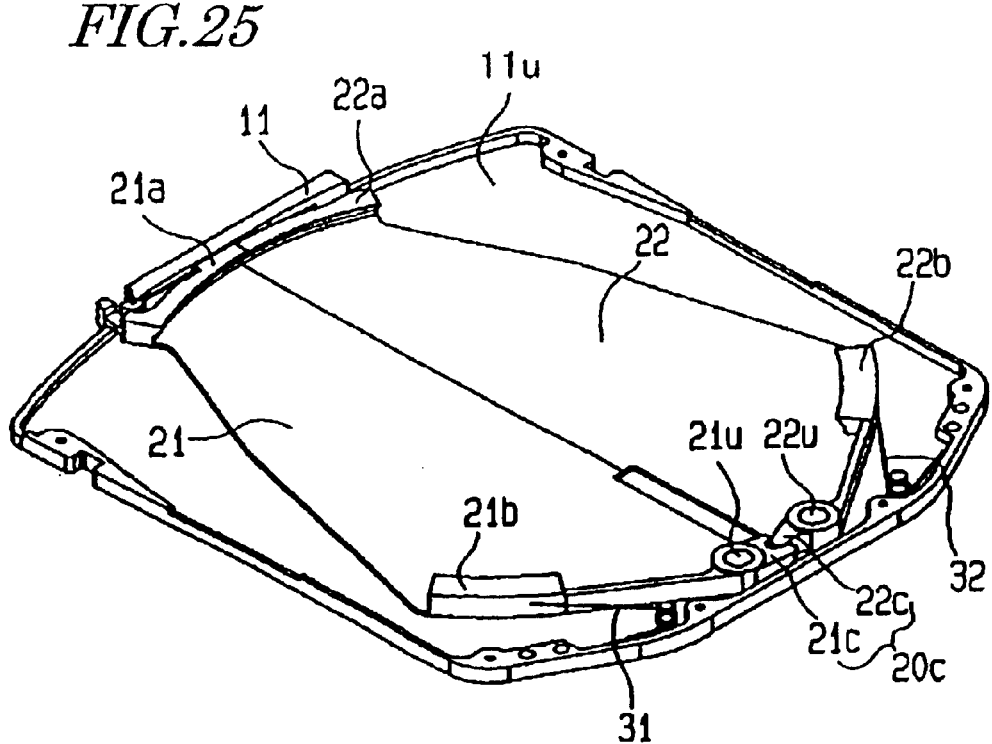
FIG. 25 is a perspective view illustrating a state of the disc cartridge shown in FIG. 23 in which its shutters are closed with its cartridge upper shell and the disc removed.

FIG. 25 is a perspective view illustrating a state where the shutters 21 and 22 cover the chucking and head openings 11c and 11h with the cartridge upper shell 12 and the disc 100 removed. In FIG. 25, the disc holding portions 21a, 21b, 22a and 22b of the shutters 21 and 22 are located at such positions as to grip the outer edge of the disc 100 (not shown).

Figure 26:
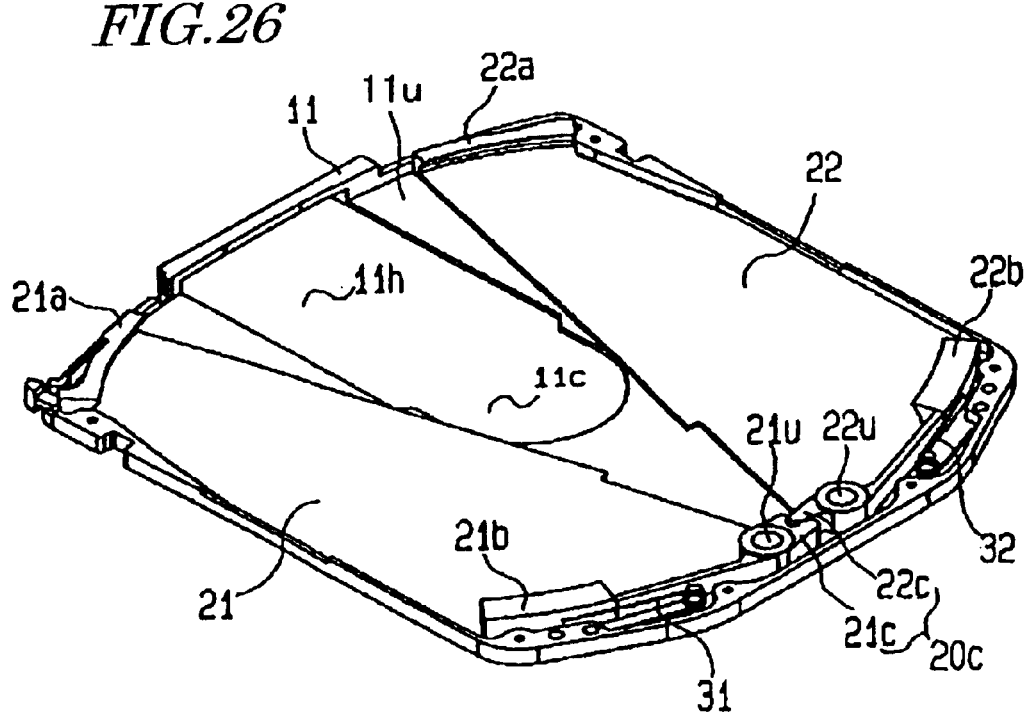
FIG. 26 is a perspective view illustrating a state of the disc cartridge shown in FIG. 23 in which its shutters are opened with its cartridge upper shell and the disc removed.

FIG. 26 is a perspective view illustrating a state where the shutters 21 and 22 expose the chucking and head openings 11c and 11h with the cartridge upper shell 12 and the disc 100 removed. As a result of the rotation of the shutters 21 and 22 on their rotation holes 21u and 22u, respectively, the chucking and head openings 11c and 11h are now exposed. Also, as the shutters 21 and 22 have rotated, the disc holding portions 21a, 21b, 22a and 22b have also rotated on the rotation holes 21u and 22u. Consequently, the disc holding portions 21a, 21b, 22a and 22b are now separated from the outer edge of the disc 100 (not shown).

Figure 27:
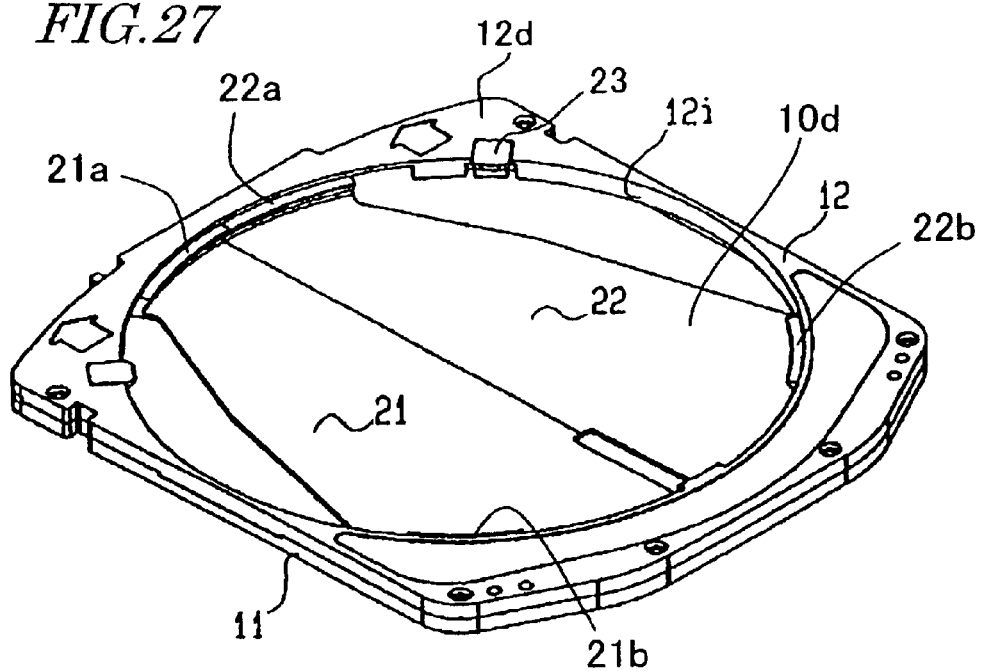
FIG. 27 is a perspective view illustrating a state of the disc cartridge shown in FIG. 23 in which its shutters are closed with the disc removed.
Figure 28:
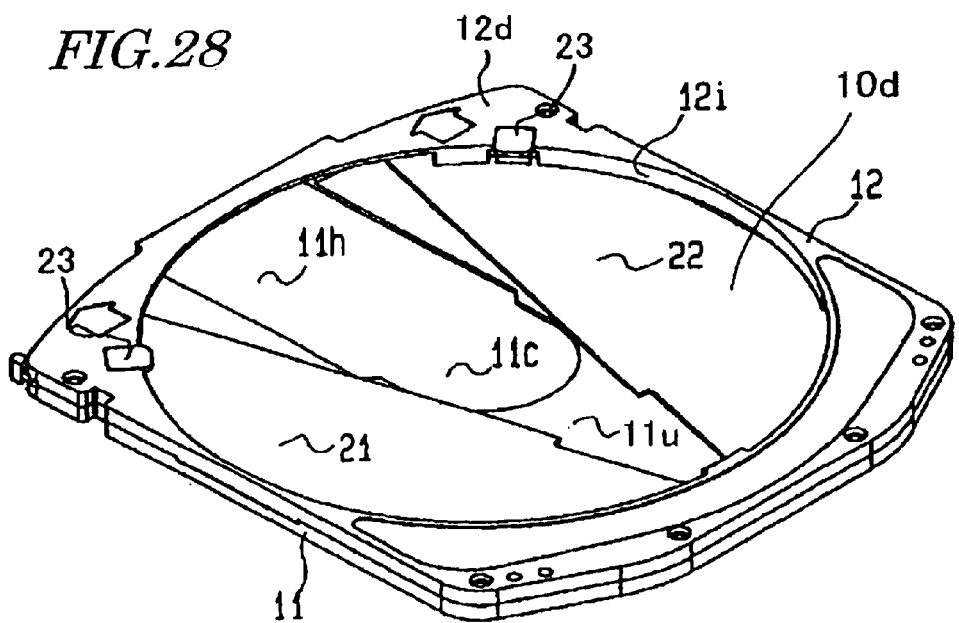
FIG. 28 is a perspective view illustrating a state of the disc cartridge shown in FIG. 23 in which its shutters are opened with the disc removed.

FIG. 27 is a perspective view illustrating a state where the shutters 21 and 22 cover the chucking and head openings 11c and 11h with the disc 100 removed. As shown in FIG. 27, the disc holding portions 21a, 21b, 22a and 22b protrude into the disc storage portion 10d to hold the disc 100 (not shown) thereon. On the other hand, FIG. 28 is a perspective view illustrating a state where the shutters 21 and 22 expose the chucking and head openings 11c and 11h with the disc 100 removed. As shown in FIG. 28, while the shutters 21 and 22 are opened, the disc holding portions 21a, 21b, 22a and 22b are stored outside of the disc storage portion 10*d* of the cartridge body.

Figure 29:
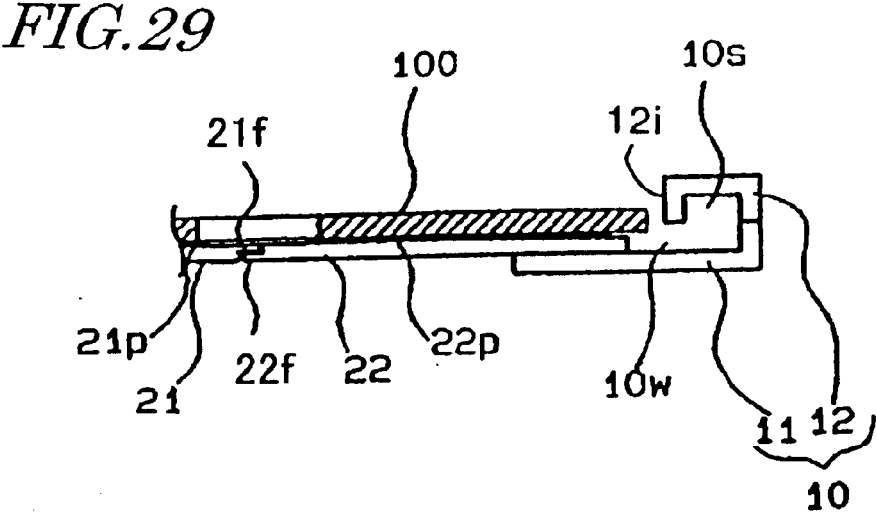
FIG. 29 is a partial cross-sectional view illustrating a cross section of the disc cartridge shown in FIG. 23 that passes the center of the disc.

Next, the structure and the operation of the shutters 21 and 22 will be described in further detail with reference to FIGS. 29, 30 and 31. FIG. 29 is a cross-sectional view as viewed along a plane that passes the center of the disc 100. As shown in FIG. 29, the second inner surface 12*i* of the disc storage portion 10*d* of the cartridge body 10 is provided with a notch 10*w* so as not to interfere with the opening and closing operations of the shutter 22 or 21. Also, the cartridge body 10 further includes a shutter storage portion 10*s* for storing a portion of the shutter 22 or 21 being opened. Furthermore, at least the edge portions 21*f* and 22*f* of the shutters 21 and 22, which are butted against each other over the head and chucking openings 11*h* and 11*c* while the shutters are closed, overlap with each other in the thickness direction of the disc 100 as shown in FIG. 29.

Figure 30:
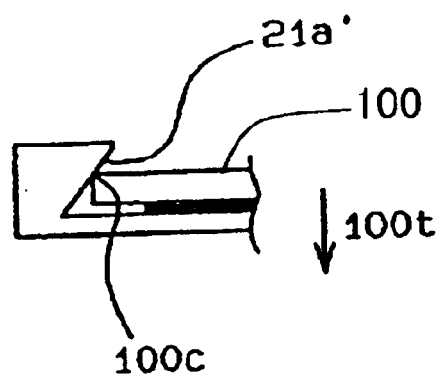
FIG. 30 is a cross-sectional view illustrating a portion of the shutter of the disc cartridge shown in FIG. 23.

On the other hand, as shown in FIG. 30, each of the disc holding portions 21*a*, 21*b*, 22*a* and 22*b* includes a slope 21*a*', 21*b*', 22*a*' or 22*b*', which overhangs a portion of the projection area of the disc and overlaps with the outer edge of the disc 100. That is to say, the slope 21*a*' has a downwardly tapered shape and leans toward the disc 100. While the chucking and head openings 11*c* and 11*h* are covered with the shutters 21 and 22, the slope 21*a*' is allowed to contact with the outer edge 100*c* of the disc 100, thereby gripping the disc 100 thereon and pressing the disc 100 in the thickness direction 100*t*. In this manner, the signal recording side 100A is brought into plane contact with the sheets 21*p* and 22*p* of the shutters 21 and 22 and the disc 100 is held and fixed onto the cartridge body 10. In such a state, the signal recording side 100A of the disc 100 is in close contact with the sheets 21*p* and 22*p*. Thus, no dust will be deposited on the signal recording side 100A.

Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Figure 31:
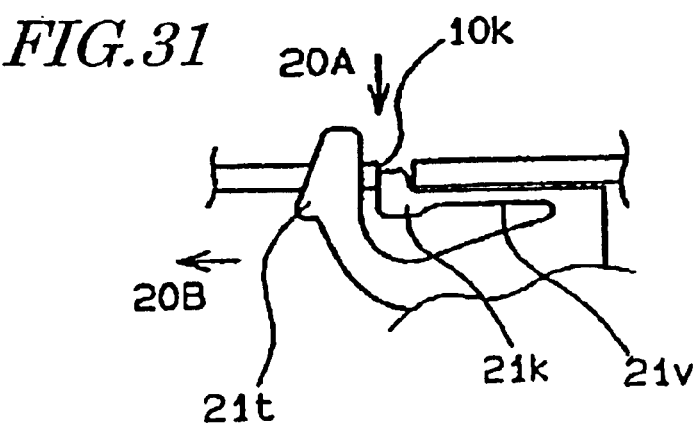
FIG. 31 is a partial plan view illustrating an operating portion and its surrounding portion of the disc cartridge shown in FIG. 23.

Furthermore, as shown in FIG. 31, the shutter 21 includes a shutter opening/closing portion 21*t*, an elastic portion 21*v* and a locking protrusion portion 21*k*. These portions 21*t*, 21*v* and 21*k* form integral parts of the shutter 21. Specifically, the shutter opening/closing portion 21*t* is for use to open and close the shutters externally. The locking protrusion portion 21*k* is connected to the shutter 21 by way of the elastic portion 21*v*. While the shutter 21 covers the chucking and head openings 11*c* and 11*h*, the locking protrusion portion 21*k*, to which an elastic force is being applied from the elastic portion 21*v*, engages with a locking hole 10*k* of the cartridge body 10, thereby preventing the shutter 21 from rotating and fixing and supporting the shutter 21 to the cartridge body 10 as shown in FIG. 31. When the shutter 21 is fixed, the other shutter 22, which is interlocked with the shutter 21 via the interlocking mechanism 20*c*, is also fixed.

Accordingly, only by getting the locking protrusion portion 21*k* pressed externally by a protrusion, for example, in the direction indicated by the arrow 20A and disengaged from the locking hole 10*k* while pressing the opening/closing portion 21*t* in the direction indicated by the arrow 20B at the same time, the shutters 21 and 22 can be rotated to expose the chucking and head openings 11*c* and 11*h* and the disc 100 can be released from the disc holding portions 21*a*, 21*b*, 22*a* and 22*b*. Thus, it is possible to prevent the operator from removing the disc accidentally.

Figure 32:
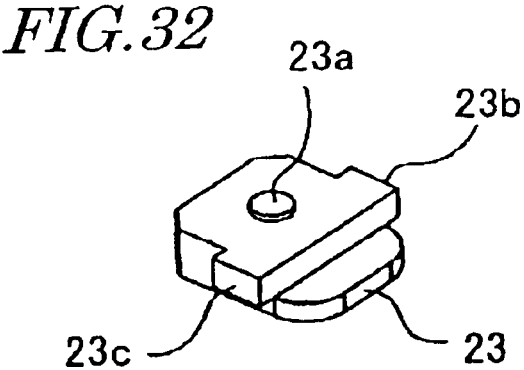
FIG. 32 is a perspective view illustrating a stopper member of the disc cartridge shown in FIG. 23.

Next, the structure and operation of the stopper members 23 will be described in further detail with reference to FIGS. 24 and 32. FIG. 32 is a perspective view illustrating the removable stopper member 23 upside down. The convex portions 23*a*, 23*b* and 23*c* of the stopper member 23 are respectively engaged with concave portions 12*a*, 12*b* and 12*c* provided for the cartridge upper shell 12 near the disc window 12*w* thereof as shown in FIG. 24. Thus, the stopper member 23 can be removed from the cartridge upper shell 12.

Figure 33:
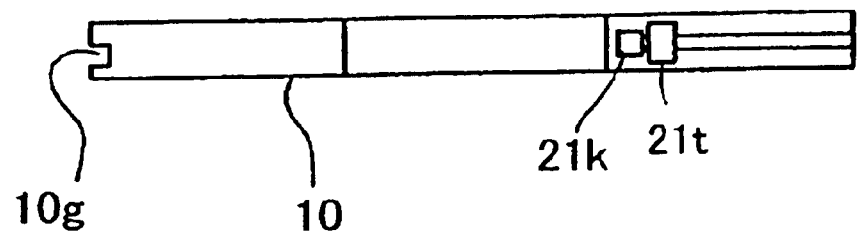
FIG. 33 is a front view of the disc cartridge shown in FIG. 23 as viewed from a direction in which the cartridge is inserted into a drive.

Next, a mechanism for preventing the erroneous insertion of the disc cartridge 308 into a disc drive will be described in further detail with reference to FIG. 33. FIG. 33 is a front view of the disc cartridge 308 shown in FIG. 23 as viewed in the direction in which the disc cartridge 308 is inserted into a disk drive (i.e., arrow 1B). As shown in FIG. 33, the cartridge body 10 includes a concave portion 10*g* on one side surface thereof and is asymmetric in the direction 1A in which the disc cartridge 308 is inserted into the disc drive (see FIG. 23). The concave portion 10*g* is not located at the center of thickness.

According to such a structure, only when a convex portion, provided for the disc drive, is fitted with this concave portion 10*g*, the disc cartridge 308 can be inserted into the disc drive correctly and the disc drive can operate normally.

Stated otherwise, even if one tries to insert the disc cartridge 308 into the disc drive upside down by mistake, he or she cannot insert the cartridge 308 into the disc drive. This is because the convex portion of the disc drive interferes with the opposite side surface with no concave portion 10*g*. Also, even if one tries to insert the disc cartridge 308 into the disc drive upside down and in the wrong way by mistake, he or she cannot insert the cartridge 308 into the disc drive, either. This is because the convex portion of the disc drive also interferes with the non-recessed portion of the side surface with the concave portion 10*g*. Thus, the erroneous insertion can be prevented.

The disc cartridge 308 of this embodiment may be modified in various manners.

For example, the thickness of the cartridge body 10 may be further reduced to such an extent that the stopper members 23 will not protrude from the upper surface 12*f* of the cartridge upper shell 12 (see FIG. 24) while the shutters 21 and 22 are closed. On the other hand, while the shutters 21 and 22 are opened, the stopper members 23 may be protruded from the upper surface 12*f* of the cartridge upper shell 12 in the following manner. Specifically, as the shutters 21 and 22 are going to be opened, the disk holding portions 21*a* and 22*a*, for example, may push the convex portions 23*a* of the stopper members 23 upward while passing under the stopper members 23. Then, the stopper members 23 are protruded from the upper surface 12*f* of the cartridge upper shell 12. According to such a structure, a sufficiently broad space can be allowed the disc 100 to rotate inside the disc storage portion 10*d* and yet the disc cartridge can have its thickness further reduced.

Also, the stopper members 23 may form integral parts of the cartridge body 10. In that case, the stopper members 23 may be able to be folded and unfolded.

Furthermore, the shutter springs 31 and 32 may apply an elastic force in such a direction as to open the shutters 21 and 22. If the shutters can operate almost completely synchronously by way of the interlocking mechanism, just one of the shutter springs 31 and 32 may be provided.

The locking protrusion portion 21*k* forms an integral part of the shutter 21. Alternatively, a locking lever, including a locking protrusion portion and a convex portion at the end thereof, may be connected to the cartridge body 10 via an elastic portion, and an associated concave portion may be provided for the shutter so that the convex and concave portions engage with each other. In that case, by pressing the locking protrusion portion through a locking hole of the cartridge body, these convex and concave portions may be disengaged from each other so as to allow the shutters to rotate freely. Optionally, the locking lever, as well as the shutter springs (i.e., elastic members), may be resin springs that form integral parts of the cartridge body 10.

Embodiment 9

Hereinafter, a disc cartridge 309 according to a ninth embodiment of the present invention will be described with reference to the drawings.

Figure 34:
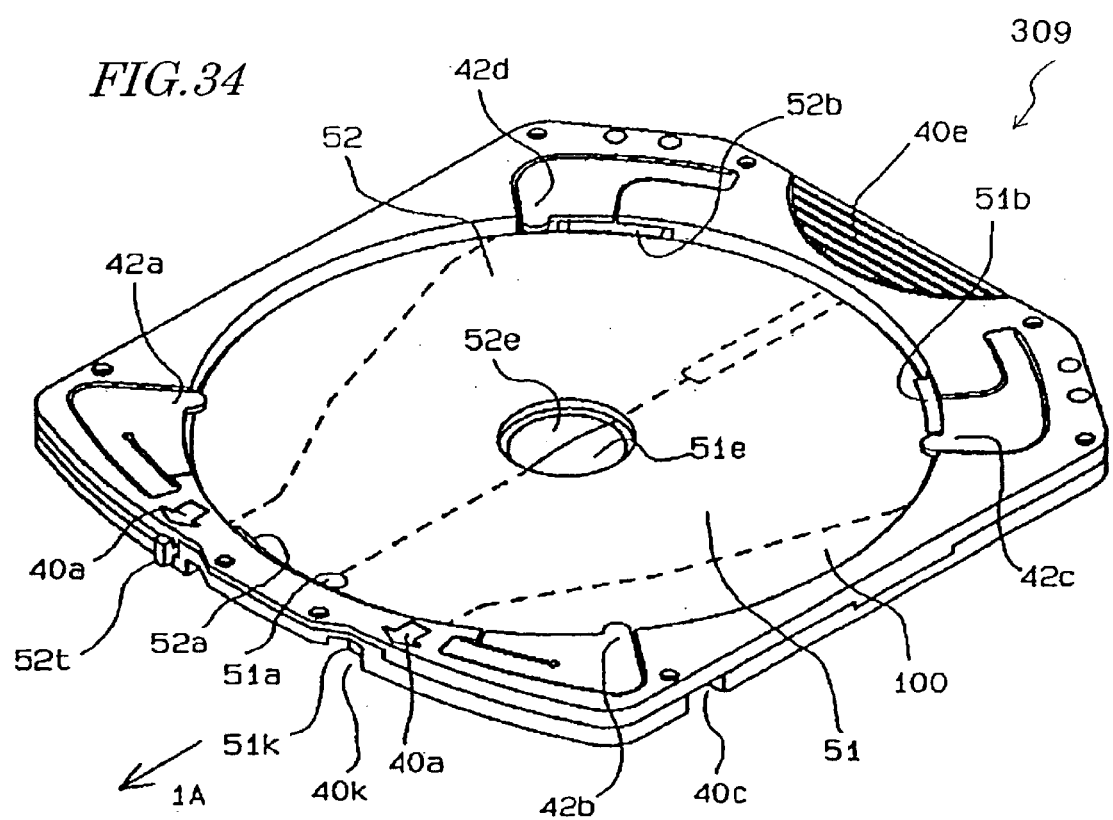
FIG. 34 is a perspective view illustrating an overall configuration for a disc cartridge according to a ninth embodiment of the present invention.
Figure 35:
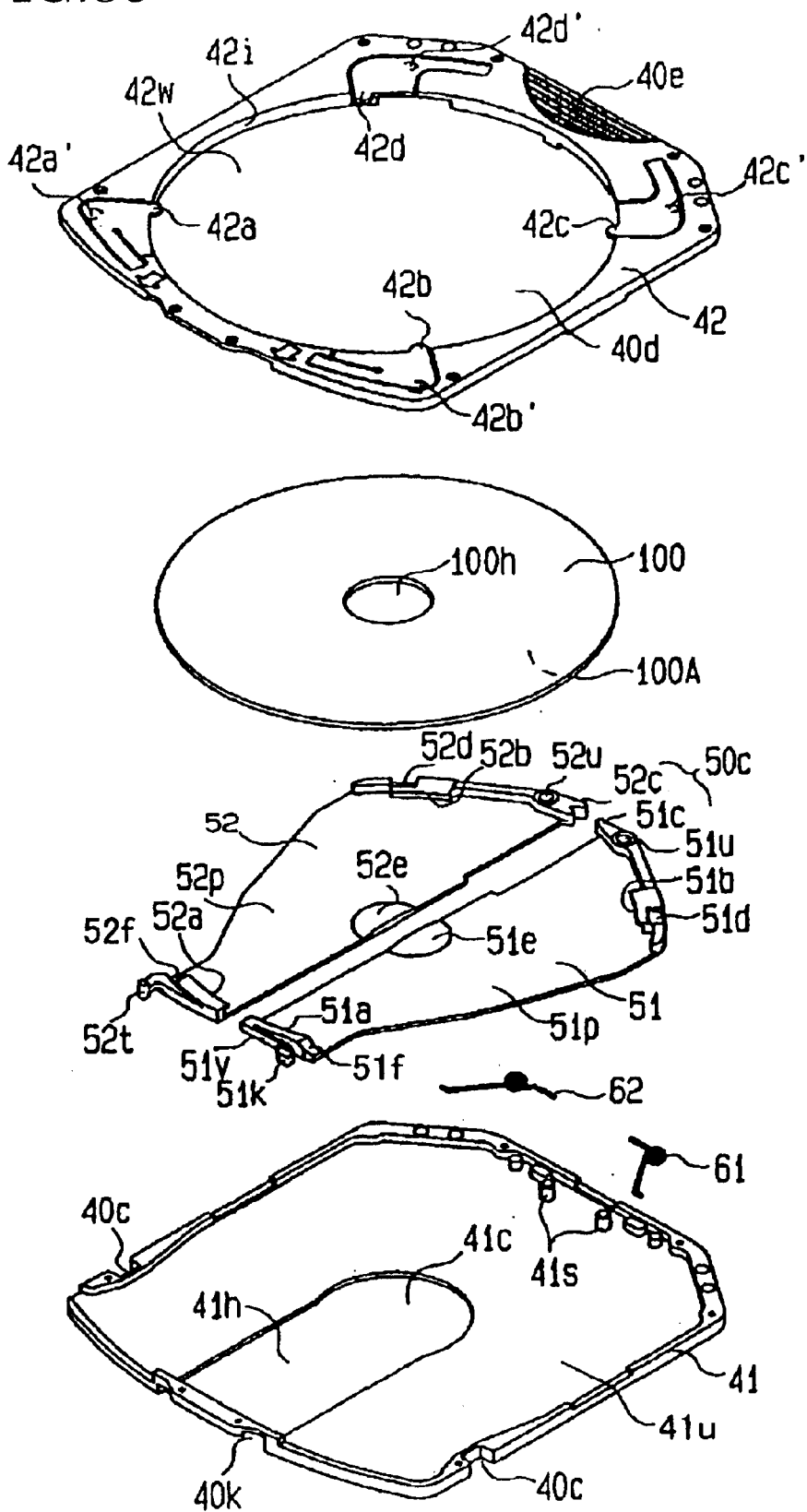
FIG. 35 is an exploded perspective view illustrating an exploded state of the disc cartridge shown in FIG. 34.

As shown in FIGS. 34 and 35, the disc cartridge 309 includes a cartridge lower shell 41, a cartridge upper shell 42, stopper members 42a, 42b, 42c and 42d, and a pair of shutters 51 and 52.

As shown in FIG. 35, the cartridge lower shell 41 includes a chucking opening 41c and a head opening 41h. The chucking opening 41c is provided to allow a chucking member (e.g., a spindle motor for rotating the disc 100) to enter the disc cartridge 309 externally. The head opening 41h is provided to allow a head, which reads and/or writes a signal from/on the signal recording side 100A of the disc 100, to enter the disc cartridge 309 and access the signal recording side 100A. The cartridge lower shell 41 faces the signal recording side 100A of the disc 100. Also, the head opening 41h reaches one side surface of the cartridge lower shell 41.

The cartridge upper shell 42 includes a circular disc window 42w, through which the disc 100 can be introduced and removed into/from the disc cartridge 309 and which expands over the entire projection area of the disc 100 to expose the upper surface of the disc. The cartridge upper and lower shells 42 and 41 are adhered or welded together at their outer periphery, thereby forming a cartridge body 40.

A disc storage portion 40d for storing the disc 100 therein is defined by a first inner surface 41u of the cartridge lower shell 41 and a second inner surface 42i of the cartridge upper shell 42. The first inner surface 41u is opposed to the signal recording side 100A of the disc 100, while the second inner surface 42i has a substantially cylindrical shape and defines the disc window 42w inside. That is to say, the first inner surface 41u becomes the bottom of the disc storage portion 40d.

In the disc storage portion 40d, a gap, which is wide enough to allow the disc 100 to rotate freely, is provided between the second inner surface 42i and the disc 100. Also, the top of the disc storage portion 40d is the disc window 42w so that the disc 100 stored in the disc storage portion 40d has one side thereof exposed inside the disc window 42w.

The stopper members 42a, 42b, 42c and 42d form integral parts of the cartridge upper shell 42 so as to partially protrude into the disc window 42w. Each of these stopper members 42a, 42b, 42c and 42d is separated from the cartridge upper shell 42 via a slit. These stopper members 42a, 42b, 42c and 42d are used to prevent the disc 100 from dropping down from the disc window 42w. The stopper members 42a, 42b, 42c and 42d can prevent the dropping particularly effectively when the disc cartridge is vertically loaded into a disc drive and used. Optionally, these stopper members 42a, 42b, 42c and 42d may be integrated with the cartridge upper shell 42 by way of elastic members.

The shutters 51 and 52 are disposed between the signal recording side 100A of the disc 100 and the inner surface 41u of the disc storage portion 40d. The shutters 51 and 52 include rotation holes 51u and 52u, respectively. These rotation holes 51u and 52u are engaged in a freely rotatable state with a pair of rotation shafts 41s, which is located outside of the disc storage portion 40d of the cartridge body 40 and opposite to the head opening 41h. Thus, the shutters 51 and 52 rotate on the rotation shafts 41s in such a manner as to expose or cover the chucking and head openings 41c and 41h.

A cam 51c and a follower 52c are provided near the rotation holes 51u and 52u of the shutters 51 and 52, respectively. The cam 51c and the follower 52c have mutually engaging shapes and together make up an interlocking mechanism 50c for opening and closing the shutters 51 and 52 while interlocking them with each other.

The respective surfaces of the shutters 51 and 52, which are opposed to the signal recording side 100A of the disc, are covered with protective layers 51p and 52p for the purpose of preventing the disc 100 from getting scratched or any dust from reaching the signal recording side 100A thereof.

The protective layers 51p and 52p may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 51p and 52p.

Shutter springs 61 and 62 are provided outside of the disc storage portion 40d for the shutters 51 and 52, respectively. These springs 61 and 62 apply an elastic force to the shutters 51 and 52 in such a direction as to close the shutters 51 and 52. Alternatively, the shutter springs 61 and 62 may apply an elastic force to the shutters 51 and 52 in such a direction as to open the shutters 51 and 52. Also, if the shutters can operate almost completely synchronously by way of the interlocking mechanism, only one of the shutter springs 61 and 62 may be provided.

As in the eighth embodiment, the shutters 51 and 52 include disc holding portions 51a, 51b, 52a and 52b at the ends thereof as shown in FIG. 35. Furthermore, as will be described in detail later, convex portions 51e and 52e are provided on respective regions of the shutters 51 and 52 so as to be located under the center hole of the disc 100.

As shown in FIG. 34, the upper surface of the cartridge body 40 (or the cartridge upper shell 42) has embossed arrow marks (or concave portions) 40a that indicate the direction (the arrow 1A) in which the disc cartridge 309 is inserted into a disc drive. The cartridge body 40 further includes two concave portions 40c on a pair of its side surfaces that are parallel to the inserting direction 1A. These concave portions 40c may be used as either pull-in notches or positioning recesses when the disc cartridge 309 is loaded into a disk drive or when the cartridge 309 is stored in a changer. Optionally, just one side surface of the cartridge 309 may include the concave portion 40c. In that case, the concave portion 40c may be used as a mechanism for preventing erroneous (e.g., upside down) insertion when the disc cartridge 309 is inserted or loaded into a disk drive. The upper surface of the cartridge body 40 further includes a grip portion 40e that allows the operator to grip this disc cartridge 309. This grip portion 40e has an antislip embossed shape.

Figure 36:
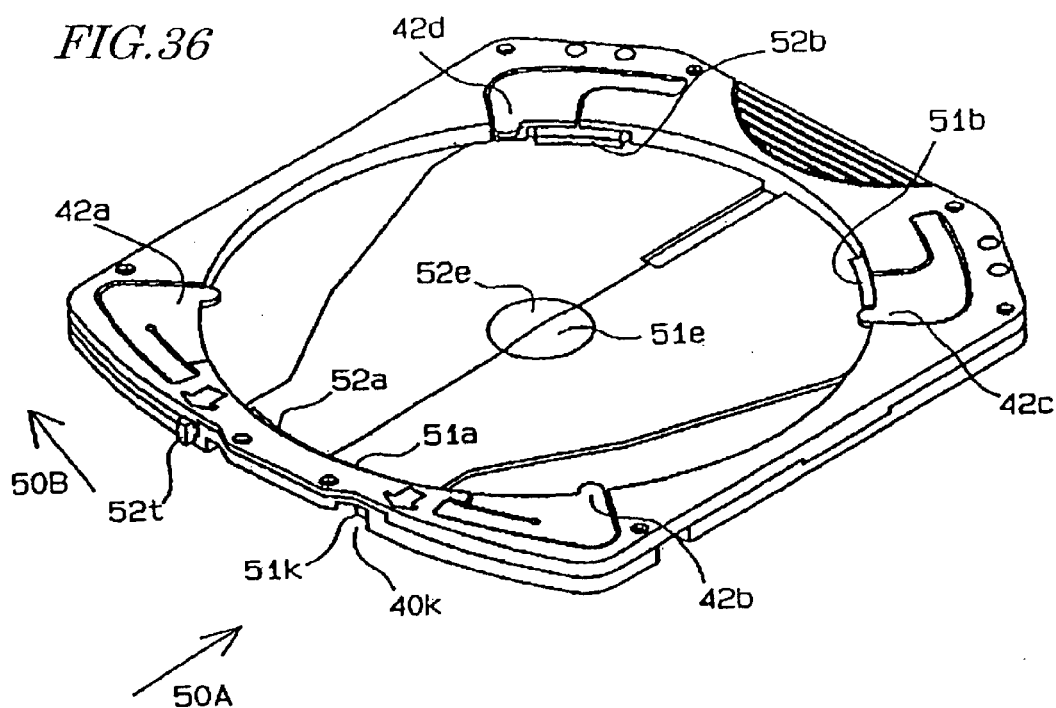
FIG. 36 is a perspective view illustrating a state of the disc cartridge shown in FIG. 34 in which its shutters are closed with the disc removed.
Figure 37:
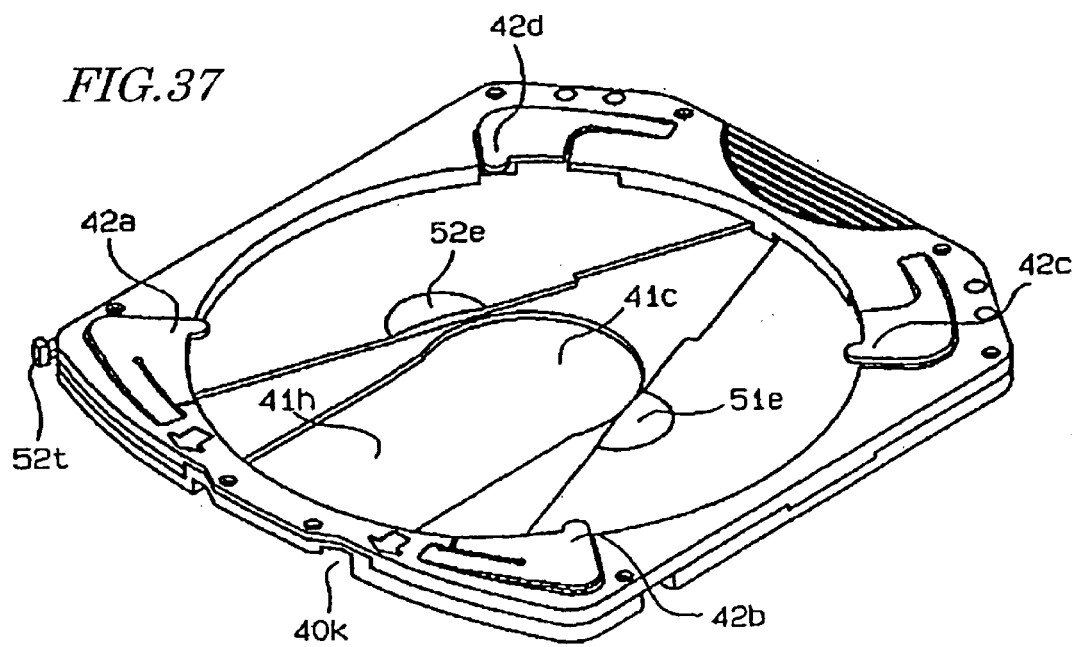
FIG. 37 is a perspective view illustrating a state of the disc cartridge shown in FIG. 34 in which its shutters are opened with the disc removed.

FIG. 36 is a perspective view illustrating a state where the shutters 51 and 52 cover the chucking opening 41c and the head opening 41h with the disc 100 removed. FIG. 37 is a perspective view illustrating a state where the shutters 51 and 52 expose the chucking opening 41c and the head opening 41h with the disc 100 removed.

Hereinafter, the structure and the operation of the shutters 51 and 52 will be described in further detail. As shown in FIGS. 34 and 35, the disc holding portions 51*a*, 51*b*, 52*a* and 52*b* provided for the shutters 51 and 52 also have such a shape as including a slope that tilts in such a manner as to overhang the projection area of the disc and to overlap with the outer periphery of the disc 100 as in the eighth embodiment. That is to say, the slope is downwardly tapered and leans toward the disc 100. Thus, the same effects as those of the eighth embodiment are also achieved.

Also, the shutter 52 includes an opening/closing portion 52*t* for use to open and close the shutters externally, while the shutter 51 includes an elastic portion 51*v* and a locking protrusion portion 51*k* as integral parts thereof. The locking protrusion portion 51*k* is connected to the shutter 51 by way of the elastic portion 51*v*. Thus, while the chucking and head openings 41*c* and 41*h* are covered with the shutters 51 and 52, the locking protrusion portion 51*k*, to which an elastic force is applied from the elastic portion 51*v*, engages with a locking hole 40*k* of the cartridge body 40, thereby fixing and supporting the shutter 51 in a non-rotatable state to the cartridge body 40. When the shutter 51 is fixed, the other shutter 52, which is interlocked with the shutter 51 via the interlocking mechanism 50*c*, is also fixed.

Accordingly, only by getting the locking protrusion portion 51*k* pressed externally by a protrusion, for example, in the direction indicated by the arrow 50A and disengaged from the locking hole 40*k* while pressing the opening/closing portion 52*t* in the direction indicated by the arrow 50B at the same time as shown in FIG. 36, the shutters 51 and 52 can be rotated to expose the chucking and head openings 41*c* and 41*h* and the disc 100 can be released from the disc holding portions 51*a*, 51*b*, 52*a* and 52*b*. Thus, it is possible to prevent the operator from removing the disc 100 accidentally.

Also, unlike the eighth embodiment, the locking protrusion portion 51*k* and the opening/closing portion 52*t* are provided for the two different shutters 51 and 52. Such a structure is particularly effective for a disc cartridge for a disc of a small diameter. This is because a disc cartridge for a disc of a small diameter and the shutters thereof should have relatively small sizes and it is normally difficult to provide the locking protrusion portion and opening/closing portion for a single shutter out of design considerations. Also, even when a single shutter can include both the locking protrusion portion and the opening/closing portion, a very narrow gap would be allowed between a shutter opening/closing mechanism and an unlocking mechanism on the disc drive side or these two mechanisms need to be provided within a very limited space, thus making it hard to design the disc drive as intended.

The locking protrusion portion 51*k* forms an integral part of the shutter 51. Alternatively, a locking lever, including a locking protrusion portion and a convex portion at the end thereof, may be connected to the cartridge body 40 by way of an elastic portion, and an associated concave portion may be provided for the shutter so that the convex and concave portions engage with each other. In that case, by pressing the locking protrusion portion through a locking hole of the cartridge body, these convex and concave portions may be disengaged from each other so as to allow the shutters to rotate freely. Optionally, in that case, the locking lever, as well as the shutter springs (i.e., elastic members), may be resin springs that form integral parts of the cartridge body 40.

Figure 38:
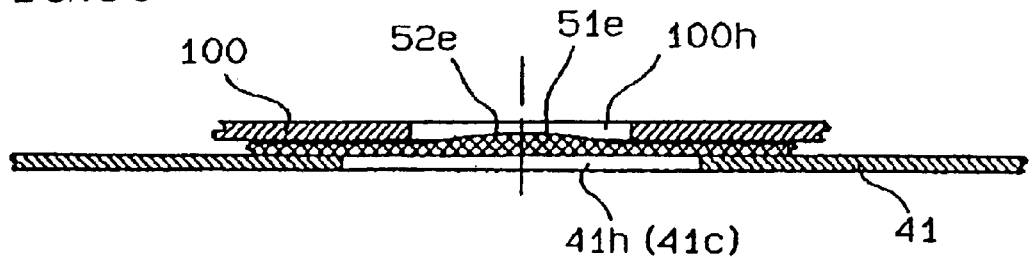
FIG. 38 is a partial cross-sectional view illustrating a cross section of the disc cartridge shown in FIG. 34 that passes the center of the disc to show a state where its shutters are closed.

Next, it will be described how the convex portions 51*e* and 52*e* on the shutters 51 and 52 work. FIG. 38 is a cross-sectional view illustrating the center of the disc and its surrounding portions as viewed along a plane that passes the center of the disc 100. As shown in FIG. 38, while the shutters 51 and 52 are closed, the convex portions 51*e* and 52*e* protrude into the center hole 100*h* and the disc 100 is now in plane contact with the shutters 51 and 52.

Figure 39:
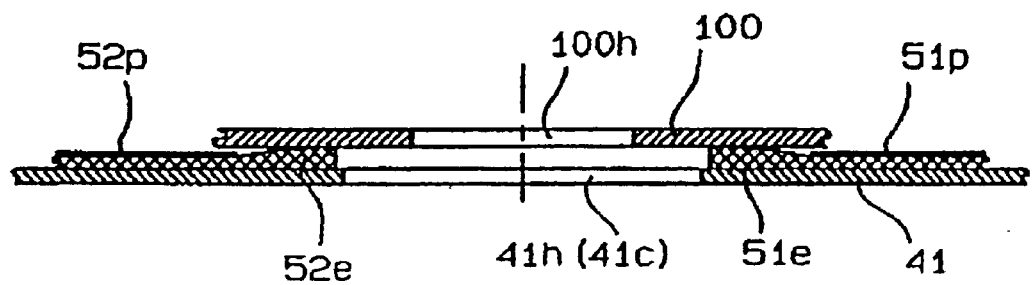
FIG. 39 is a partial cross-sectional view illustrating a cross section of the disc cartridge shown in FIG. 34 that passes the center of the disc to show a state where its shutters are opened.

As shown in FIG. 39, while the shutters 51 and 52 are going to be opened, the convex portions 51*e* and 52*e* slide from inside the center hole 100*h* into under the lower surface of the disc 100, thereby lifting the disc 100 and bringing the disc 100 out of plane contact with the shutters 51 and 52. In this manner, while the shutters 51 and 52 are going to be opened or closed, the signal recording side 100A will not get scratched by the shutters 51 and 52. Also, it is inside the signal recording area of the signal recording side 100A that the convex portions 51*e* and 52*e* move along with the shutters 51 and 52 being opened or closed. Accordingly, the convex portions 51*e* and 52*e* never contact with, or scratch, the signal recording area.

Figure 40:
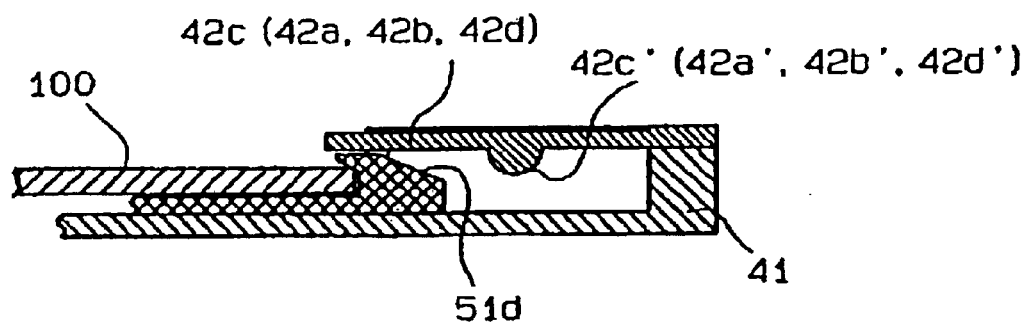
FIG. 40 is a cross-sectional view illustrating a disc outer peripheral cross section of the disc cartridge shown in FIG. 34 that passes the center of the disc to show a state where its shutters are closed.

Next, the structure and operation of the stopper members will be described with reference to FIGS. 40 and 41. FIG. 40 is a cross-sectional view illustrating a portion surrounding the disc outer periphery as viewed along a plane that passes the center of the disc 100. A convex portion 42*c*', (42*a*', 42*b*' or 42*d*') has been formed on the bottom of the stopper member 42*c*, (42*a*, 42*b* or 42*d*). While the shutters 51 and 52 are closed, the stopper member 42*c* is substantially parallel to the disc 100 and falls within the thickness of the cartridge 309 as shown in FIG. 40. An appearance of the disc cartridge 309 in such a state is illustrated in FIG. 36.

Figure 41:
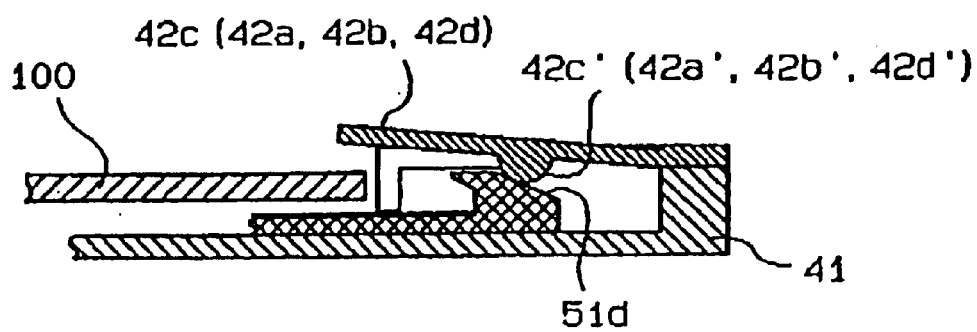
FIG. 41 is a cross-sectional view illustrating a disc outer peripheral cross section of the disc cartridge shown in FIG. 34 that passes the center of the disc to show a state where its shutters are opened.

On the other hand, while the shutters 51 and 52 are opened, the slope portions 52*f*, 51*f*, 51*d* and 52*d* of the shutters 51 and 52 contact with the convex portions 42*a*', 42*b*', 42*c*' and or 42*d*', respectively, thereby lifting the stopper members 42*a*, 42*b*, 42*c* and 42*d* to above the disc 100 as shown in FIG. 41. An appearance of the disc cartridge 309 in such a state is illustrated in FIG. 37. By using such a structure, particularly in an interval after the disc cartridge 309 has been vertically loaded into a disc drive and before the disc 100 gets chucked, it is possible to prevent the disc 100 from dropping down from the cartridge 309. In addition, while the disc 100 is being chucked, the disc 100 can move in a broader space. Furthermore, this structure also contributes to further reducing the thickness of the cartridge body.

It should be noted that to keep the shutters 51 and 52 temporarily opened for a while, the slope portion 52*f*, (51*f*, 51*d* or 52*d*) may have a convex or concave portion that engages with the convex portion 42*a*', (42*b*', 42*c*' or 42*d*').

Embodiment 10

Hereinafter, a disc cartridge 310 according to a tenth embodiment of the present invention will be described with reference to the drawings. The disc cartridge 310 of this embodiment is mainly characterized in that stopper members are provided for the shutters.

Figure 42:
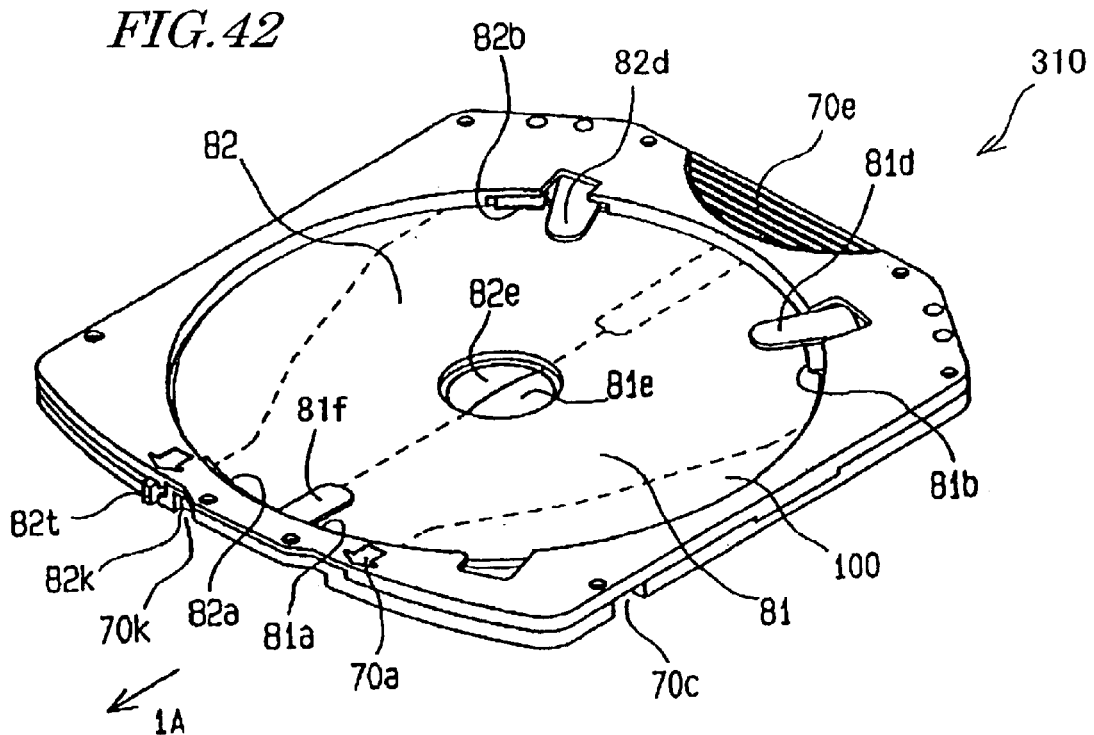
FIG. 42 is a perspective view illustrating an overall configuration for a disc cartridge according to a tenth embodiment of the present invention.
Figure 43:
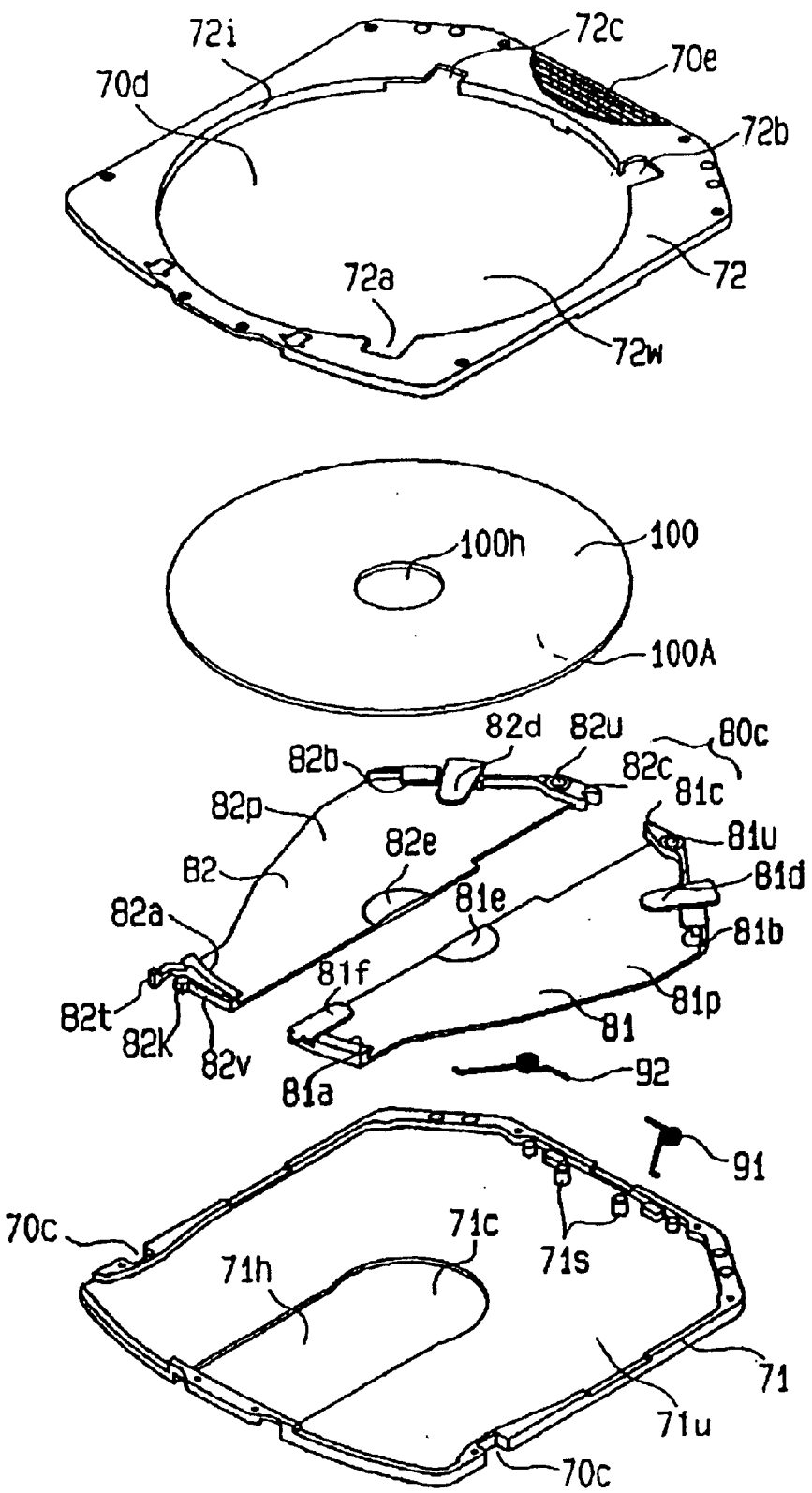
FIG. 43 is an exploded perspective view illustrating an exploded state of the disc cartridge shown in FIG. 42.

As shown in FIGS. 42 and 43, the disc cartridge 310 includes a cartridge lower shell 71, a cartridge upper shell 72, stopper members 81*d*, 81*f* and 82*d*, and a pair of shutters 81 and 82.

As shown in FIG. 43, the cartridge lower shell 71 includes a chucking opening 71*c* and a head opening 71*h*. The chucking opening 71*c* is provided to allow a chucking member (e.g., a spindle motor for rotating the disc 100) to enter the disc cartridge 310 externally. The head opening 71*h* is provided to allow a head, which reads and/or writes a signal from/on the signal recording side 100A of the disc 100, to enter the disc cartridge 310 and access the signal recording side 100A. The cartridge lower shell 71 faces the signal recording side 100A of the disc 100. Also, the head opening 71*h* reaches one side surface of the cartridge lower shell 71.

The cartridge upper shell 72 includes a circular disc window 72w, through which the disc 100 can be introduced and removed into/from the disc cartridge 310 and which expands over the entire projection area of the disc 100 to expose the upper surface of the disc 100. The cartridge upper and lower shells 72 and 71 are adhered or welded together at their outer periphery, thereby forming a cartridge body 70.

A disc storage portion 70d for storing the disc 100 therein is defined by a first inner surface 71u of the cartridge lower shell 71 and a second inner surface 72i of the cartridge upper shell 72. The first inner surface 71u is opposed to the signal recording side 100A of the disc 100, while the second inner surface 72i has a substantially cylindrical shape and defines the disc window 72w inside. That is to say, the first inner surface 71u becomes the bottom of the disc storage portion 70d.

In the disc storage portion 70d, a gap, which is wide enough to allow the disc 100 to rotate freely, is provided between the second inner surface 72i and the disc 100. Also, the top of the disc storage portion 70d is the disc window 72w so that the disc 100 stored in the disc storage portion 70d has one side thereof exposed inside the disc window 72w.

The shutters 81 and 82 are disposed between the signal recording side 100A of the disc 100 and the inner surface 71u of the disc storage portion 70d. The shutters 81 and 82 include rotation holes 81u and 82u, respectively. These rotation holes 81u and 82u are engaged in a freely rotatable state with a pair of rotation shafts 71s, which is located outside of the disc storage portion 70d of the cartridge body 70 and opposite to the head opening 71h. Thus, the shutters 81 and 82 rotate on the rotation shafts 71s in such a manner as to expose or cover the chucking and head openings 71c and 71h.

A cam 81c and a follower 82c are provided near the rotation holes 81u and 82u of the shutters 81 and 82, respectively. The cam 81c and the follower 82c have mutually engaging shapes and together make up an interlocking mechanism 80c for opening and closing the shutters 81 and 82 while interlocking them with each other.

The respective surfaces of the shutters 81 and 82, which are opposed to the signal recording side 100A of the disc, are covered with protective layers 81p and 82p for the purpose of preventing the disc 100 from getting scratched or any dust from entering the signal recording side 100A thereof.

The protective layers 81p and 82p may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 81p and 82p.

Shutter springs 91 and 92 are provided outside of the disc storage portion 70d for the shutters 81 and 82, respectively. These springs 91 and 92 apply an elastic force to the shutters 81 and 82 in such a direction as to close the shutters 81 and 82. Alternatively, the shutter springs 91 and 92 may apply an elastic force to the shutters 81 and 82 in such a direction as to open the shutters 81 and 82. Also, if the shutters can operate almost completely synchronously by way of the interlocking mechanism, only one of the shutter springs 91 and 92 may be provided.

As in the eighth embodiment, the shutters 81 and 82 include disc holding portions 81a, 81b, 82a and 82b at the ends thereof as shown in FIG. 43. Convex portions 81e and 82e are also formed on the shutters 81 and 82, respectively.

Furthermore, as will be described in detail later, the stopper members 81f, 81d and 82d are provided as integral parts of the shutters 81 and 82 near the disc holding portions 81a, 81b and 82b of the shutters 81 and 82, respectively. Alternatively, these stopper members 81f, 81d and 82d may be integrated with the shutters 81 and 82 by way of elastic members.

As shown in FIG. 42, the upper surface of the cartridge body 70 (or the cartridge upper shell 72) has embossed arrow marks (or concave portions) 70a that indicate the direction (the arrow 1A) in which this disc cartridge 310 should be inserted into a disc drive. The cartridge body 70 further includes two concave portions 70c on a pair of its side surfaces that are parallel to the inserting direction 1A. These concave portions 70c may be used as either pull-in notches or positioning recesses when the disc cartridge 310 is loaded into a disk drive or when the cartridge 310 is stored in a changer. Optionally, just one side surface of the cartridge 310 may include the concave portion 70c. In that case, the concave portion 70c may be used as a mechanism for preventing erroneous (e.g., upside down) insertion when the disc cartridge 310 is inserted or loaded into a disk drive. The upper surface of the cartridge body 70 further includes a grip portion 70e that allows the operator to grip the cartridge 310. This grip portion 70e has an antislip embossed shape.

Figure 44:
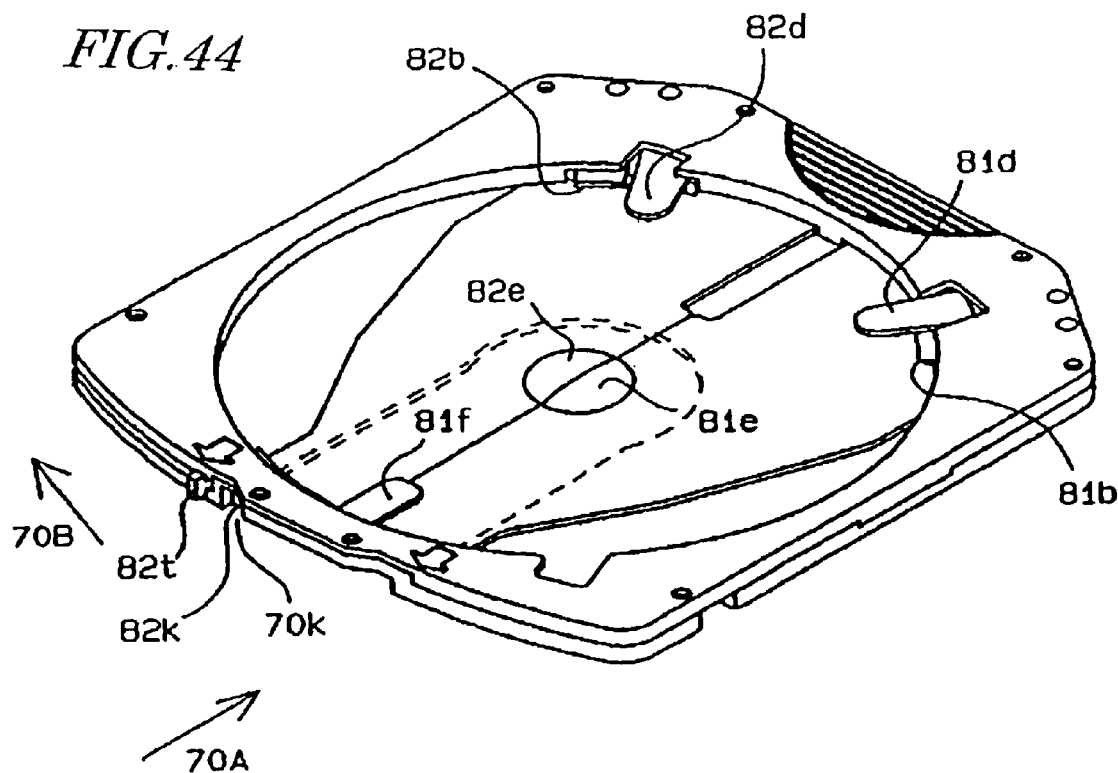
FIG. 44 is a perspective view illustrating a state of the disc cartridge shown in FIG. 42 in which its shutters are closed with the disc removed.
Figure 45:
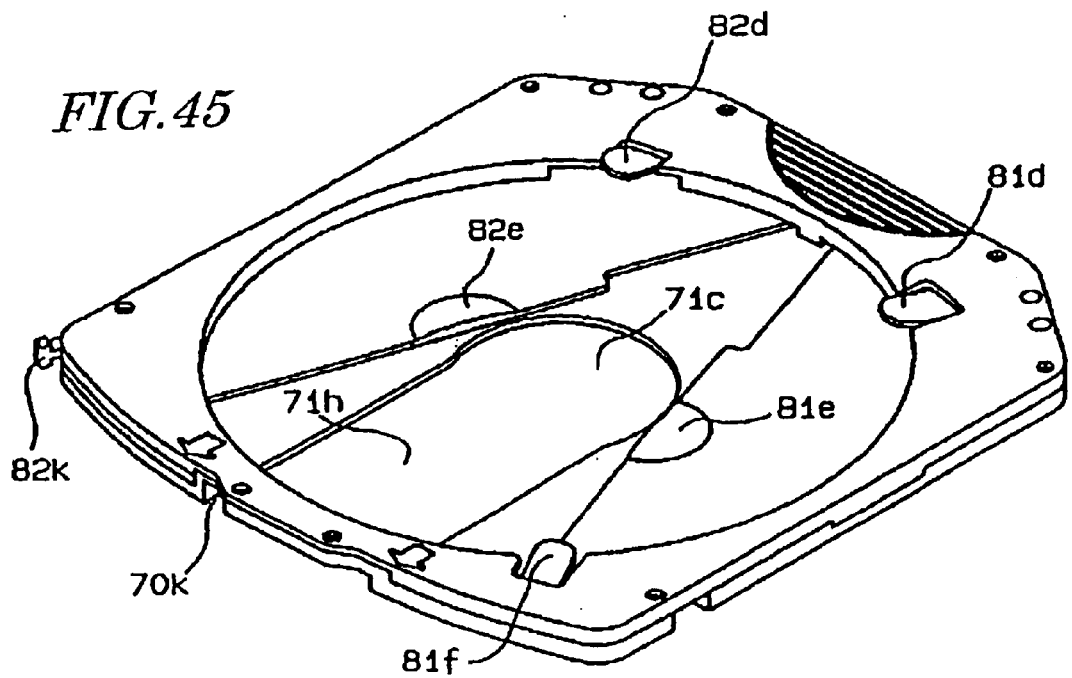
FIG. 45 is a perspective view illustrating a state of the disc cartridge shown in FIG. 42 in which its shutters are opened with the disc removed.

FIG. 44 is a perspective view illustrating a state where the shutters 81 and 82 cover the chucking opening 71c and the head opening 71h with the disc 100 removed. FIG. 45 is a perspective view illustrating a state where the shutters 81 and 82 expose the chucking opening 71c and the head opening 71h with the disc 100 removed.

Hereinafter, the structure and the operation of the shutters 81 and 82 will be described in further detail. As shown in FIGS. 42 and 43, the disc holding portions 81a, 81b, 82a and 82b provided for the shutters 81 and 82 have such a shape as including a slope that tilts in such a manner as to overhang the projection area of the disc and to overlap with the outer periphery of the disc 100 as in the eighth embodiment. That is to say, the slope is downwardly tapered and leans toward the disc 100. Thus, the same effects as those of the eighth embodiment are also achieved.

Also, the shutter 82 includes an opening/closing portion 82t for use to open and close the shutters externally, an elastic portion 82v and a locking protrusion portion 82k as integral parts thereof. The locking protrusion portion 82k is connected to the shutter 82 by way of the elastic portion 82v. Thus, while the chucking and head openings 71c and 71h are covered with the shutters 81 and 82, the locking protrusion portion 82k, to which an elastic force is applied from the elastic portion 82v, engages with a locking hole 70k of the cartridge body 70 as shown in FIG. 44, thereby fixing and supporting the shutter 82 in a non-rotatable state to the cartridge body 70. When the shutter 82 is fixed, the other shutter 82, which is interlocked with the shutter 82 via the interlocking mechanism 80c, is also fixed.

Accordingly, only by getting the locking protrusion portion 82k pressed externally by a protrusion, for example, in the direction indicated by the arrow 70A and disengaged from the locking hole 70k while pressing the opening/closing portion 82t in the direction indicated by the arrow 70B at the same time as shown in FIG. 44, the shutters 81 and 82 can be rotated to expose the chucking and head openings 71c and 71h and the disc 100 can be released from the disc holding portions 81a, 81b, 82a and 82b. Thus, it is possible to prevent the operator from removing the disc accidentally.

The locking protrusion portion 82k forms an integral part of the shutter 82. Alternatively, a locking lever, including a locking protrusion portion and a convex portion at the end thereof, may be connected to the cartridge body 70 by way of an elastic portion, and a concave portion may be provided for the shutter so that the convex and concave portions engage with each other. In that case, by pressing the locking protrusion portion through a locking hole of the cartridge body, these convex and concave portions may be disengaged from each other so as to allow the shutters to rotate freely. Optionally, in that case, the locking lever, as well as the shutter springs (i.e., elastic members), may be resin springs that form integral parts of the cartridge body 70.

Figure 46:
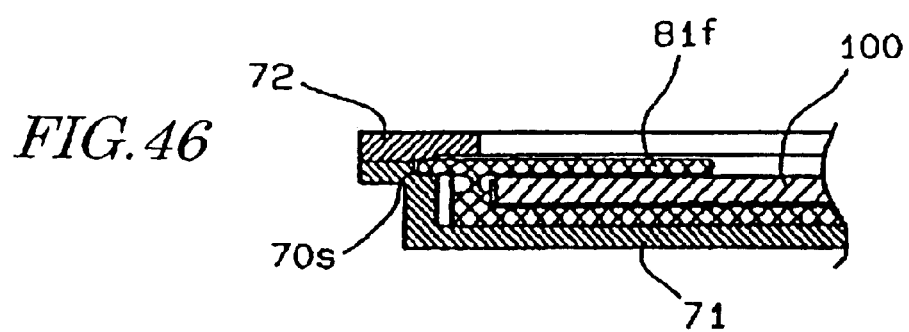
FIG. 46 is a partial cross-sectional view illustrating a cross section of the disc cartridge shown in FIG. 42 that passes the center of the disc to show a state where its shutters are closed.
Figure 48:
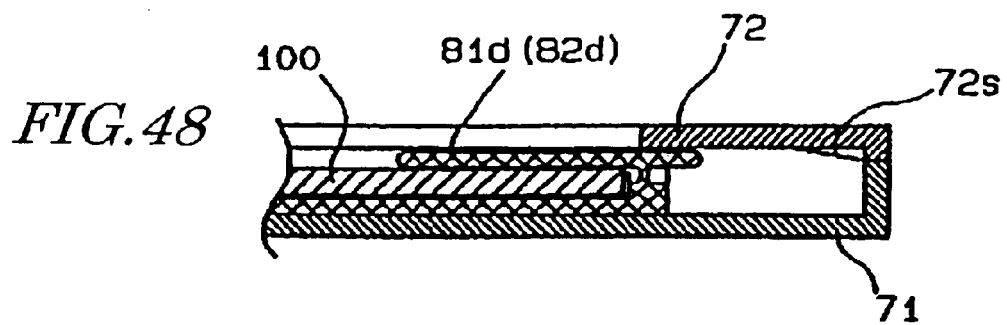
FIG. 48 is a cross-sectional view illustrating a disc outer peripheral cross section of the disc cartridge shown in FIG. 42 that passes the center of the disc to show a state where its shutters are closed.

Next, the structure and operation of the stopper members 81*f*, 81*d* and 82*d* will be described in further detail. While the shutters 81 and 82 are closed, the stopper members 81*f*, 81*d* and 82*d* are substantially parallel to the disc 100 and do not protrude from the upper surface of the disc cartridge 310 as shown in FIGS. 46 and 48. An appearance of the disc cartridge 310 in such a state is illustrated in FIG. 44.

Figure 47:
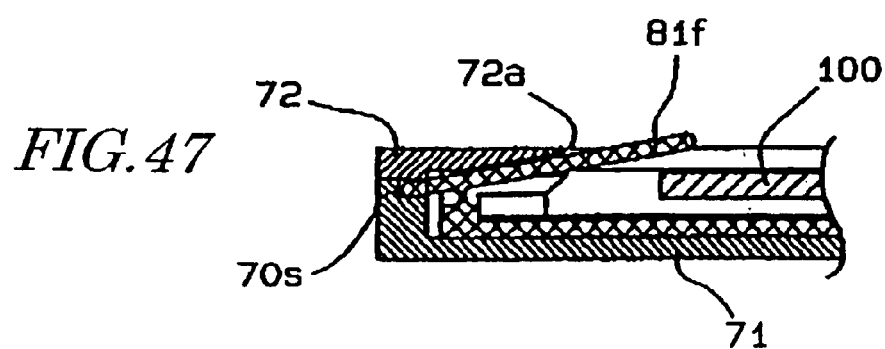
FIG. 47 is a partial cross-sectional view illustrating a cross section of the disc cartridge shown in FIG. 42 that passes the center of the disc to show a state where its shutters are opened.
Figure 49:
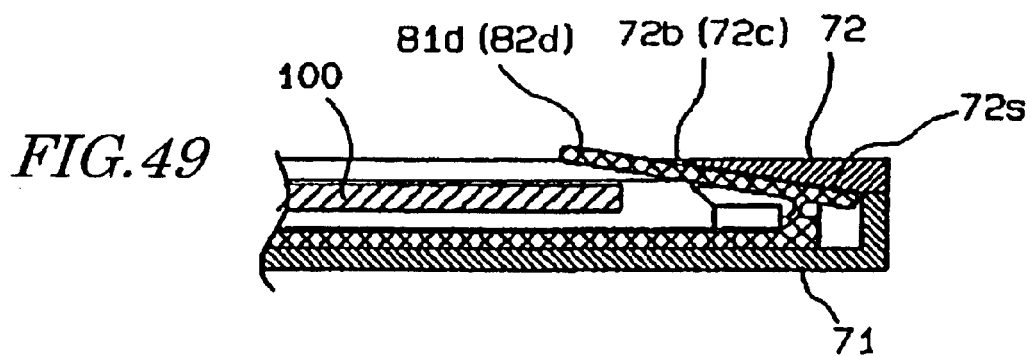
FIG. 49 is a cross-sectional view illustrating a disc outer peripheral cross section of the disc cartridge shown in FIG. 42 that passes the center of the disc to show a state where its shutters are opened.

On the other hand, while the shutters 81 and 82 are going to be opened, the stopper members 81*f*, 81*d* and 82*d* are guided by a slit 70*s* and a sloped portion 72*s* of the cartridge body 70 so as to be lifted to above the disc 100 as shown in FIGS. 47 and 49. The slit 70*s* is formed in the inner sidewall portion of the cartridge body 70, while the sloped portion 72*s* is formed on the inner upper wall of the cartridge body 70. Also, the cartridge upper shell 72 is provided with notched portions 72*a*, 72*b* and 72*c* so as not to interfere with the stopper members 81*f*, 81*d* and 82*d* that have been lifted up. An appearance of the disc cartridge 310 in such a state is illustrated in FIG. 45.

While the shutters 81 and 82 are closed, the stopper members 81*f*, 81*d* and 82*d* overhang the projection area of the disc 100 and are located over the disc 100. Thus, the stopper members 81*f*, 81*d* and 82*d* press the disc 100 against the shutters 81 and 82 in the thickness direction, thereby holding the disc 100 thereon. Accordingly, the disc holding portions 81*a*, 81*b*, 82*a* and 82*b* may be omitted from the shutters 81 and 82.

According to such a structure, particularly in an interval after the disc cartridge 310 has been vertically loaded into a disc drive and before the disc 100 gets chucked, it is possible to prevent the disc 100 from dropping down from the disc cartridge 310. In addition, while the disc 100 is being chucked, the disc 100 can move in a broader space. Furthermore, this structure also contributes to further reducing the thickness of the cartridge body.

Embodiment 11

Hereinafter, a disc cartridge 311 according to an eleventh embodiment of the present invention will be described with reference to the drawings.

Figure 50:
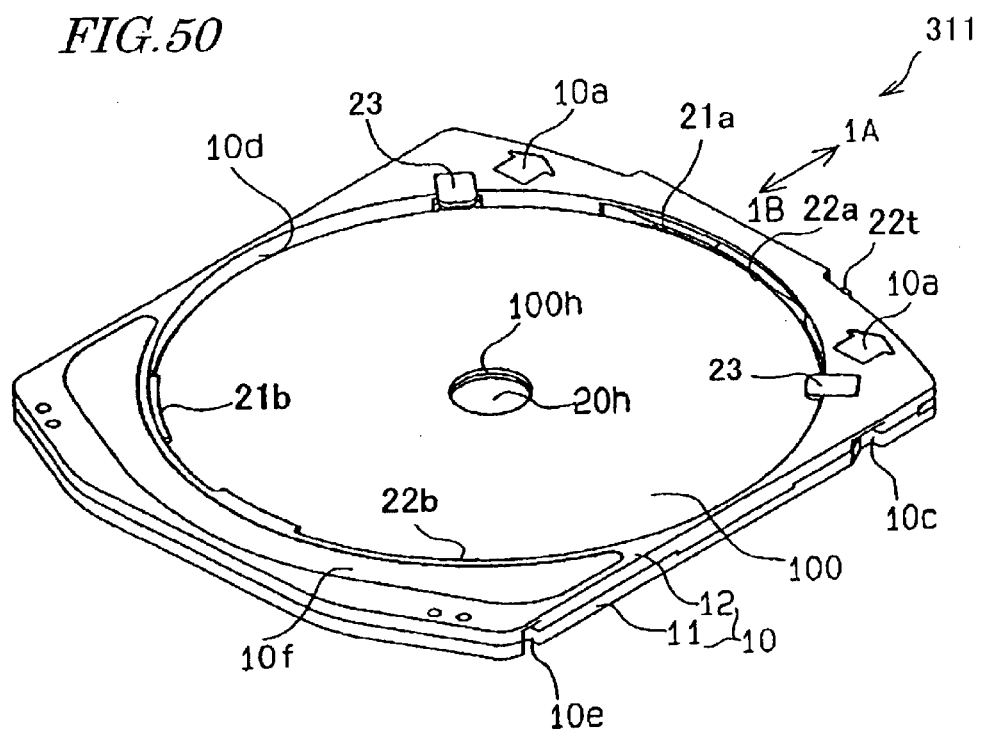
FIG. 50 is a perspective view illustrating an overall configuration for a disc cartridge according to an eleventh embodiment of the present invention.
Figure 51:
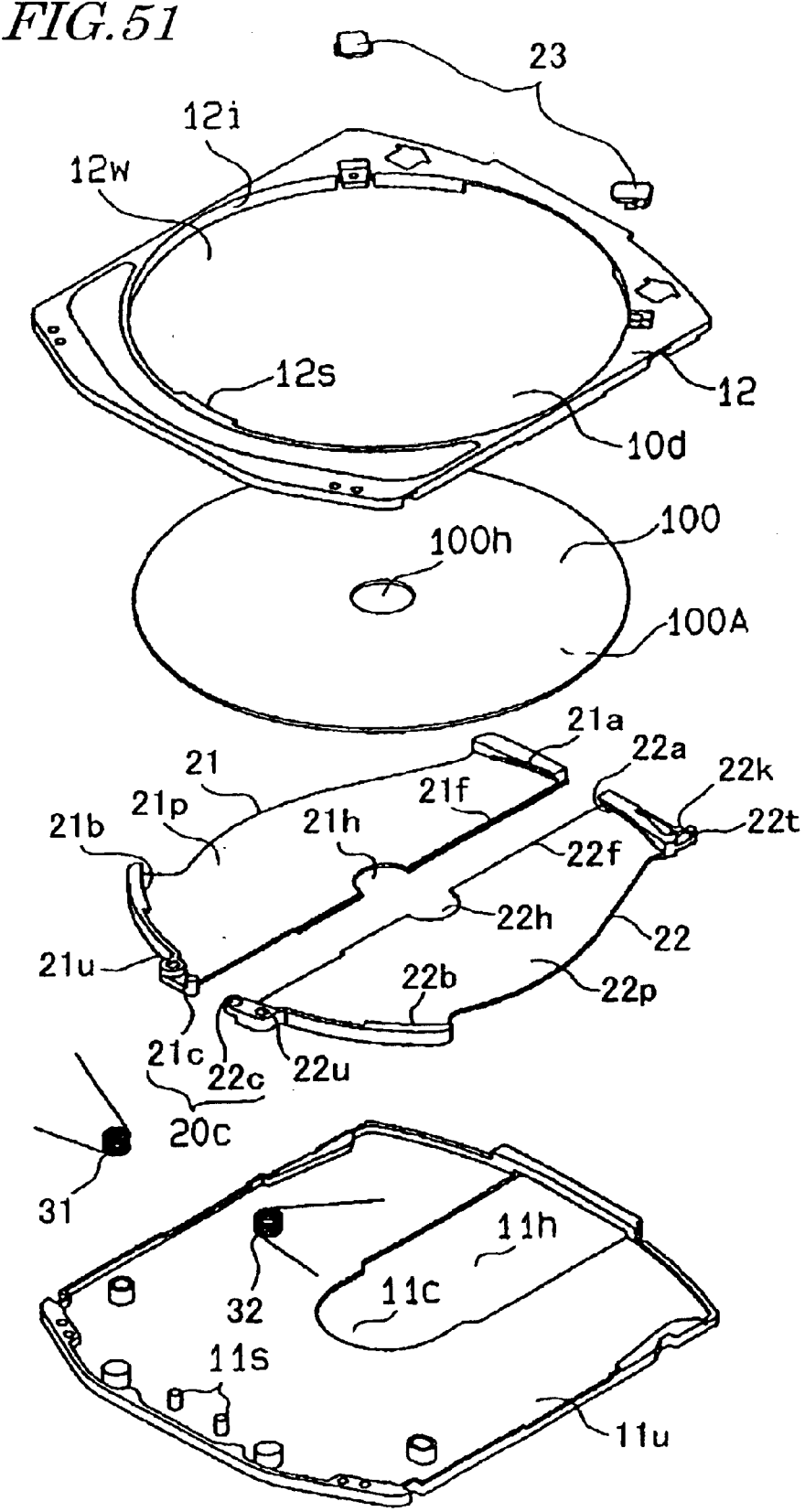
FIG. 51 is an exploded perspective view illustrating an exploded state of the disc cartridge shown in FIG. 50.
Figure 52:
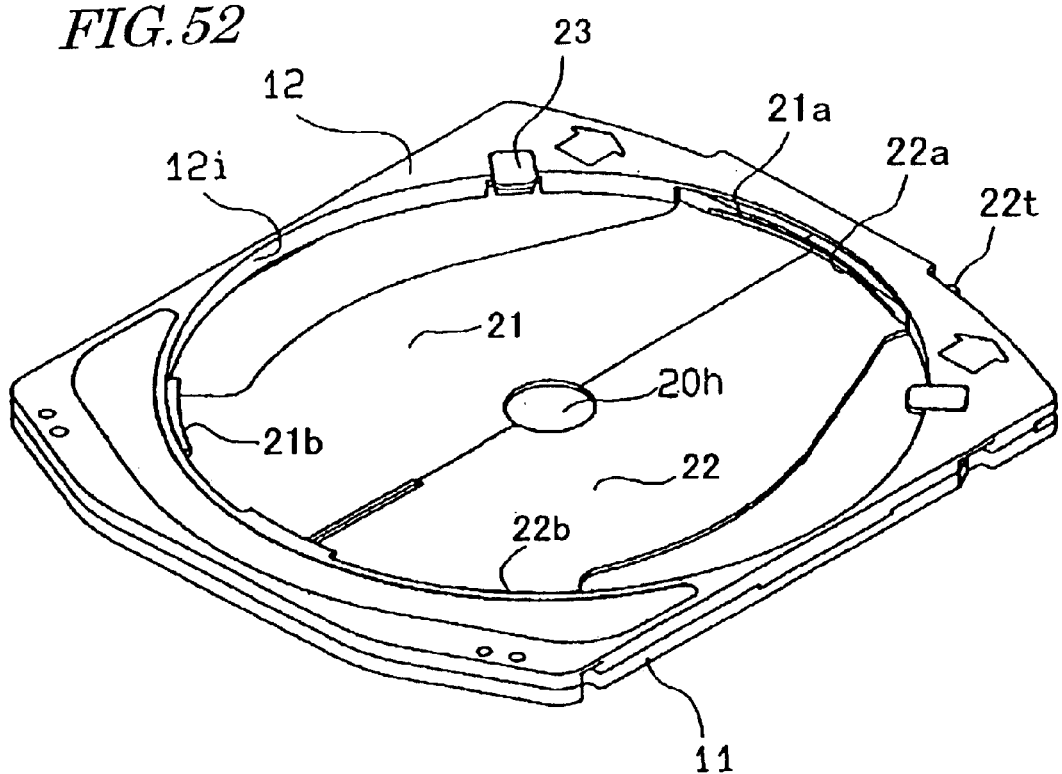
FIG. 52 is a perspective view illustrating a state of the disc cartridge shown in FIG. 50 in which its shutters are closed with the disc removed.
Figure 53:
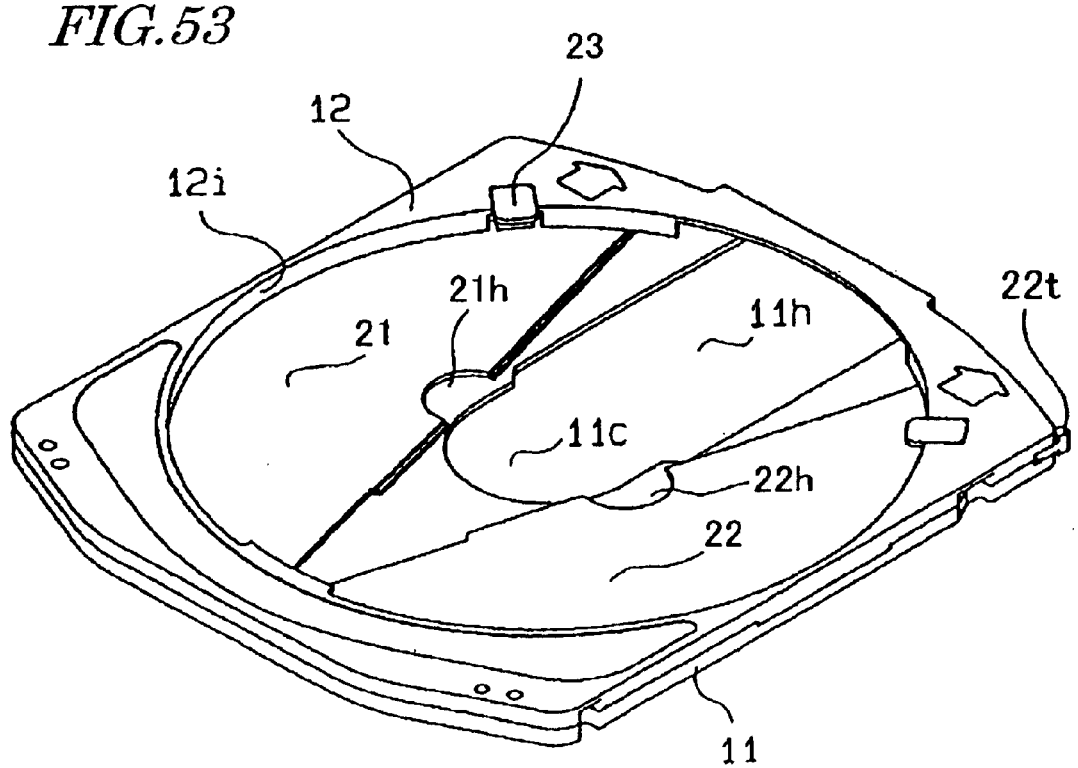
FIG. 53 is a perspective view illustrating a state of the disc cartridge shown in FIG. 50 in which its shutters are opened with the disc removed.
Figure 54:
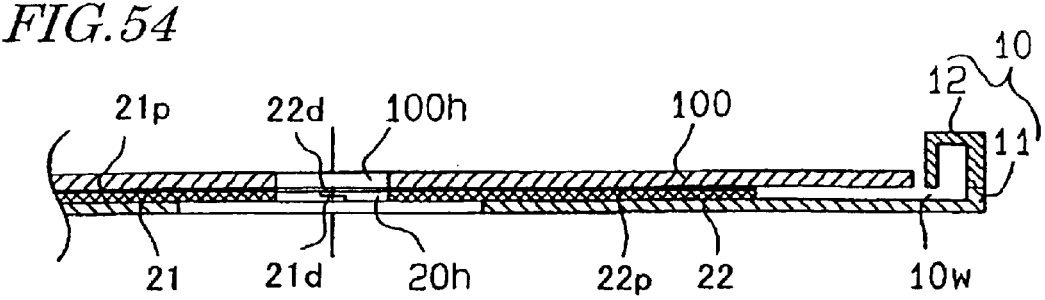
FIG. 54 is a partial cross-sectional view illustrating a cross section of the disc cartridge shown in FIG. 50 that passes the center of the disc to show a state where its shutters are closed.
Figure 55:
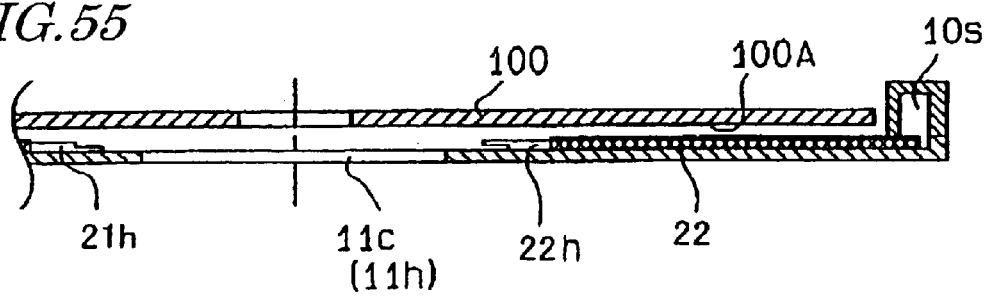
FIG. 55 is a partial cross-sectional view illustrating a cross section of the disc cartridge shown in FIG. 50 that passes the center of the disc to show a state where its shutters are opened.
Figure 56:
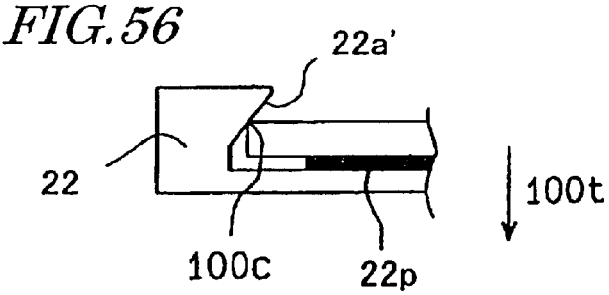
FIG. 56 is a cross-sectional view illustrating a portion of the shutter of the disc cartridge shown in FIG. 50.

As shown in FIGS. 50 and 51, the disc cartridge 311 includes a cartridge lower shell 11, a cartridge upper shell 12, a pair of shutters 21 and 22 and stopper members 23. As shown in FIGS. 52 through 56, the structures and functions of all of these members are the same as those already described for the eighth embodiment and the detailed description thereof will be omitted herein.

Unlike the disc cartridge 308 of the eighth embodiment, the shutters 21 and 22 of the disc cartridge 311 of this embodiment have a hole 20*h* as shown in FIGS. 50 and 51.

More specifically, while the shutters 21 and 22 of the disc cartridge 311 are closed, the shutters 21 and 22 define the hole 20*h* just under the center hole 100*h* of the disc 100. The hole 20*h* is made up of two notches 21*h* and 22*h* provided for the shutters 21 and 22, respectively.

If the disc cartridge 311 is left with the upper surface of the disc 100 exposed upward as shown in FIG. 50, dust may pass through the center hole 100*h*. Even so, in this structure, the dust should pass and go out through the hole 20*h* of the shutters 21 and 22 without remaining inside the disc cartridge 311, or without being deposited on the shutters 21 and 22. Thus, when the shutters 21 and 22 are opened (i.e., when this disc cartridge 311 is loaded into a disc drive), no dust will have been deposited on the signal recording side 100A of the disc.

Considering the disc cartridge 311 may be left either upside up as shown in FIG. 50 or upside down (i.e., with the cartridge lower shell 11 facing upward), the hole 20*h* preferably has a diameter that is approximately equal to that of the center hole 100*h*. This is because if such a relationship is satisfied, dust will be deposited neither on the shutters 21 and 22 when the disc cartridge 311 is left upside up nor on the signal recording side 100A of the disc 100 when the disc cartridge 311 is left upside down.

Figure 57:
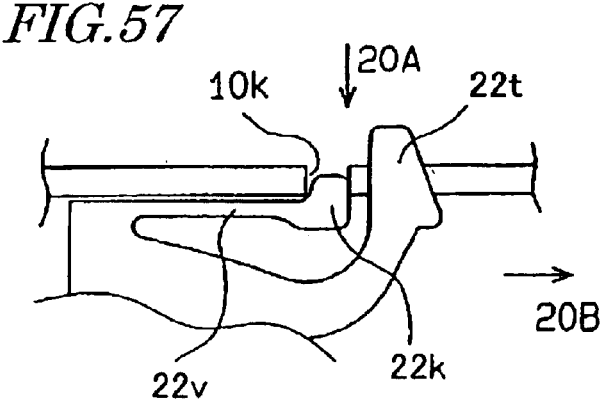
FIG. 57 is a partial plan view illustrating an operating portion and its surrounding portion of the disc cartridge shown in FIG. 50.

In this disc cartridge 311, the opening/closing portion for use to open and close the shutters 21 and 22 is provided for the shutter 22 unlike the disc cartridge 308 of the eighth embodiment. More specifically, as shown in FIGS. 51 and 57, the opening/closing portion 22*t*, elastic portion 22*v* and locking protrusion portion 22*k* are provided as integral parts of the shutter 22. The locking protrusion portion 22*k* is connected to the shutter 22 by way of the elastic portion 22*v*. Accordingly, unlike the eighth embodiment, the opening/closing portion 22*t* is located on the right-hand side of the head opening 11*h* with respect to the disc 100. The function and the operation of the opening/closing portion 22*t* are the same as those described for the disc cartridge 308 of the eighth embodiment.

Embodiment 12

Hereinafter, a disc cartridge 312 according to a twelfth embodiment of the present invention will be described with reference to the drawings.

Unlike the disc cartridge 311 of the eleventh embodiment, the disc cartridge 312 includes a rim 12*t* around the inner side surface 12*i* of the disc storage portion 10*d* and a convex portion 20*w* around the hole 20*h* defined by the shutters 21 and 22. These features will be described below.

Figure 58:
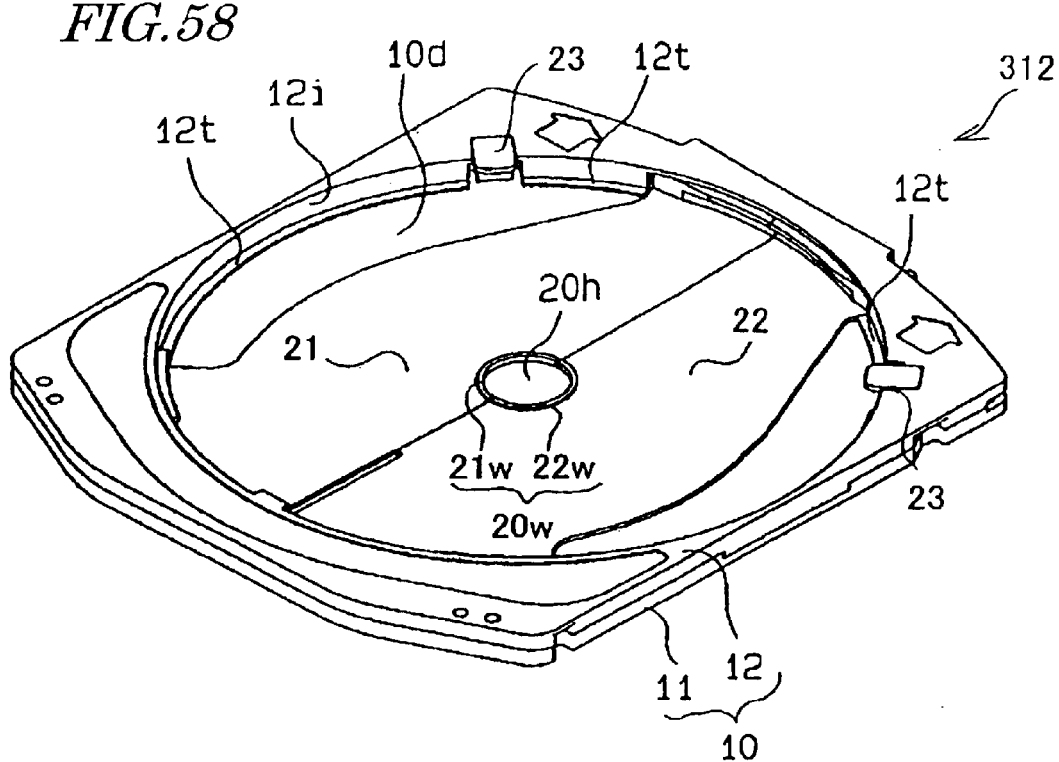
FIG. 58 is a perspective view illustrating a state of a disc cartridge according to a twelfth embodiment of the present invention in which its shutters are closed with the disc removed.
Figure 59:
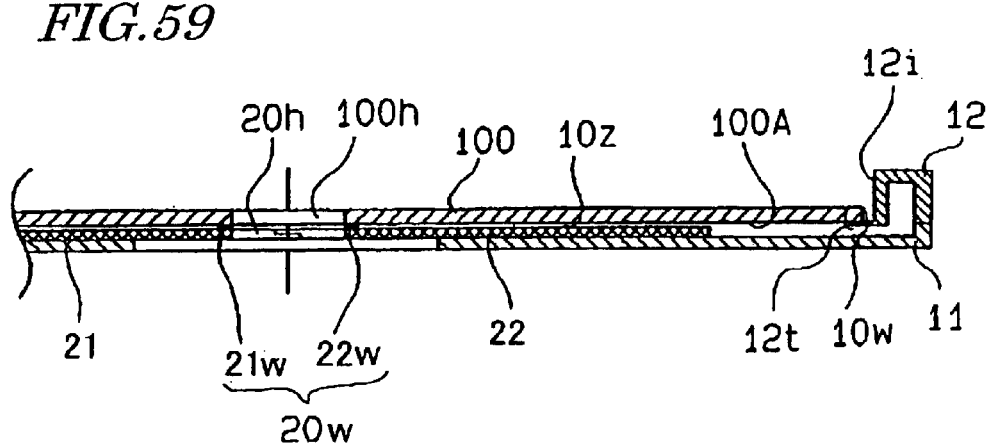
FIG. 59 is a partial cross-sectional view illustrating a cross section of the disc cartridge shown in FIG. 58 that passes the center of the disc to show a state where its shutters are closed.

As shown in FIG. 58, the rim 12*t* protrudes from the inner side surface 12*i* of the cartridge upper shell 12 toward the inner periphery of the disc 100 and substantially surrounds the outer periphery of the disc storage portion 10*d*. FIG. 59 shows a cross section of the disc cartridge 312 in a state where the disc 100 is stored in the disc storage portion 10*d*. While the shutters 21 and 22 are closed, the outer edge of the signal recording side 100A of the disc 100 contacts with the rim 12*t* as shown in FIG. 59. As a result, the gap between the outer periphery of the disc 100 and the cartridge body is closed, thereby preventing any dust from reaching the signal recording side 100A.

Figure 60:
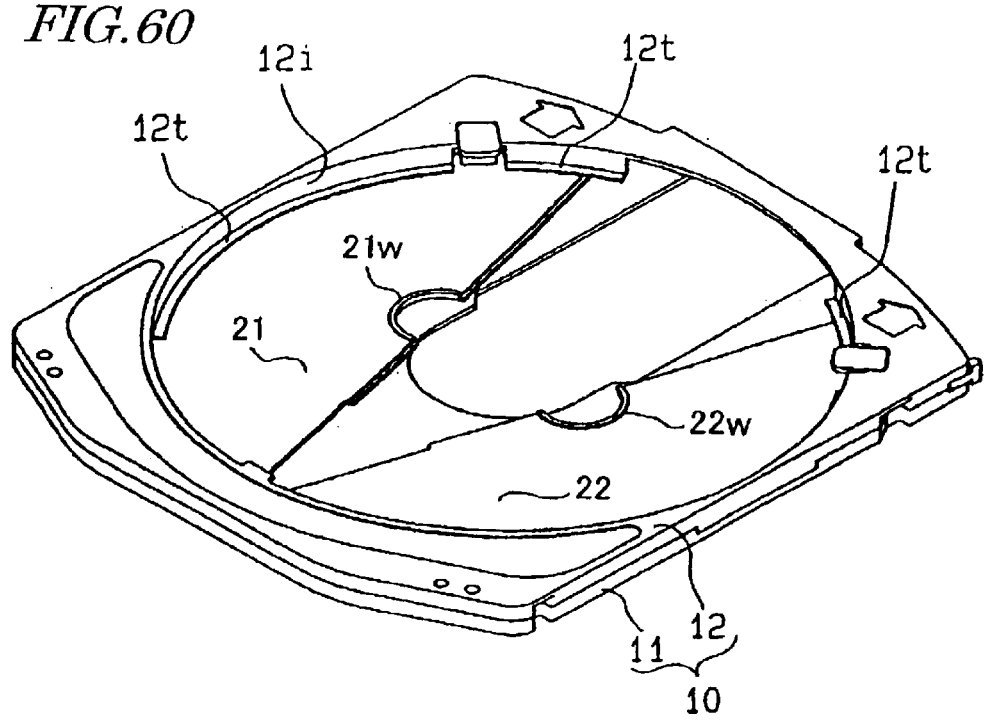
FIG. 60 is a perspective view illustrating a state of the disc cartridge shown in FIG. 58 in which its shutters are opened with the disc removed.
Figure 61:
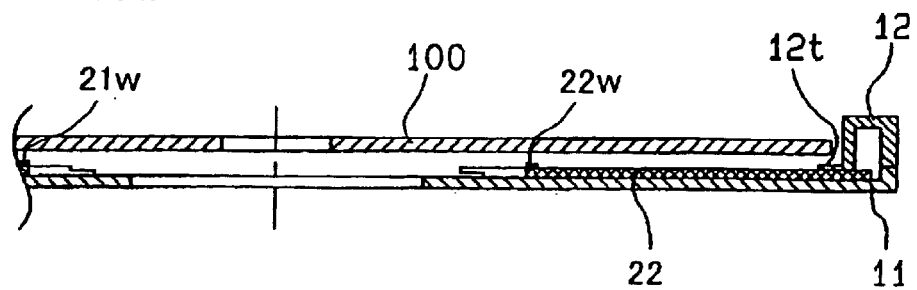
FIG. 61 is a partial cross-sectional view illustrating a cross section of the disc cartridge shown in FIG. 58 that passes the center of the disc to show a state where its shutters are opened.

Also, a gap 10*w* is provided between the rim 12*t* of the cartridge body 10 and the cartridge lower shell 11. Thus, when the shutters 21 and 22 are opened, respective portions of the shutters 21 and 22 enter the gap 10*w* as shown in FIGS. 60 and 61. In this manner, it is possible to prevent the shutters 21 and 22 from interfering with the cartridge body 10.

In such a structure, however, while the shutters 21 and 22 are closed, another gap 10*z* that leads to the open air is also created between the disc 100 and the shutters 21 and 22 as shown in FIG. 59. To close this gap 10*z*, the shutters 21 and 22 include convex portions 21*w* and 22*w*, respectively, around the center hole 100*h* of the disc. As shown in FIG. 58, when the shutters 21 and 22 are closed, these convex portions 21*w* and 22*w* are in tight contact with each other, thereby forming the convex portion 20*w* that closes the gap 10z around the entire disc center hole 100h. As a result, no dust will reach the signal recording side 100A of the disc 100 through the disc center hole 100h.

However, the top of these convex portions 21w and 22w might contact with the signal recording side 100A of the disc 100. Accordingly, the edge of the convex portions 21w and 22w should preferably be round so as not to scratch the disc. Optionally, the convex portions 21w and 22w may form integral parts of the shutters 21 and 22, respectively. In that case, an anti-scratching nonwoven fabric is preferably adhered or ultrasonic welded to that portion of the convex portion 20w that contacts with the disc 100 or an anti-scratching coating is preferably formed on that portion. Alternatively, the convex portions 21w and 22w themselves may be made of an anti-scratching nonwoven fabric or an anti-scratching coating and directly ultrasonic welded or bonded to the shutters 21 and 22, respectively.

Also, as shown in FIG. 59, while the shutters 21 and 22 are closed, the disc 100 is held by the shutters 21 and 22 so as to be lifted by the convex portion 20w and the rim 12t over the shutters 21 and 22 with the gap 10z left between them. That is to say, most of the signal recording side 100A of the disc 100 is not in plane contact with the shutters 21 and 22. Accordingly, even if the shutters 21 and 22 are subjected to no treatment (e.g., even when no anti-scratching nonwoven fabric is attached thereto), the signal recording side 100A still will not get scratched.

Figure 62:
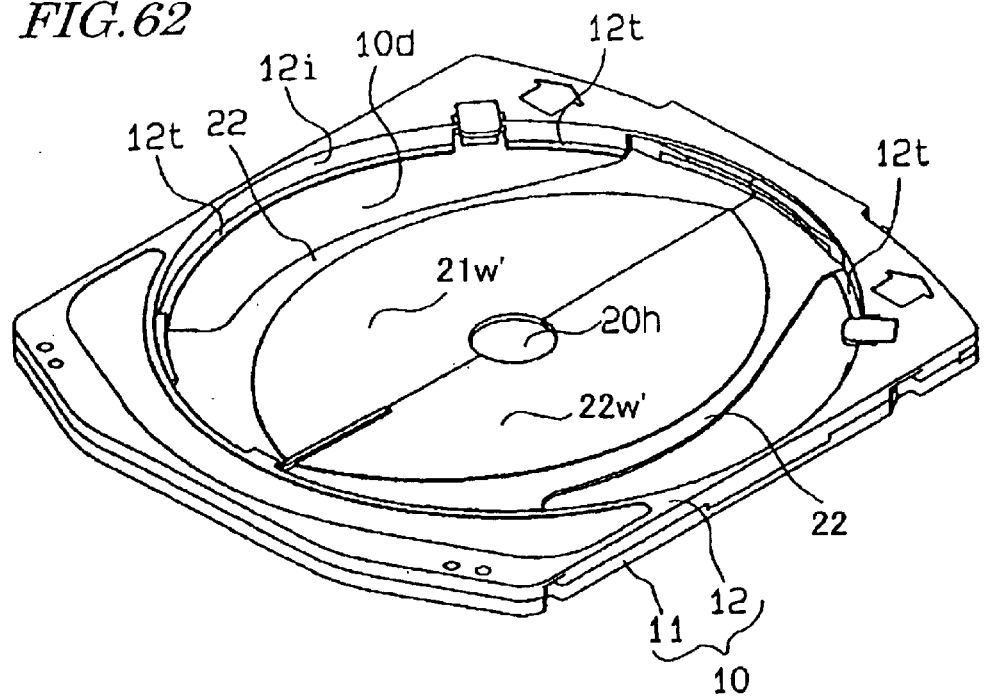
FIG. 62 is a perspective view illustrating a modified example of the disc cartridge shown in FIG. 58 to show a state where its shutters are closed with the disc removed.
Figure 63:
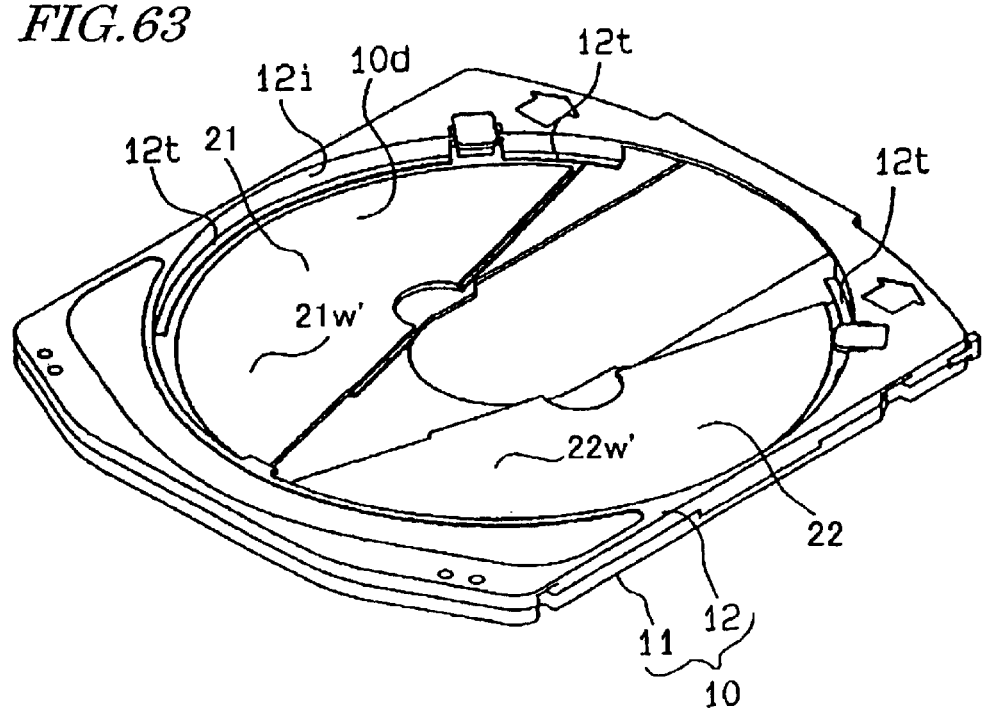
FIG. 63 is a perspective view illustrating a state of the disc cartridge shown in FIG. 61 in which its shutters are opened with the disc removed.

FIGS. 62 and 63 illustrate a disc cartridge including alternative convex portions 21w' and 22w' that have been expanded toward the outer periphery of the disc 100. Specifically, FIG. 62 illustrates a state where the shutters 21 and 22 are closed, while FIG. 63 illustrates a state where the shutters 21 and 22 are opened.

As shown in FIGS. 62 and 63, while the shutters 21 and 22 are opened, the convex portions 21w' and 22w' are preferably located inside the rim 12t of the disc storage portion 10d (i.e., closer to the center of the disc storage portion). Then, the convex portions 21w' and 22w' will not contact with, or interfere with, the rim 12t.

Optionally, the convex portions 21w' and 22w' may form integral parts of the shutters 21 and 22, respectively. In that case, an anti-scratching nonwoven fabric is preferably adhered or ultrasonic welded to those portions of the convex portions 21w' and 22w' that contact with the disc 100 or an anti-scratching coating is preferably formed thereon. Alternatively, the convex portions 21w' and 22w' themselves may be made of an anti-scratching nonwoven fabric or an anti-scratching coating and directly ultrasonic welded or bonded to the shutters 21 and 22, respectively.

Embodiment 13

Hereinafter, a disc cartridge 313 according to a thirteenth embodiment of the present invention will be described with reference to the drawings.

Figure 64:
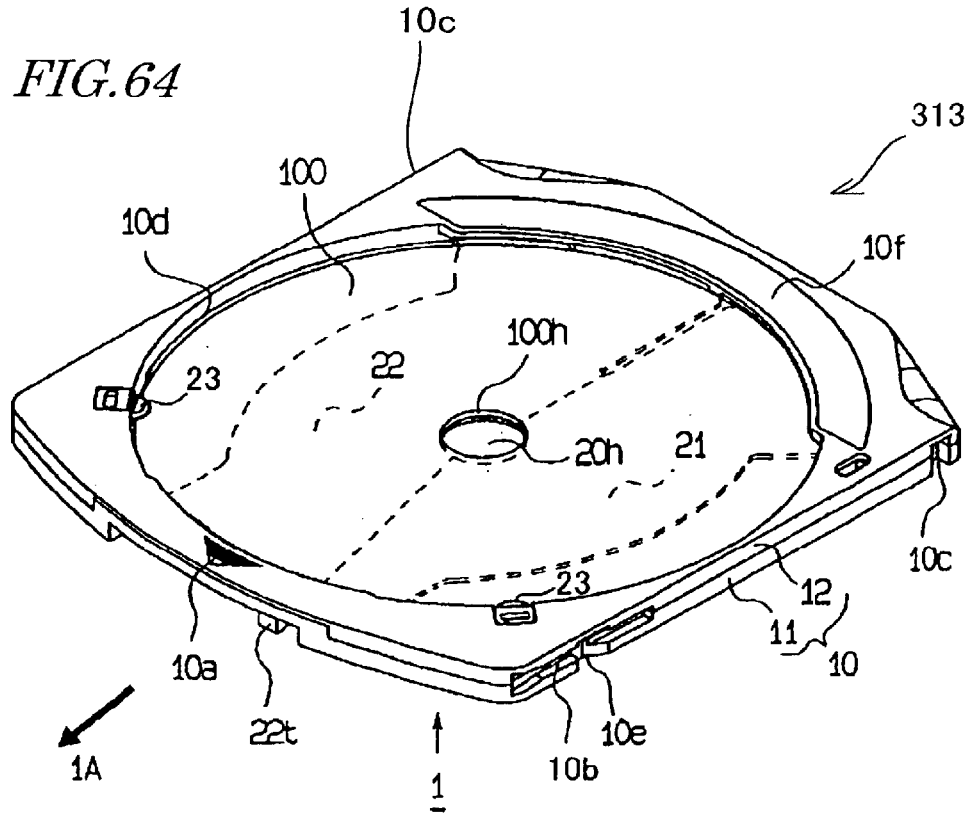
FIG. 64 is a perspective view illustrating an overall configuration for a disc cartridge according to a thirteenth embodiment of the present invention.
Figure 65:
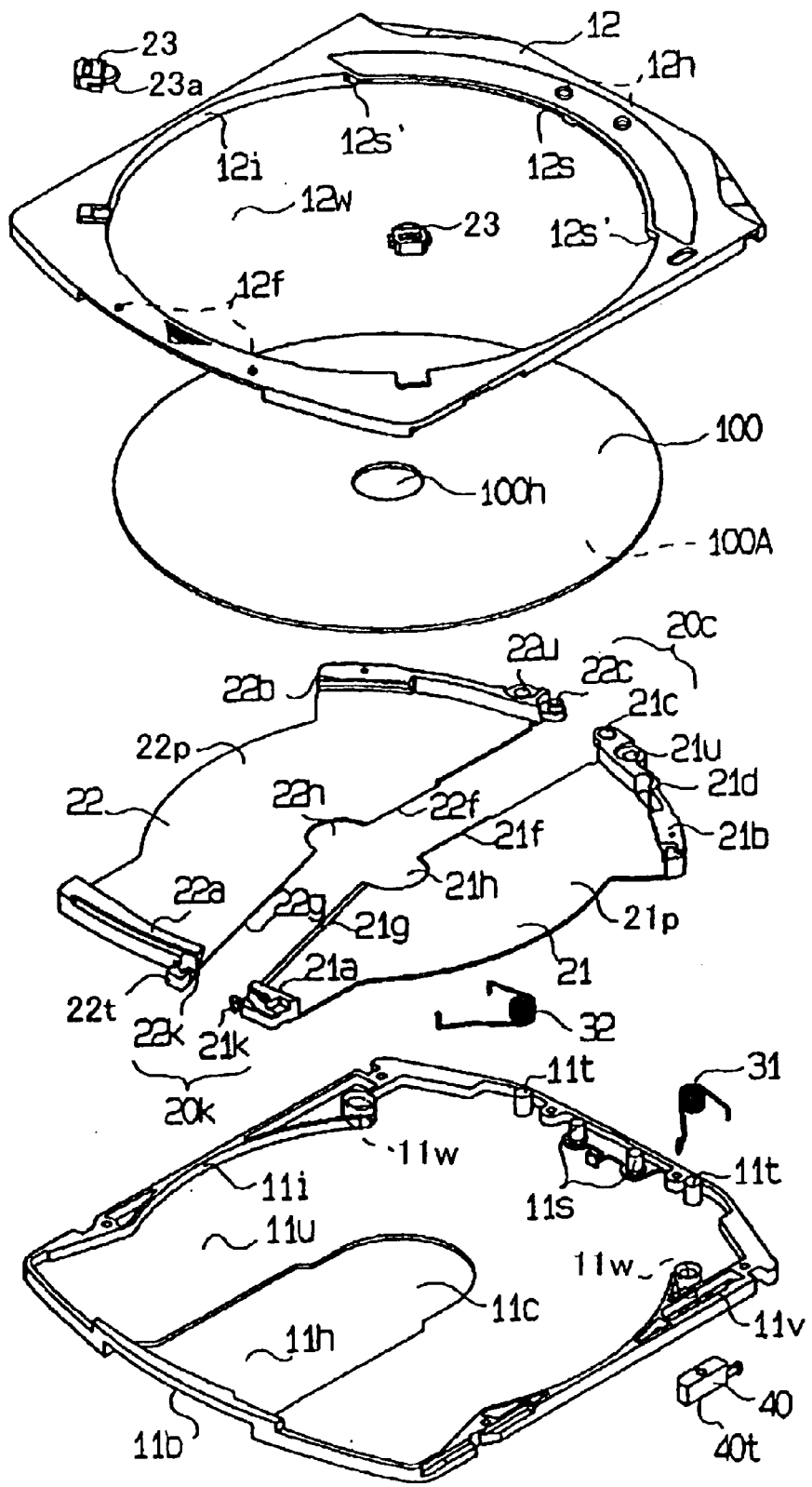
FIG. 65 is an exploded perspective view illustrating an exploded state of the disc cartridge shown in FIG. 64.

First, the structure of the disc cartridge 313 will be outlined with reference to FIGS. 64 and 65. As in the eighth embodiment, the disc 100 shown in FIGS. 64 and 65 also has first and second sides. The first side, on which the label of the disc, for example, is normally printed, is illustrated in FIG. 64, while the second side of the disc 100, i.e., the signal recording side 100A, is illustrated as the back surface in FIG. 65.

As shown in FIGS. 64 and 65, the disc cartridge 313 includes a cartridge lower shell 11, a cartridge upper shell 12, a pair of shutters 21 and 22 and stopper members 23.

As shown in FIG. 65, the cartridge lower shell 11 includes a chucking opening 11c and a head opening 11h. The chucking opening 11c is provided to allow a chucking member (e.g., a spindle motor for rotating the disc 100) to enter the disc cartridge 313 externally. The head opening 11h is provided to allow a head, which reads and/or writes a signal from/on the signal recording side 100A of the disc 100, to enter the disc cartridge 313 and access the signal recording side 100A. The cartridge lower shell 11 faces the signal recording side 100A of the disc 100. The cartridge lower shell 11 is formed by molding a synthetic resin.

The head opening 11 reaches one side surface of the cartridge lower shell 11. To minimize a decrease in rigidity of the cartridge lower shell 11 due to the presence of the head opening 11h, the cartridge lower shell 11 includes a bridge portion 11b that links both ends of the head opening 11h together.

The bottom of the cartridge lower shell 11 further includes two positioning holes 11w into which cartridge positioning pins of a disc drive are inserted.

The cartridge upper shell 12 includes a circular disc window 12w, through which the disc 100 can be introduced and removed into/from the disc cartridge 313 and which expands over the entire projection area of the disc 100 to expose the upper surface of the disc 100. The cartridge upper and lower shells 12 and 11 are adhered or welded together at their outer periphery, thereby forming a cartridge body 10. The cartridge upper shell 12 is also made of a synthetic resin.

A disc storage portion 10d for storing the disc 100 therein is defined by a first inner surface 11u of the cartridge lower shell 11 and a second inner surface 12i of the cartridge upper shell 12. The first inner surface 11u is opposed to the signal recording side 100A of the disc 100, while the second inner surface 12i has a substantially cylindrical shape and defines the disc window 12w inside. That is to say, the first inner surface 11u becomes the bottom of the disc storage portion 10d.

In the disc storage portion 10d, a gap, which is wide enough to allow the disc 100 to rotate freely, is provided between the second inner surface 12i and the disc 100. Also, the top of the disc storage portion 10d is the disc window 12w so that the disc 100 stored in the disc storage portion 10d has one side thereof exposed inside the disc window 12w.

The stopper members 23 are provided in a removable state for the cartridge upper shell 12 so as to partially protrude into the disc window 12w. As shown in FIGS. 64 and 65, two stopper members 23 are provided in this embodiment. On the other hand, a stopper portion 12s is provided for the cartridge upper shell 12 so as to protrude into the disc window 12w. The stopper portion 12s forms an integral part of the cartridge upper shell 12. The two stopper members 23 and the stopper portion 12s are arranged approximately at regular intervals around the circumference of the disc window 12w for the purpose of preventing the disc 100 from dropping down from the disc window 12w. Also, two convex disc contact portions 12s' are formed on the stopper portion 12s. For the disc 100, these disc contact portions 12s' are as high as the disc contact portions 23a of the stopper members 23.

According to this structure, even if the disc cartridge 313 is mounted vertically or upside down, the disc 100 still can be kept in a fixed position. That is to say, when the disc cartridge 313 is inserted vertically or upside down into a disc drive, the dropping can be prevented particularly effectively. It should be noted that the stopper members 23 do not have to be removable from the cartridge body 10. Alternatively, as long as the stopper members 23 can be rotated or turned inside the disc storage portion 10d to such an extent as to allow the operator to remove the disc 100 from the cartridge body 10, the stopper members 23 may also be secured to the cartridge upper shell 12.

The shutters 21 and 22 lie on a single plane between the signal recording side 100A of the disc 100 and the inner surface 11u of the disc storage portion 10d. The shutters 21 and 22 include rotation holes 21u and 22u, respectively. These rotation holes 21u and 22u are engaged in a freely rotatable state with a pair of rotation shafts 11s, which is located outside of the disc storage portion 10d of the cartridge body 10 and opposite to the head opening 11h. Thus, the shutters 21 and 22 rotate on the rotation shafts 11s in such a manner as to expose or cover the chucking and head openings 11c and 11h. The shutters 21 and 22 are also made of a synthetic resin.

A ring-shaped portion 21c and a pin-shaped portion 22c are provided near the rotation holes 21u and 22u of the shutters 21 and 22, respectively. The ring-shaped portion 21c and the pin-shaped portion 22c have mutually engaging shapes and together make up an interlocking mechanism 20c for opening and closing the shutters 21 and 22 while interlocking them with each other. The interlocking mechanism 20c may also be any other interlocking mechanism such as a cam mechanism or a gear mechanism.

The respective surfaces of the shutters 21 and 22, which are opposed to the signal recording side 100A of the disc, are covered with protective layers 21p and 22p for the purpose of preventing the disc 100 from getting scratched or any dust from entering the signal recording side 100A thereof.

The protective layers 21p and 22p may be appropriately selected from the group consisting of an anti-scratching nonwoven fabric, a dustproof nonwoven fabric, an anti-scratching coating layer and a dustproof coating layer. In this embodiment, sheets of a dustproof nonwoven fabric are adhered or ultrasonic welded as the protective layers 21p and 22p.

A locking protrusion portion 21k is provided for the shutter 21, while a locking engaging portion 22k, which engages with the locking protrusion portion 21k, is provided for the shutter 22. The locking protrusion portion 21k and locking engaging portion 22k together make up a locking mechanism 20k for locking and unlocking the shutters 21 and 22 to/from each other. By using this structure, the shutters 21 and 22 can be locked and unlocked, thus preventing the operator from opening the shutters accidentally. In addition, the signal recording side 100A of the disc 100 can be protected from dust, finger marks or scratches. The locking protrusion portion 21k and the locking engaging portion 22k form integral parts of the shutters 21 and 22, respectively.

Furthermore, the shutters 21 and 22 are provided with notches 21h and 22h, respectively. When the shutters 21 and 22 are closed, these notches 21h and 22h contact with each other to form a hole 20h. While the shutters 21 and 22 are closed, the hole 20h is located just under the center hole 100h of the disc 100. The diameter of the hole 20h is approximately equal to that of the center hole 100h of the disc 100. In such a structure, even if this disc cartridge 313 is left with the upside up, no dust will be deposited on the shutters 21 and 22. Also, even if the disc cartridge 313 is left upside down, no dust will be directly deposited on the signal recording side 100A of the disc 100, either.

As described for the eighth embodiment, the shutters 21 and 22 include disc holding portions 21a, 21b, 22a, and 22b for holding the disc 100 thereon while the shutters are closed. The disc holding portions 21a, 21b, 22a and 22b have been molded integrally with the shutters 21 and 22 so as to be dispersed around the circumference of the disc. Each of these disc holding portions 21a, 21b, 22a and 22b has a downwardly tapered slope to contact with the disc 100. By providing these slopes, the disc 100 can be held firmly and pressed against the shutters 21 and 22 while the shutters 21 and 22 are closed.

In this embodiment, only the disc holding portion 21b is not secured to the shutter 21 but is connected thereto via an elastic portion 21d and is freely rotatable in the radial direction of the disc 100 (i.e., toward the center of the disc). Accordingly, the disc holding portions 21a, 21b, 22a and 22b can firmly hold a disc 100 having any of various diameters or thicknesses without allowing the disc 100 to move inconstantly.

A shutter opening/closing portion 22t for use to open and close the shutter 22 is formed as an integral part of the shutter 22 so as to be opposed to the rotation hole 22u, i.e., near the disc holding portion 22a. When the shutters 21 and 22 are attached to the cartridge body 10, the shutter opening/closing portion 22t is located under the bridge portion 11b and inside the head opening 11h. In opening or closing the shutters 21 and 22, the opening/closing portion 22t is moved along the bridge portion 11b inside the head opening 11h. In this arrangement, there is no need to separately provide any gap for allowing the shutter opening/closing portion 21t to move therein for the cartridge body 10. In other words, since there is no need to provide an extra gap for the cartridge body 10, no dust will enter the cartridge body 10 unnecessarily. Furthermore, the shutter opening/closing portion 22t can be disposed inside the head opening 11h of the cartridge body 10, thus providing a cartridge of a good design.

Figure 66:
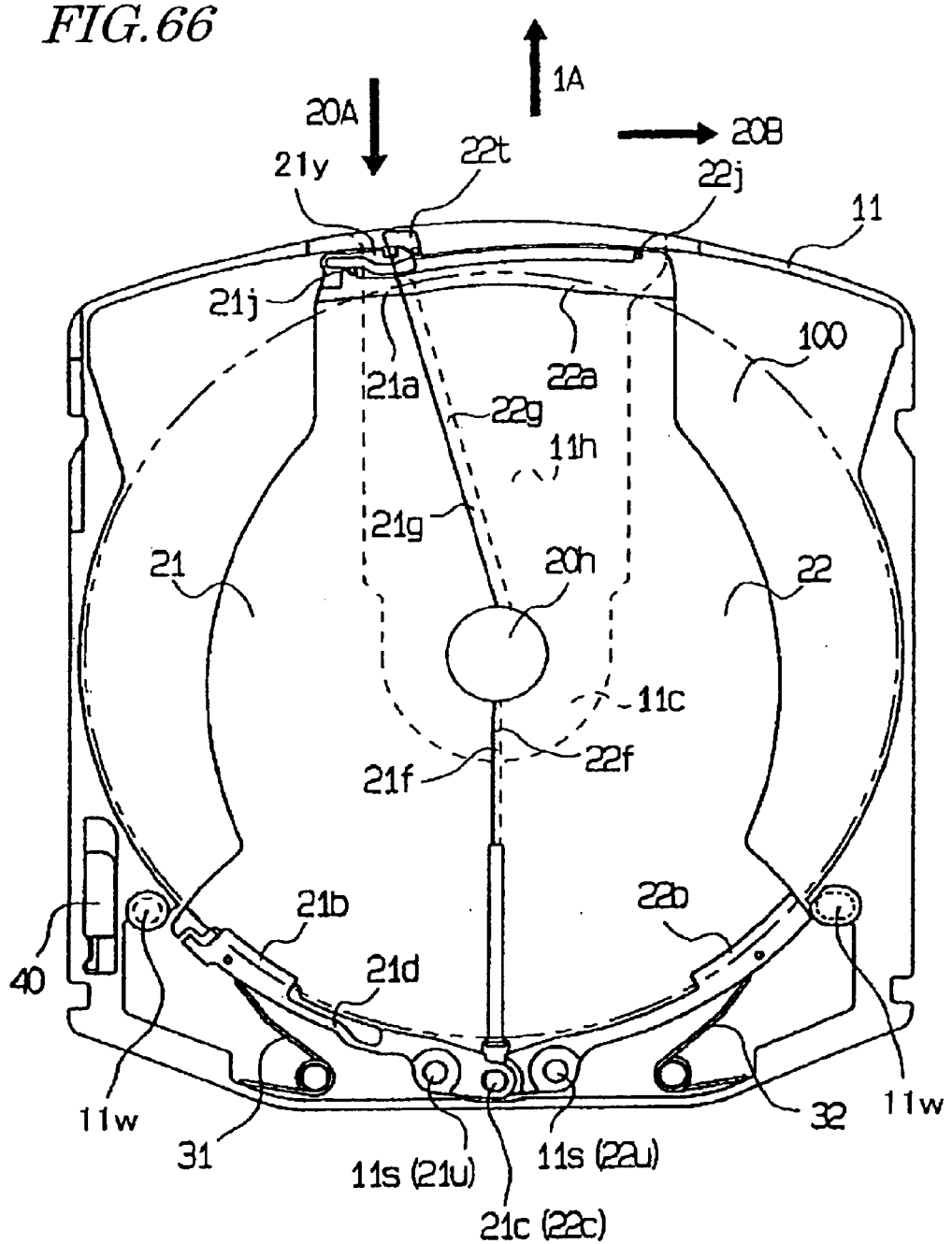
FIG. 66 is a schematic plan view illustrating a state of the disc cartridge shown in FIG. 64 in which its shutters are closed.

As shown in FIG. 66, the shutters 21 and 22 are not entirely in contact with each other along a line but have a plurality of contact surfaces that are not aligned with the line. More specifically, the shutters 21 and 22 have a first pair of contact surfaces 21f and 22f over the chucking opening 11c and a second pair of contact surfaces 21g and 22g over the head opening 11h, respectively. In this embodiment, the contact surfaces 21f and 22f contact with each other along the center-of-symmetry line of the disc cartridge 313. On the other hand, the contact surfaces 21g and 22g contact with each other along a line that defines a predetermined angle (e.g., approximately 15 to 16 degrees) with the center-of-symmetry line. When the shutters 21 and 22 have such shapes, the shutter 22 can have an integral shape from the vicinity of the shutter opening/closing portion 22t and can have sufficiently high rigidity.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. The shutter springs 31 and 32 are inserted into two spring poles 11t provided for the cartridge lower shell 11. In this embodiment, torsion coil springs are used as the shutter springs 31 and 32. Springs of the same shape are used as the shutter springs 31 and 32 to reduce the cost. Examples of other elastic members that may be used as the shutter springs include compression springs, leaf springs and elastic resin springs.

As shown in FIG. 65, the disc cartridge 313 includes a write protect member 40, which is inserted into a groove portion 11v of the cartridge lower shell 11 so as to slide along the groove portion 11v. By sliding the write protect member 40, the convex portion 40t thereof is displaced. Thus, in accordance with the position of the convex portion 40t, a sensor switch provided for a disc drive is turned ON or OFF. In this manner, writing on the disc 100 may be either prohibited or allowed.

This disc cartridge 313 is made up of the cartridge body 10 consisting of the cartridge lower and upper shells 11 and 12, stopper members 23, shutters 21 and 22, shutter springs 31 and 32, and write protect member 40.

When the cartridge lower and upper shells 11 and 12 are joined together, the two rotation shafts 11s of the cartridge lower shell 11 are engaged with two concave portions 12h of the cartridge upper shell 12. In this manner, the rotation shafts 11s can have their rigidity increased. Thus, even when the shutters 21 and 22 are open, reduced torsion is created around the respective centers of rotation of the shutters by the elastic force applied from the shutter springs 31 and 32. As a result, the shutters can be opened to the intended angle.

The upper surface of the cartridge body 10 (or the cartridge upper shell 12) has a label plane 10f, on which the contents that have been written on the disc 100 stored can be noted down, and an embossed arrow mark (or concave portion) 10a that indicates the direction (the arrow 1A) in which this disc cartridge 313 is inserted into a disc drive.

The cartridge body 10 further includes two pairs of concave portions 10c and 10e on two side surfaces thereof that are parallel to the inserting direction 1A. These concave portions 10c and 10e may be used as either pull-in notches or positioning recesses when the disc cartridge 313 is loaded into a disk drive or when the disc cartridge 313 is stored in a changer. The cartridge body further includes a slit portion 10b on one of its side surfaces. The slit portion 10b may be used as a recess to identify the upside and downside of the disc cartridge 313 when this disc cartridge 313 is inserted into the disc drive.

Figure 67:
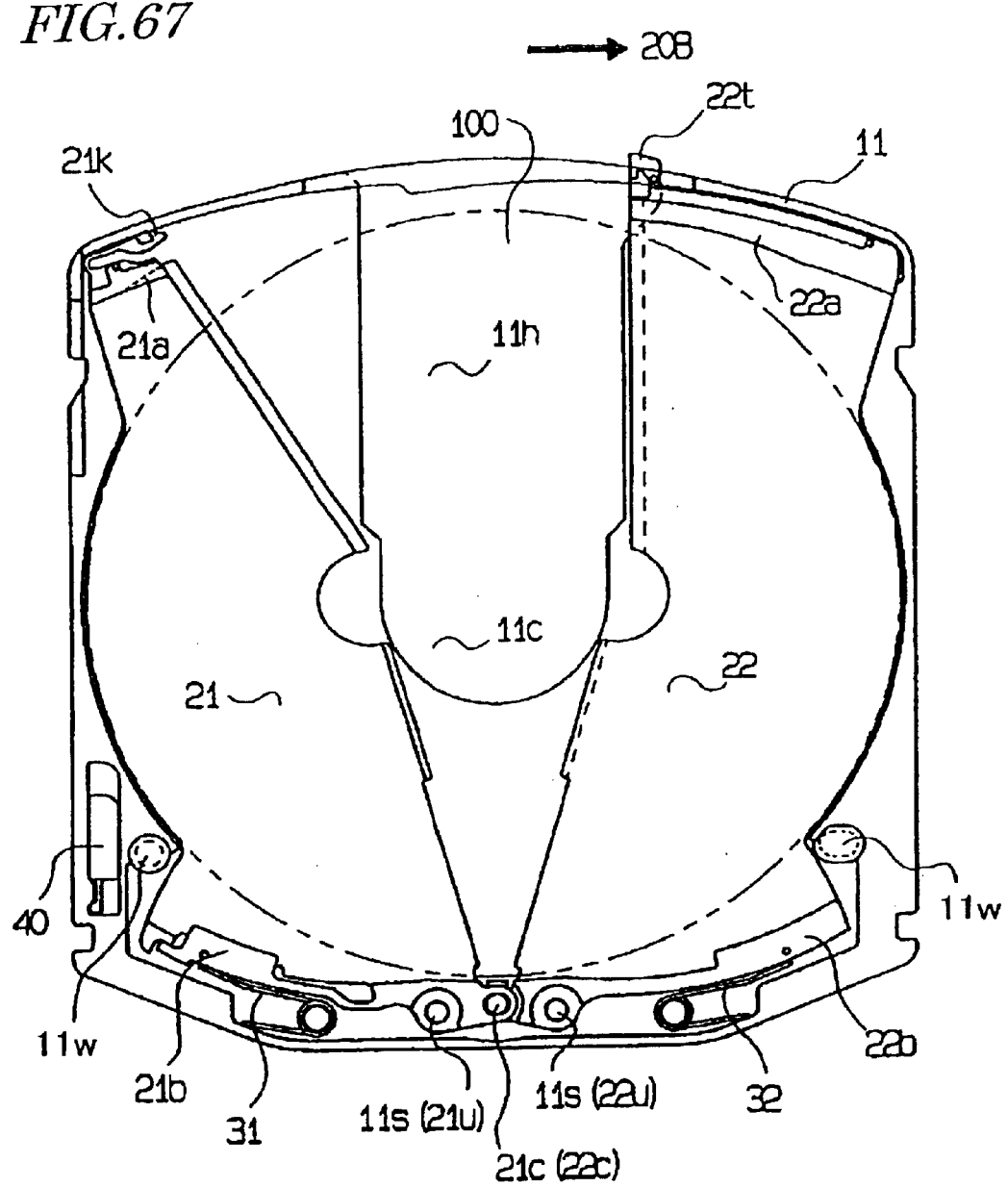
FIG. 67 is a schematic plan view illustrating a state of the disc cartridge shown in FIG. 64 in which its shutters are opened.
Figure 68:
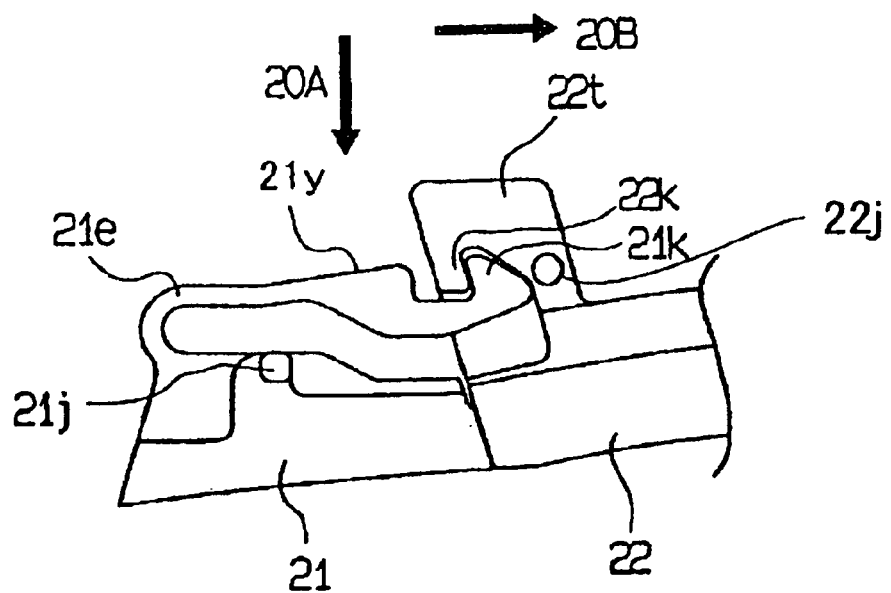
FIG. 68 is a detailed perspective view of a shutter locking portion.
Figure 69:
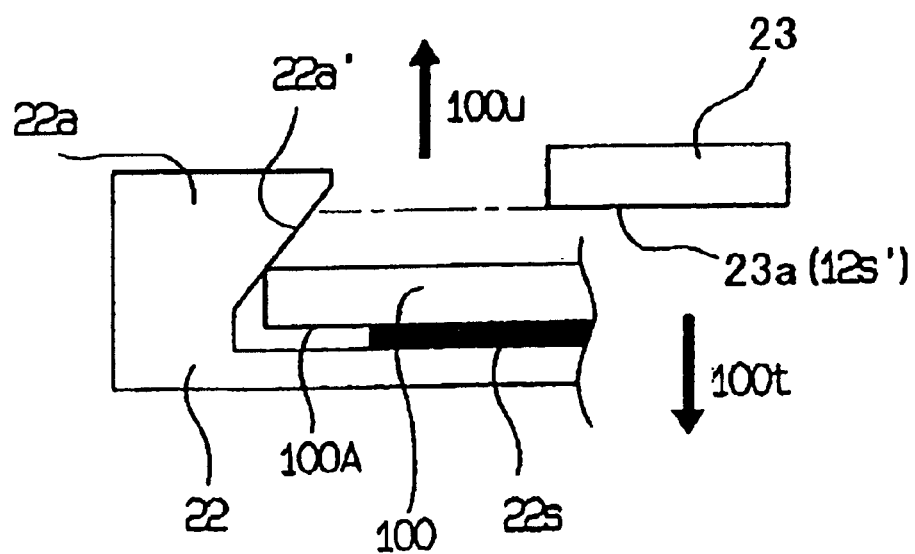
FIG. 69 is a detailed cross-sectional view of a disc holding portion of the shutter.

Hereinafter, it will be described with reference to FIGS. 66, 67, 68 and 69 how this disc cartridge 313 operates. FIGS. 66 and 67 illustrate a state where the shutters are closed and a state where the shutters are opened, respectively. FIG. 68 illustrates the details of the shutter locking portion. And FIG. 69 illustrates the details of the disc holding portion of the shutter.

First, a storage state of the disc cartridge 313, i.e., a state of the disc cartridge 313 that has not been loaded into a disc drive yet, will be described. In that state, the shutters 21 and 22 are closed as shown in FIG. 66. Also, as shown in FIG. 69, the sloped portion 22a' of the disc holding portion 22a of the shutter 22 contacts with the outer edge of the disc 100, thereby holding the disc 100 thereon and pressing the disc 100 in the thickness direction 100t. In this manner, the signal recording side 100A is brought into plane contact with the sheet 22p of the shutter 22 and the disc 100 is held and fixed onto the cartridge body 10. The other disc holding portions 21a, 21b and 22b also have their own sloped portions 21a', 21b' and 22b', respectively. Thus, just like the sloped portion 22a', these sloped portions 21a', 21b' and 22b' also hold and fix the disc 100 onto the cartridge body 10.

In this state, the signal recording side 100A of the disc 100 is in close contact with the sheets 21p and 22p. Thus, no dust will be deposited on the signal recording side 100A. Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Furthermore, since the shutters 21 and 22 are locked by the locking mechanism 20k, the operator cannot open the shutters 21 and 22 accidentally. Thus, the signal recording side 100A of the disc 100 can be protected from dust, finger marks or scratches.

Furthermore, the hole 20h, which is defined by the notches 21h and 22h provided for the shutters 21 and 22, respectively, is provided in the regions of the shutters 21 and 22 that are located under the center hole 100h of the disc 100. In such a structure, even if the cartridge 313 is left, dust may pass through the center hole 100h but will not be deposited on the shutters 21 and 22.

Figure 70:
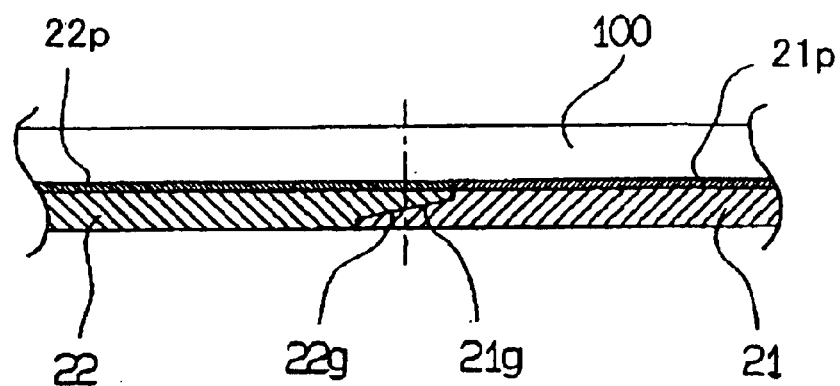
FIG. 70 is a cross-sectional view illustrating the shapes of a pair of contact surfaces of the two shutters.
Figure 71:
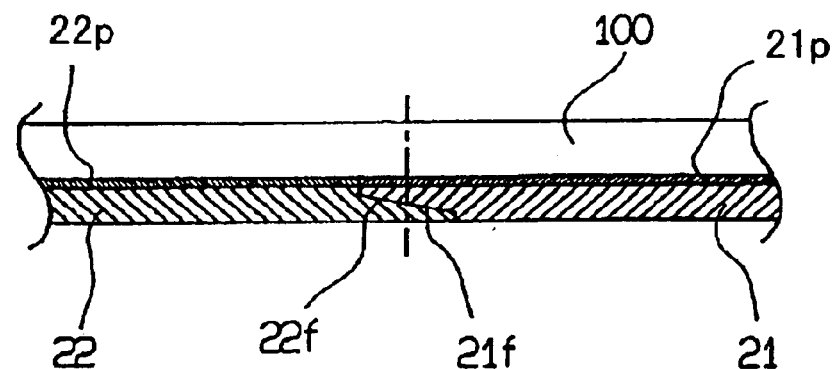
FIG. 71 is a cross-sectional view illustrating the shapes of another pair of contact surfaces of the two shutters.

Also, while the shutters 21 and 22 are closed, at least the two pairs of contact surfaces 21f, 22f and 21g, 22g of the shutters 21 and 22, which are butted with each other over the head and chucking openings 11h and 11c, each overlap with each other in the thickness direction of the disc 100 as shown in FIGS. 70 and 71. Accordingly, even if the shutters 21 and 22 have been closed incompletely because a disc 100 having a non-regular diameter has been mounted or because the shutters 21 and 22 have not been locked completely, no gap will be created between the contact surfaces of the shutters 21 and 22. Thus, even in such a situation, the disc 100 can also be protected from dust, finger marks or scratches.

Also, as shown in FIG. 70, the shutters 21 and 22 are in contact with each other around the head opening 11h so that the contact surface 22g of the shutter 22 is located over the contact surface 21g of the shutter 21. On the other hand, as shown in FIG. 71, the shutters 21 and 22 are in contact with each other around the chucking opening 11c so that the contact surface 21f of the shutter 21 is located over the contact surface 22f of the shutter 22. In this manner, the angle defined by one of multiple contact surfaces of the shutter 21 or 22 may be different from the angle defined by another one of the contact surfaces of the shutter 21 or 22. In such a structure, the two shutters 21 and 22 can be tightly engaged with each other in the thickness direction of the disc. Thus, neither the shutter 21 nor the shutter 22 will be raised unintentionally. In addition, while the shutters 21 and 22 are closed, the contact surfaces of the shutters 21 and 22 can have increased rigidity.

In this embodiment, the shutters 21 and 22 have the contact surfaces 21g, 22g, 21f and 22g shown in FIGS. 70 and 71. However, the shutters 21 and 22 may also have contact surfaces at different locations or may contact with each other in a different manner from those shown in FIGS. 70 and 71. For example, the contact surfaces 21g and 22g shown in FIG. 70 may be shifted to a location around the head opening 11h and contact with each other. Alternatively, the contact surfaces 21f and 22f shown in FIG. 71 may be shifted to a location around the chucking opening 11c and contact with each other. Then, the shutters 21 and 22 can exhibit even higher rigidity when closed, and the gap between the contact surfaces can be further reduced, thus preventing any dust from entering the inside of the cartridge.

Also, while the shutters 21 and 22 are closed, convex portions 21j and 22j, provided for the shutters 21 and 22 as shown in FIG. 68, are in contact with two shutter stopper portions 12f provided for the cartridge upper shell 12 as shown in FIG. 65. Accordingly, the shutters 21 and 22 have its rotation regulated and cannot move from their locked positions. As a result, the shutters will not move inconstantly. In addition, it is possible to prevent the operator from breaking the shutters intentionally. Furthermore, since the shutters 21 and 22 have their rotation regulated, the shutter opening/closing portion 22t is not displaced. Accordingly, when this disc cartridge 313 is loaded into a disc drive, the shutter opening/closing portion 22t can be engaged with the shutter opening/closing mechanism of the disc drive just as intended.

Next, it will be described how this disc cartridge 313 is loaded into the disc drive. As shown in FIG. 66, when the disc cartridge 313 is inserted into the disc drive in the direction 1A, the cartridge positioning pins of the disc drive engage with the positioning holes 11w of the disc cartridge 313, thereby determining the horizontal and vertical positions of the disc cartridge 313 inside the disc drive.

Then, a shutter opening/closing member of the shutter opening/closing mechanism provided inside the disc drive engages with the shutter opening/closing portion 22t shown in FIG. 68. At the same time, an unlocking member of the shutter opening/closing mechanism presses a locking press portion 21y, which is connected to the shutter 21 by way of a locking elastic portion 21e, in the direction 20A. As a result, the locking protrusion portion 21k of the locking mechanism 20k is disengaged from the locking engaging portion 22k thereof, thereby unlocking the shutters 21 and 22 from each other. In such a state, the shutter opening/closing member moves the shutter opening/closing portion 22t in the direction 20B at the same time. Consequently, the shutter 21 rotates on the rotation shaft 11s while overcoming the elastic force applied from the shutter spring 31 as shown in FIG. 67. Synchronously, the other shutter 22, which is interlocked with the shutter 21 via the interlocking mechanism 20c, also rotates while overcoming the elastic force applied from the shutter spring 32. Accordingly, when the shutter 21 has been opened, the shutter 22 will have also been opened.

By this point in time, the locking protrusion portion 21k and the locking press portion 21y will have recovered their original shapes and returned to their home positions along with the locking elastic portion 21e. Thus, the locking elastic portion 21e made of a resin is not deformed plastically. In this manner, the signal recording side 100A of the disc 100 is exposed through the chucking and head openings 11c and 11h. Also, the disc 100, which has been held by the disc holding portions 21a, 21b, 22a and 22b, is released therefrom as the shutters 21 and 22 rotate. As a result, the disc 100 is now freely rotatable inside the disc storage portion 10d.

Subsequently, the spindle motor and the turntable of the disc drive enter the chucking opening 11c and the head thereof enters the head opening 11h. Consequently, the disc drive is now ready to perform a write or read operation on the disc 100.

As described above, only by getting the locking protrusion portion 21k pressed externally by a protrusion, for example, in the direction 20A and disengaged from the locking engaging portion 22k while pressing the shutter opening/closing portion 22t in the direction indicated by the arrow 20B at the same time, the shutters 21 and 22 can be rotated to expose the chucking and head openings 11c and 11h and the disc 100 can be released from the disc holding portions 21a, 21b, 22a and 22b. Thus, it is possible to prevent the operator from opening the shutters or removing the disc accidentally. As a result, the disc 100 can be protected from dust, finger marks or scratches.

Hereinafter, it will be described how the disc cartridge 313 is ejected from the disc drive. When an ejecting mechanism of the disc drive starts to operate, the shutter opening/closing member, which has been engaged with the shutter opening/closing portion 22t, disengages itself from the shutter opening/closing portion 22t. As a result, the shutters 21 and 22 cannot be kept opened anymore. That is to say, the shutters 21 and 22, to which an elastic force is being applied from the shutter springs 31 and 32 in such a direction as to close the shutters 21 and 22, start to rotate in the closing direction. Consequently, the shutters 21 and 22 close up the head and chucking openings 11h and 11c. In this case, the shutters 21 and 22 are locked to each other by the locking mechanism 20k. In the meantime, the disc 100 gets held by the disc holding portions 21a, 21b, 22a and 22b again to recover its original state. In such a state, the disc cartridge 313 is ejected from the disc drive.

In the disc cartridge 313, the disc contact portion 23a of the stopper members 23 provided for the cartridge body 10 and the disc contact portion 12s' of the cartridge upper shell 12 are located at the same vertical level as shown in FIG. 69. Also, the top of the sloped portions 21a', 21b', 22a' and 22b' of the disc holding portions 21a, 21b, 22a and 22b of the shutters 21 and 22 is higher in level than the bottom of the disc contact portions 23a and 12s' in the direction 100u in which the disc 100 is moved upward. Accordingly, although the disc cartridge 313 may be used either vertically or upside down depending on the type of the disk drive, the shutters 21 and 22 still can hold the disc 100 firmly thereon. For example, particularly when the disc 100 is used upside down, the disc 100 that is no longer chucked contacts with the disc contact portions 23a and 12s' and still can maintain its horizontal position. And when the shutters 21 and 22 are closed in such a state, the disc 100 contacts with the slopes 21a', 21b', 22a' and 22b' this time. Then, the disc 100 will slide along the slopes smoothly to be held firmly by the disc holding portions 21a, 21b, 22a and 22b.

As described above, in the disc cartridge of this embodiment, the cartridge body thereof has a disc window and covers only one side of the disc. Also, a shutter opening/closing portion is provided inside a head opening of the cartridge body, and therefore, there is no need to provide any unnecessary gap for the cartridge body. As a result, no dust will enter the inside of the cartridge body.

In addition, the two shutters are made to contact with each other along the centerline of the disc over the chucking opening and along a line, which defines a predetermined angle with the centerline of the disc, over the head opening. Accordingly, these shutters can have an integrated structure from the vicinity of the shutter opening/closing portion and can exhibit sufficiently high rigidity.

Furthermore, since the two shutters are locked or unlocked to/from each other, the operator cannot open or close the shutters accidentally. Thus, the disc can be protected from dust, finger marks or scratches.

Moreover, at least one of multiple disc holding portions is not secured to the shutter but is just connected thereto via an elastic portion. As an elastic force is also applied from a shutter spring, the disc holding portion can be deformed elastically in the disc radial direction. For that reason, even if a disc of a non-regular diameter has been mounted, such a disc can also be held firmly without allowing it to move inconstantly.

Embodiment 14

Hereinafter, a disc cartridge 314 according to a fourteenth embodiment of the present invention will be described with reference to FIGS. 72 through 81. In the disc cartridge 314 of this embodiment, the same member as the counterpart of the disc cartridge 313 of the thirteenth embodiment is identified by the same reference numeral.

Figure 72:
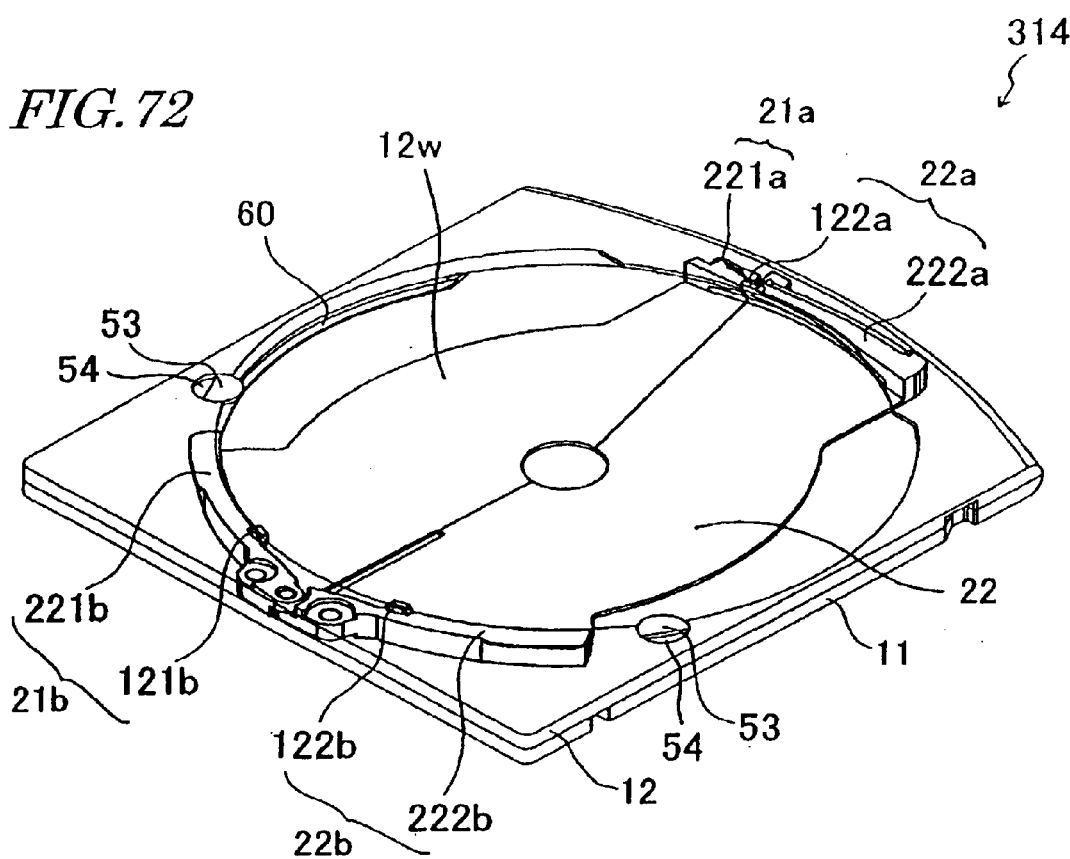
FIG. 72 is a perspective view illustrating an overall configuration for a disc cartridge according to a fourteenth embodiment of the present invention.
Figure 76:
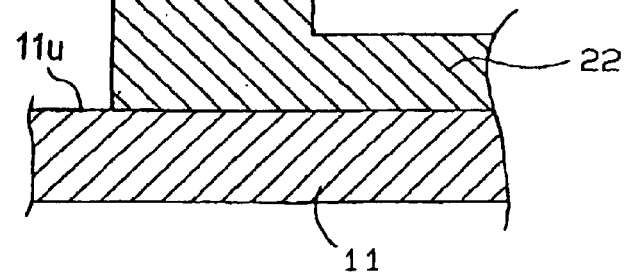
FIG. 76 is an enlarged cross-sectional view illustrating the disc holding portion and its surrounding members of the disc cartridge shown in FIG. 72.
Figure 77:
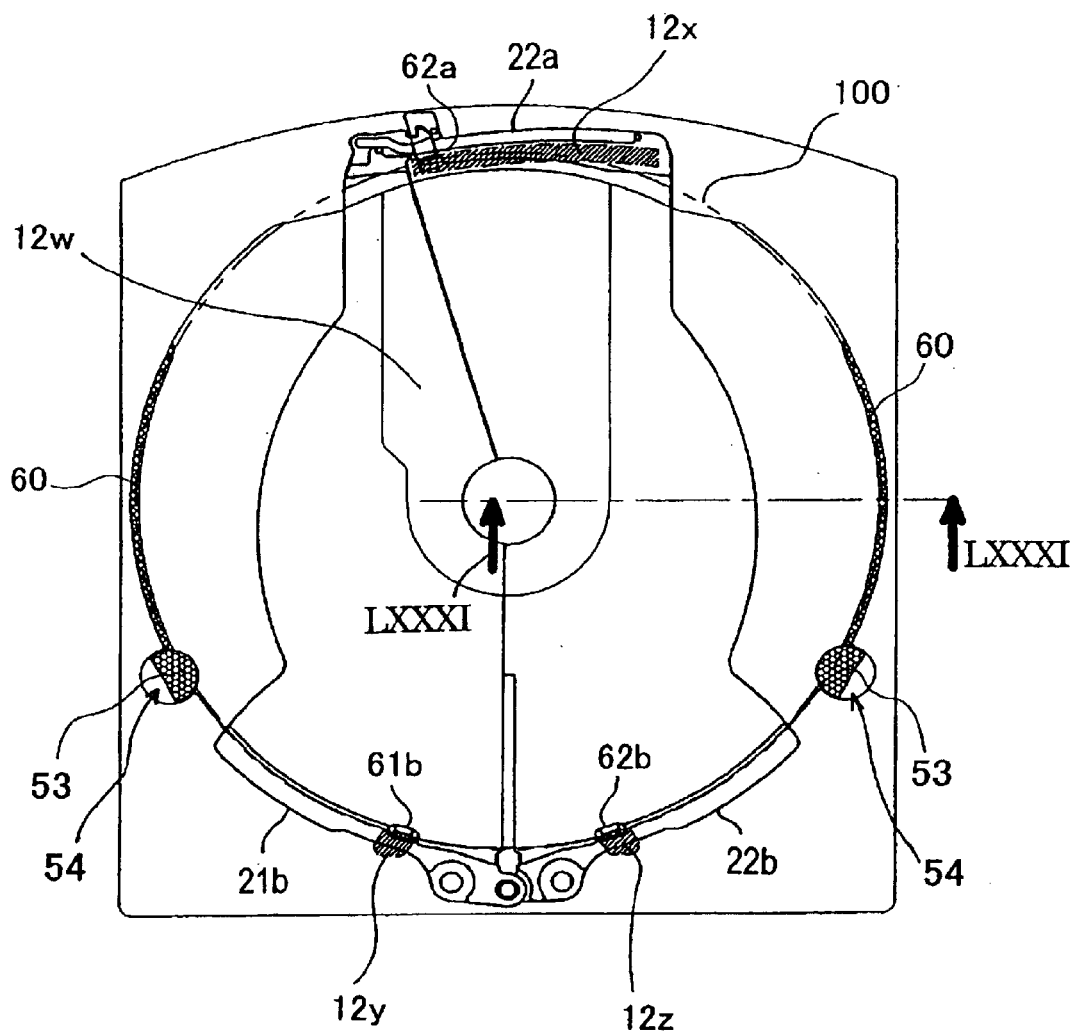
FIG. 77 is a schematic plan view illustrating a state of the disc cartridge shown in FIG. 72 in which its shutters are closed.
Figure 78:
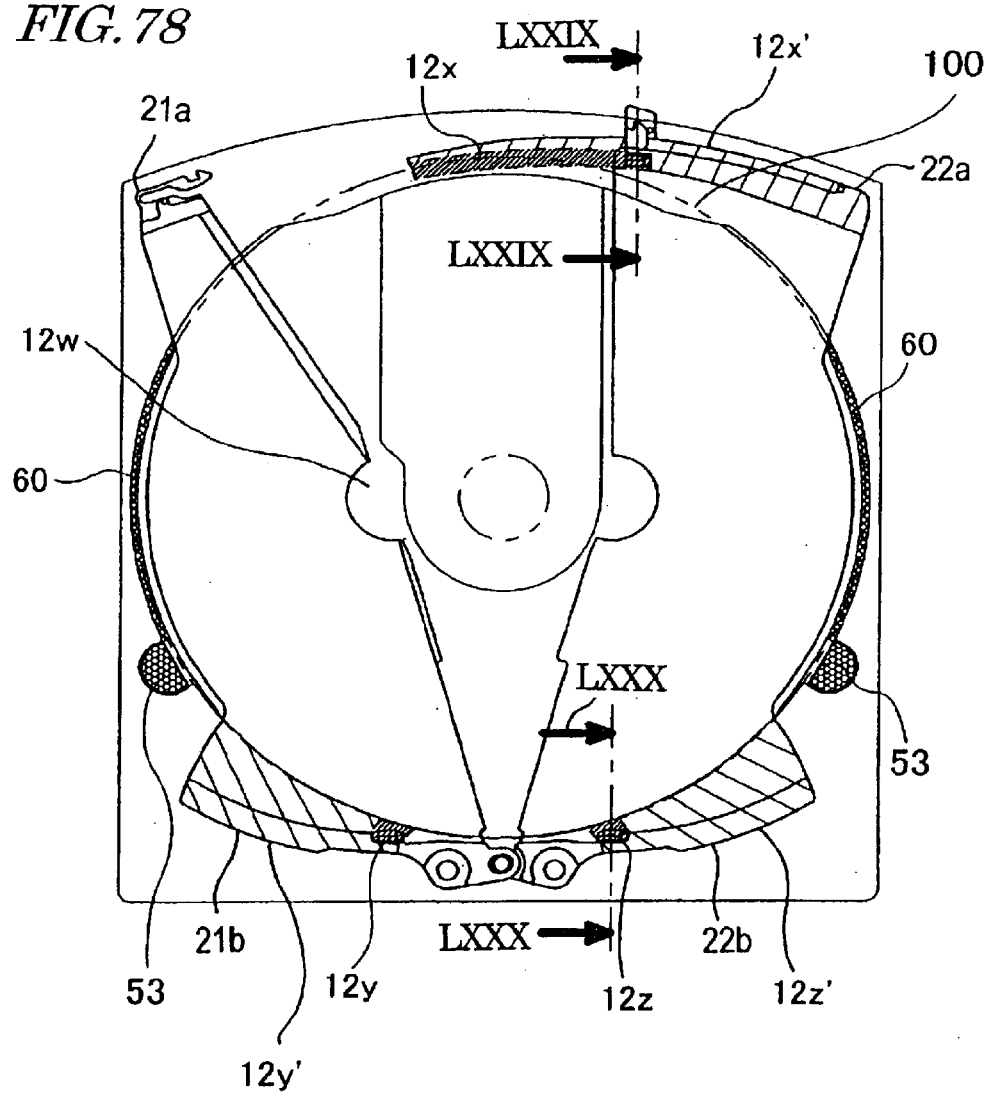
FIG. 78 is a schematic plan view illustrating a state of the disc cartridge shown in FIG. 72 in which its shutters are opened.

The disc cartridge 314 is different from the disc cartridge 313 of the thirteenth embodiment in the respective shapes of the inner upper surface 12u of the cartridge upper shell 12 (see FIG. 79), the disc holding portions 21a, 21b, 22a and 22b (see FIGS. 72 through 79) and the stopper members 53 (see FIGS. 72, 77 and 78). In addition, the disc cartridge 314 further includes a disc receiving portion 60 (see FIGS. 72 and 81). Thus, the following description of the disc cartridge 314 will be focused on these differences.

Figure 73:
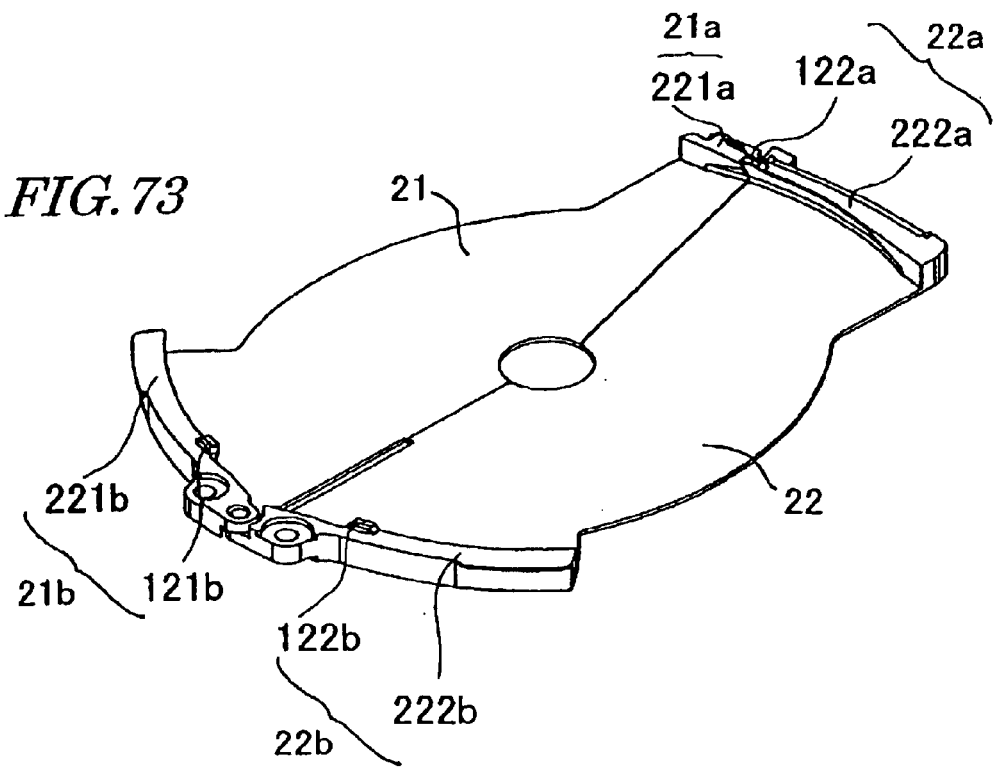
FIG. 73 is a perspective view illustrating the shutters of the disc cartridge shown in FIG. 72.
Figure 79:
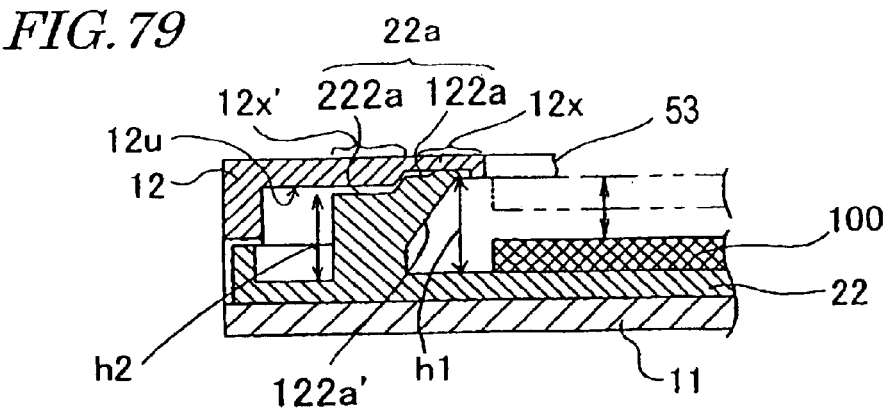
FIG. 79 is a cross-sectional view taken along the line B—B shown in FIG. 78.

In the disc cartridge 313 of the thirteenth embodiment, the respective tops of the disc holding portions 21a, 21b, 22a and 22b thereof are located at substantially the same vertical levels along the outer periphery of the disc 100. In contrast, in the disc cartridge 314 of this embodiment, protrusions are formed on the disc holding portions 21b, 22a and 22b as shown in FIGS. 73 and 79. More specifically, each of the disc holding portions 21b, 22a and 22b includes: a first portion 121b, 122a or 122b that has a protrusion thereon and has a first height h1; and a second portion 221b, 222a or 222b that has a second height h2. The other disc holding portion 21a consists of a second portion 221a that has the second height h2.

The first height h1 is greater than the second height h2 and is approximately equal to the height of the disc holding portions 21a, 21b, 22a and 22b of the disc cartridge 313 of the thirteenth embodiment. That is to say, the disc holding portions 21a, 21b, 22a and 22b of this embodiment are lower than the disc holding portions 21a, 21b, 22a and 22b of the disc cartridge 313 of the thirteenth embodiment except their first portions 121b, 122a and 122b.

Figure 74:
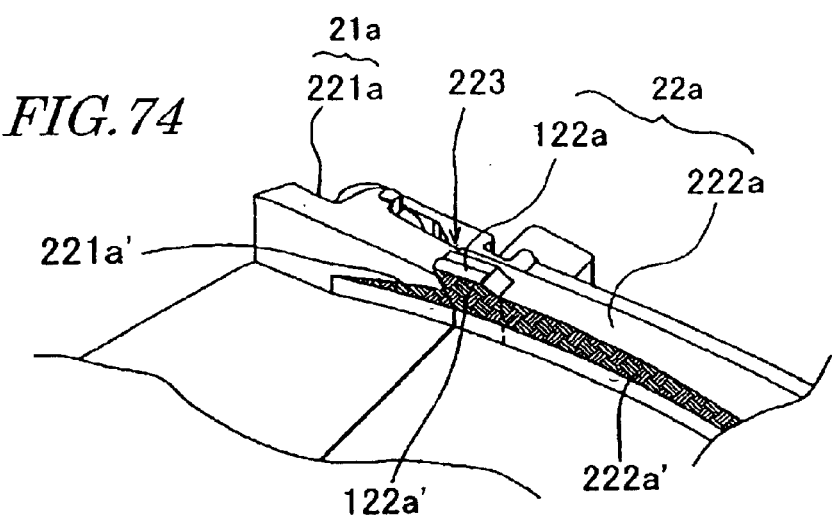
FIG. 74 is an enlarged perspective view illustrating the disc holding portions and their surrounding members of the disc cartridge shown in FIG. 72.
Figure 75:
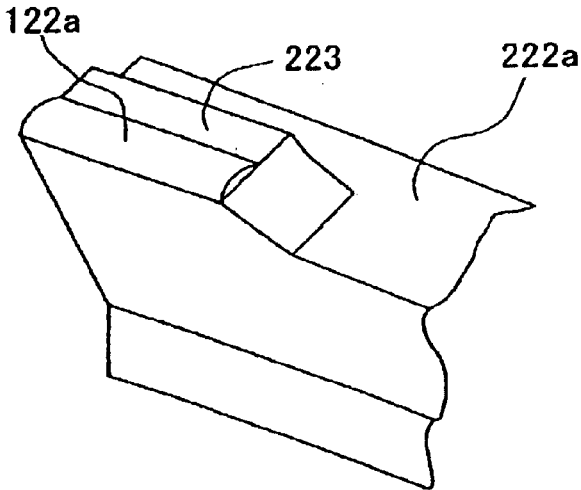
FIG. 75 is an enlarged perspective view illustrating the disc holding portion and its surrounding portion of the disc cartridge shown in FIG. 72.

Also, as shown in FIGS. 74 and 75, a step 223 is formed on the upper surface of the first portion 122a of the disc holding portion 22a. Specifically, the step 223 is provided along the outer periphery of the disc so that a part of the first portion 122a that is closer to the disc is higher than the other part thereof. A similar step is also formed on the upper surface of the first portion 121b of the disc holding portion 21b and on the upper surface of the first portion 122b of the disc holding portion 22b.

As the shutters 21 and 22 are going to be closed, the first portion 121b, 122a or 122b of the disc holding portion 21b, 22a or 22b contacts with the disc 100 earlier than any other portion thereof (i.e., earlier than the second portion 221b, 222a or 222b thereof).

Figure 80:
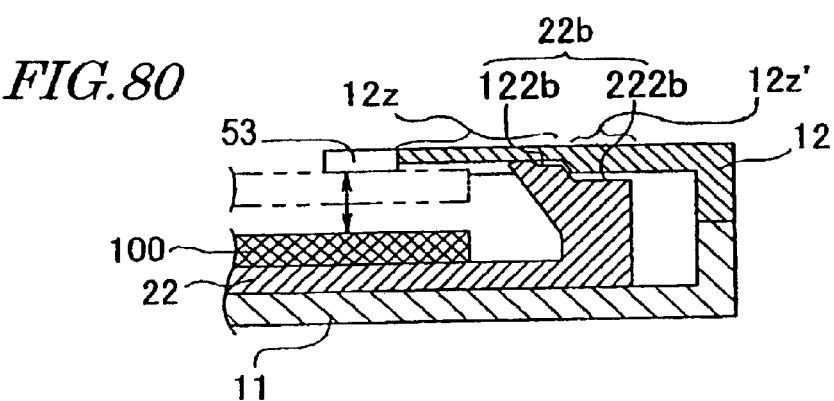
FIG. 80 is a cross-sectional view taken along the line C—C shown in FIG. 78.

The disc holding portions 21a, 21b, 22a and 22b move as the shutters 21 and 22 are opened or closed. FIG. 77 illustrates the respective positions of the disc holding portions 21a, 21b, 22a and 22b while the shutters 21 and 22 are closed. On the other hand, FIG. 78 illustrates the respective positions of the disc holding portions 21a, 21b, 22a and 22b while the shutters 21 and 22 are opened. FIGS. 79 and 80 illustrate cross sections that are respectively taken along the lines B—B and C—C shown in FIG. 78.

As shown in FIGS. 77, 78 and 79, the regions 12y, 12x and 12z on the inner upper surface 12u of the cartridge upper shell 12, through which the first portions 121b, 122a and 122b of the disc holding portions 21b, 22a and 22b pass as the shutters 21 and 22 are opened or closed, are recessed. On the other hand, the regions 12y', 12x' and 12z', through which the second portions 221b, 222a and 222b thereof pass, are not recessed. Accordingly, the cartridge upper shell 12 is thinner in the regions 12x, 12y and 12z than in the regions 12x', 12y' and 12z' and the other regions.

As shown in FIGS. 76 and 79, the top of the first portion 122a is located at a vertical level higher than the bottom of the stopper member 53. Also, the top of the first portion 122a of the disc holding portion 22a enters the recessed region 12x on the inner upper surface 12u of the cartridge upper shell 12, and the recessed region 12x receives the top of the first portion 122a. Since the step 223 is formed at the top of the first portion 122a, just a part of the upper surface of the first portion 122a is in contact with the inner upper surface 12u. On the other hand, the second portion 222a is not in contact with the inner upper surface 12u of the cartridge upper shell 12.

To open and close the shutters 21 and 22 smoothly, the friction caused by the contact between the top of the first portion 122a of the disc holding portion 22a and the inner upper surface 12u of the cartridge upper shell 12 is preferably small. For that purpose, the top of the first portion 122a of the disc holding portion 22a has a convex arc-shaped cross section when taken in the radial direction of the disc 100. This step 223 is provided to compensate for shortage in strength, which would be caused by a sharpened top, and to make that top moldable more accurately and more easily.

As shown in FIG. 80, the top of the first portion 122b of the disc holding portion 22b is also located at a vertical level higher than the bottom of the stopper member 53. And the top of the first portion 122b enters the recessed region 12z on the inner upper surface 12u of the cartridge upper shell 12 (i.e., the recessed region 12z receives the top of the first portion 122b). Although not shown, the top of the first portion 121b of the disc holding portion 21b is also located at a vertical level higher than the bottom of the stopper member 53, and enters the recessed region 12y on the inner upper surface 12u of the cartridge upper shell 12.

As described above, the regions 12x, 12y and 12z on the inner upper surface 12u of the cartridge upper shell 12 are recessed to receive portions of the disc holding portions. Thus, the overall thickness of the disc cartridge 314 can be reduced by the depth of those recessed regions 12x, 12y and 12z.

Even if the cartridge having such a structure is used either vertically or upside down, the disc 100 that is no longer chucked never fails to contact with the sloped portion 122a' of the first portion 122a of the disc holding portion 22a as the shutters 21 and 22 are going to be closed. Thereafter, the disc 100 will slide smoothly along the sloped portion 122a' to contact with the sloped portion 222a' of the second portion 222a of the disc holding portion 22a (see FIG. 74). At the same time, the disc 100 also contacts with the sloped portion 221a' of the second portion 221a of the disc holding portion 21a including no protrusion. In this manner, the disc holding portions 21a and 22a hold the disc 100 thereon cooperatively. The two other disc holding portions 21b and 22b also hold the disc 100 thereon through similar operations. Accordingly, although this disc cartridge has a reduced thickness, the disc cartridge can close the shutters in any position and can hold the disc thereon just as intended.

If this disc cartridge had its overall thickness just reduced without changing the shapes of the disc holding portions (or using the disc holding portions of the first embodiment as they are), the regions 12x, 12x', 12y, 12y', 12z and 12z' on the inner upper surface 12u of the cartridge upper shell 12, through which the disc holding portions 22a, 21b and 22b pass, should all be recessed as can be seen from FIG. 78. In that case, the cartridge upper shell 12 would have a reduced thickness over a rather wide area and such a disc cartridge would have a decreased strength. In contrast, the disc cartridge 314 can have its thickness reduced without decreasing its overall strength because the regions 12x, 12y and 12z with a reduced thickness are relatively narrow.

In this embodiment, protrusions are provided for three of the four disc holding portions to define the first portions. However, any other number may be selected depending on the number of disc holding portions or the shapes of the shutters.

The disc cartridge 314 of this embodiment is also different from the disc cartridge 313 of the thirteenth embodiment in the shape of the stopper members 53.

As shown in FIG. 72, the stopper members 53 have the shape of a notched circular plate. Specifically, notches 54 having substantially the same shape as the stopper members 53 are provided along the disc window 12w of the cartridge upper shell 12 and the stopper members 53 are engaged in a rotatable state with the notches 54. As shown in FIG. 77, the stopper members 53 are held in such a manner as to partially protrude into the disc window 12w of the cartridge upper shell 12 when rotated. Also, as shown in FIG. 78, by rotating the stopper members 53, the stopper members 53 may also be held in such a manner as to be stored inside the cartridge upper shell and not to protrude into the disc window 12w. If the stopper members 53 are easily disengaged from the notches 54 unintentionally, then the side surfaces of the stopper members 53 and the notches 54 of the cartridge upper shell 12 may have mutually engaging concave and convex portions, for example.

In such a structure, the thickness of the stopper members 53 may be substantially equal to that of the upper part of the cartridge upper shell 12. Thus, the disc cartridge 314 can have a reduced overall thickness.

The disc cartridge 314 of this embodiment is also characterized by including a disc receiving portion 60 at the bottom of the inner periphery of the disc storage portion. The disc storage portion is defined by the inner lower surface 11u and the inner side surface 11i of the cartridge lower shell 11 as shown in FIGS. 72, 77, 78 and 81. The disc receiving portion 60 has an upper surface 60a, which is parallel to the inner lower surface 11u of the cartridge lower shell 11.

While the shutters 21 and 22 are closed and the disc 100 is held by the disc holding portions, the outer edge and its surrounding portion of the signal recording side 100A of the disc 100 are in contact with the upper surface 60a of the disc receiving portion 60. Thus, no dust will be deposited on the signal recording side 100A of the disc 100 or accumulated on the inner lower surface 11 of the cartridge lower shell.

Figure 81:
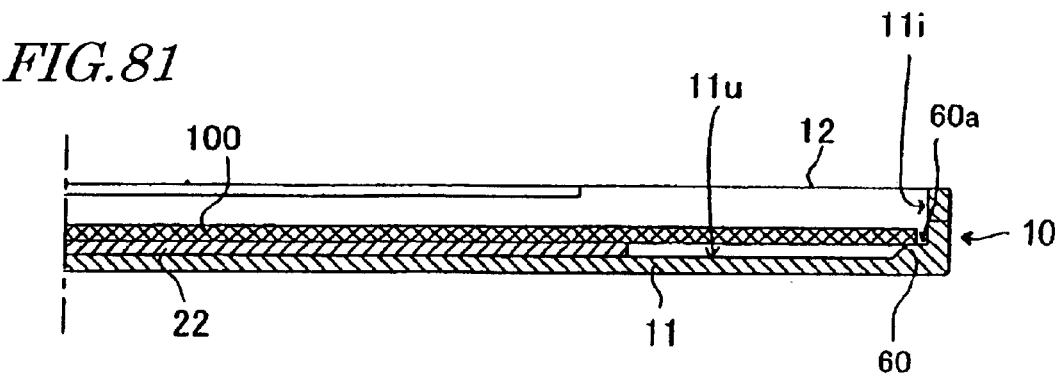
FIG. 81 is a cross-sectional view taken along the line A—A shown in FIG. 77.
Figure 82:
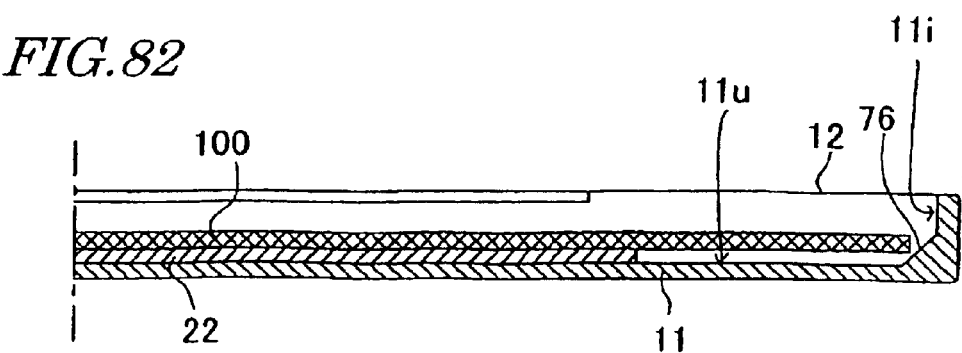
FIG. 82 is a cross-sectional view illustrating a modified example of the disc receiving portion.

Alternatively, the disc receiving portion 60 may have any shape other than that shown in FIG. 81. For example, as shown in FIG. 82, a disc receiving portion 76 having a tapered shape may be formed so as to contact with the inner lower surface 11u and the inner side surface 11i of the cartridge lower shell. In that case, while the shutters 21 and 22 are closed and the disc 100 is held by the disc holding portions, the outer edge of the signal recording side 100A of the disc 100 contacts with the disc receiving portion 76.

Embodiment 15

Hereinafter, a disc cartridge 315 according to a fifteenth embodiment of the present invention will be described with reference to FIGS. 83 through 87. In the disc cartridge 315 of this embodiment, the same member as the counterpart of the disc cartridge 314 of the fourteenth embodiment is identified by the same reference numeral.

Figure 83:
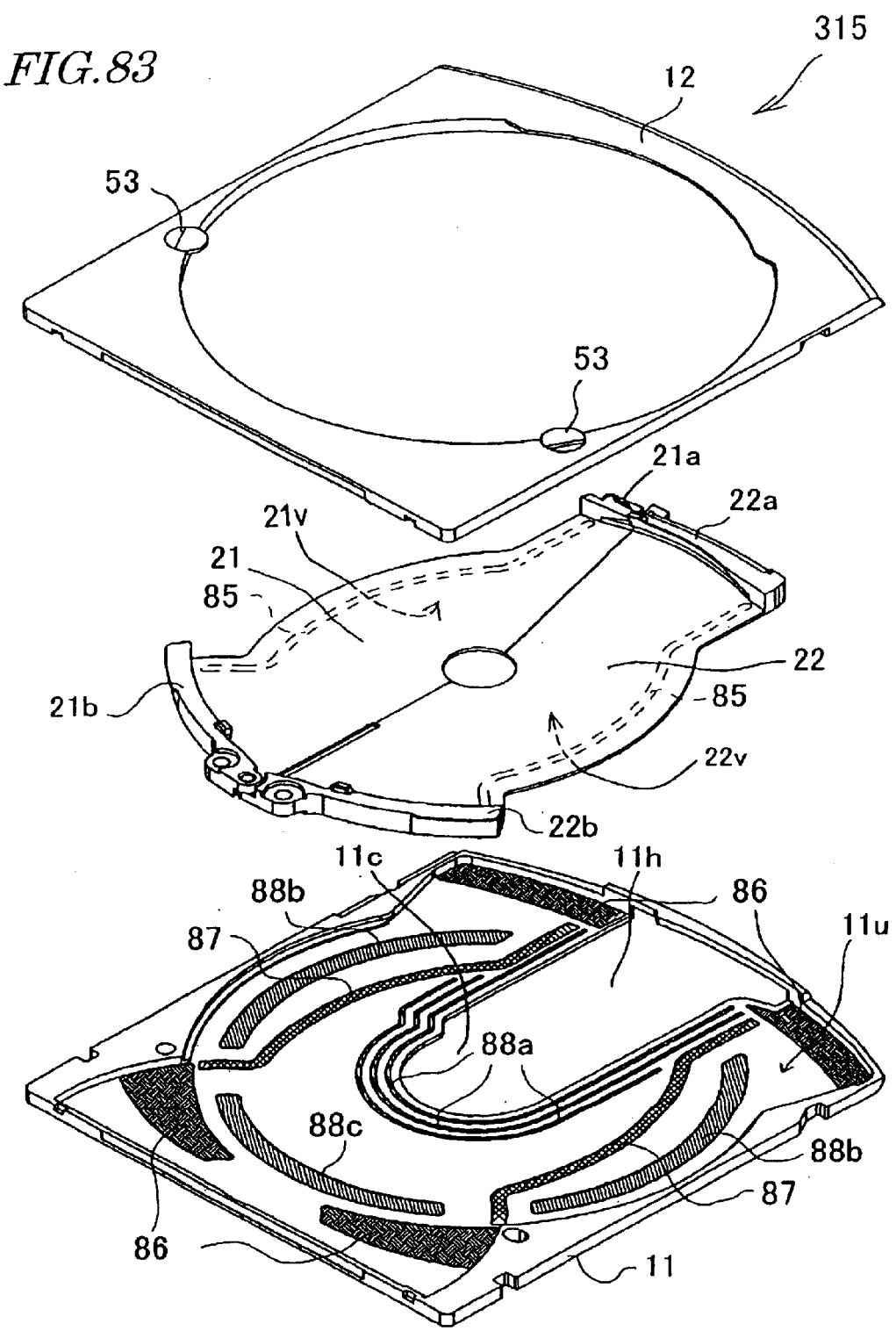
FIG. 83 is an exploded perspective view illustrating an exploded state of a disc cartridge according to a fifteenth embodiment of the present invention.

As shown in FIG. 83, the disc cartridge 315 is different from the disc cartridge 314 in that the disc cartridge 315 includes four types of recesses 85, 86, 87 and 88a through 88c on respective regions of the inner lower surface 11u of the cartridge lower shell 11 that contact with the shutters 21 and 22 and on the lower surfaces 21v and 22v of the shutters 21 and 22. These four types of recesses will be described one by one. Where the disc cartridge is supposed to hold a 12 cm disc, these recesses may have a depth of about 0.1 mm to about 0.3 mm, for example.

Figure 84:
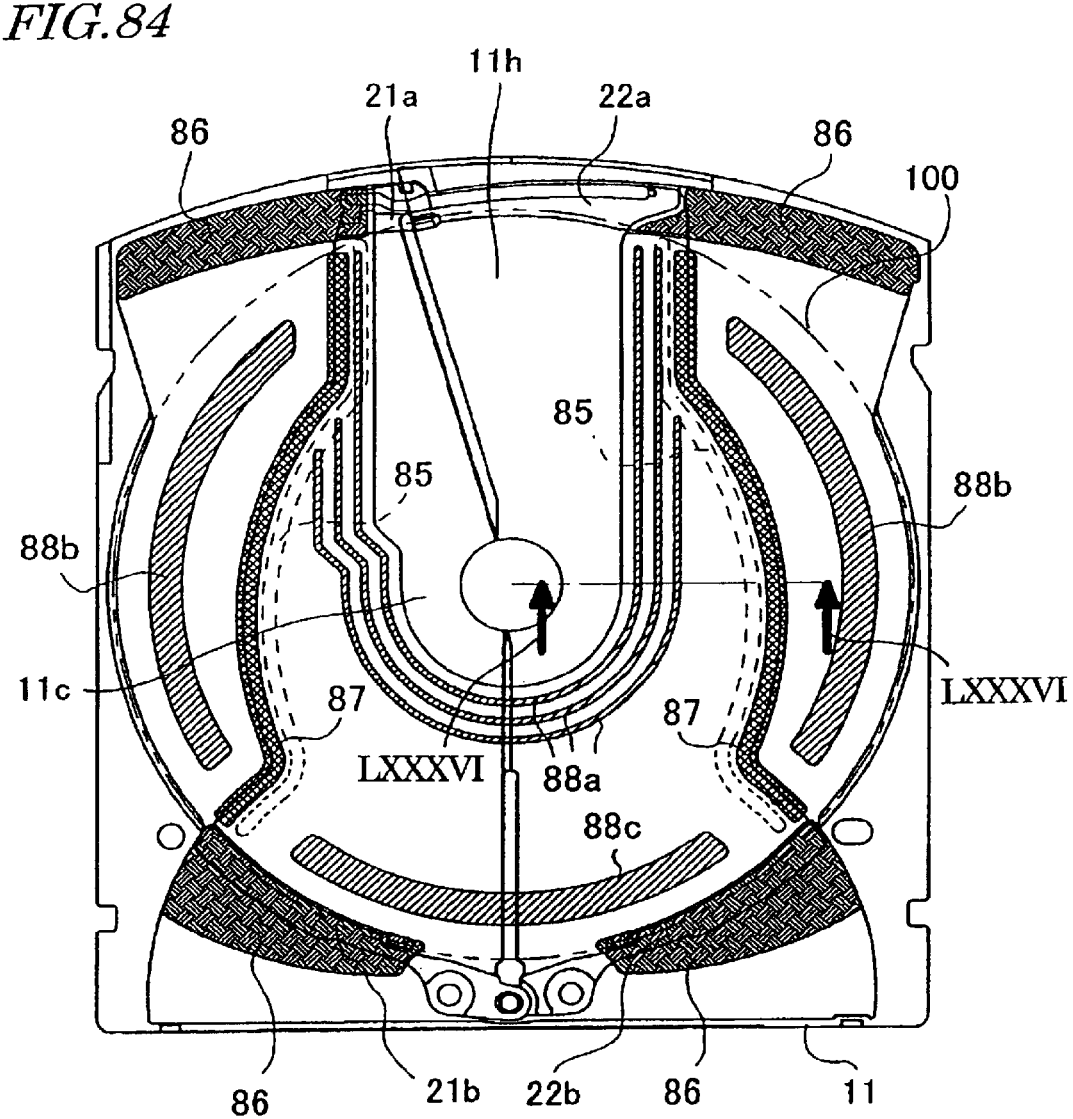
FIG. 84 is a schematic plan view illustrating a state of the disc cartridge shown in FIG. 83 in which its shutters are closed.
Figure 85:
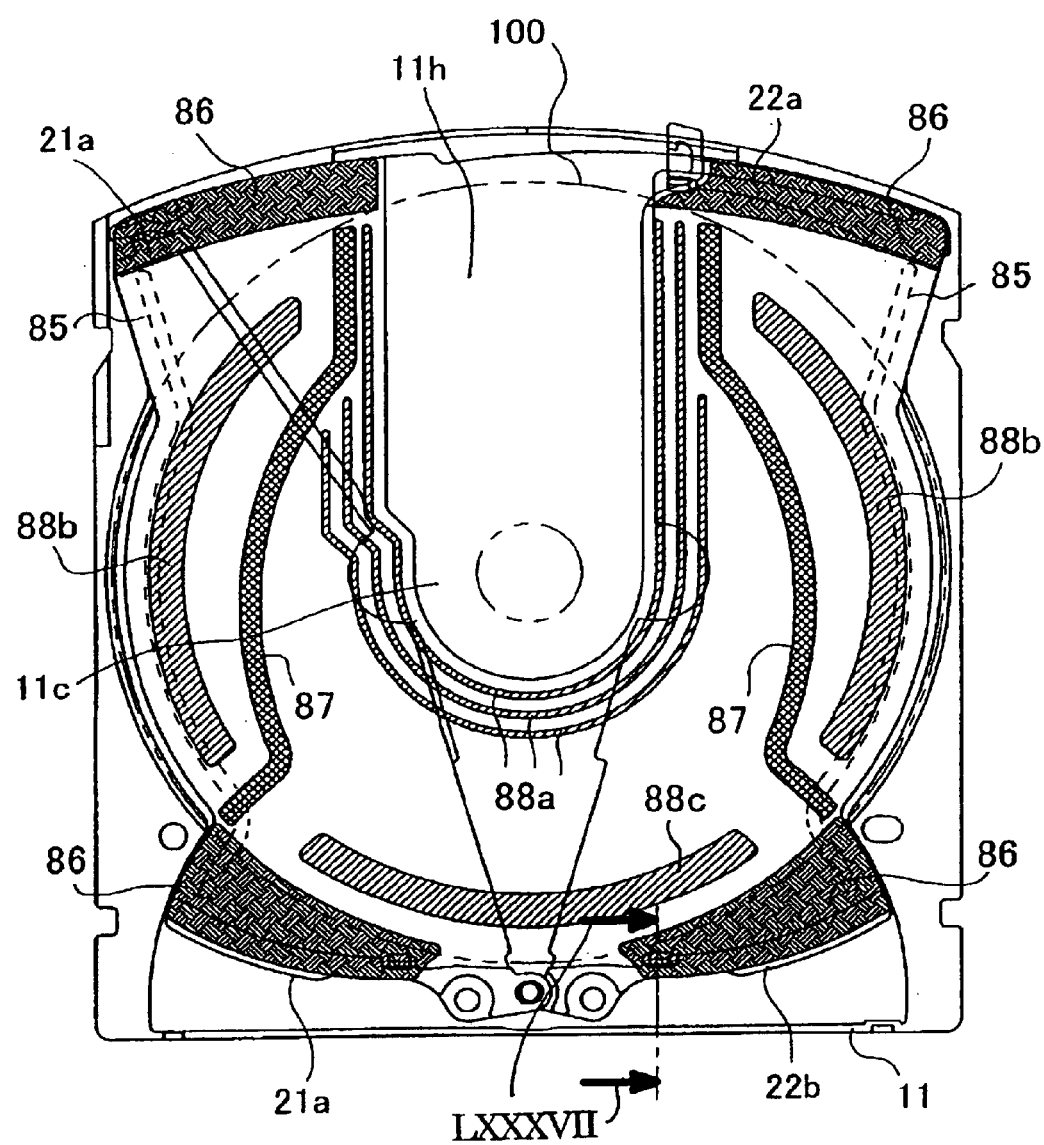
FIG. 85 is a schematic plan view illustrating a state of the disc cartridge shown in FIG. 83 in which its shutters are opened.

As can be seen from FIGS. 84 and 85 illustrating a state where the shutters 21 and 22 are closed and a state where the shutters 21 and 22 are opened, respectively, the first type of recesses 86 are formed on respective regions of the inner lower surface 11u of the cartridge lower shell 11 that contact with the disc holding portions 21a, 21b, 22a and 22b of the shutters 21 and 22 being opened or closed.

The disc holding portions 21a, 21b, 22a and 22b are sandwiched between the cartridge upper and lower shells 12 and 11 with almost no gap left between them. Accordingly, when respective members of the disc cartridge 315 are assembled together or if any of those members of the disc cartridge 315 has a size that is greatly different from the designed one, the disc holding portions 21a, 21b, 22a and 22b might contact with the cartridge upper and lower shells 12 and 11 strongly. In that case, excessive friction would be created between the disc holding portions 21a, 21b, 22a and 22b and the cartridge upper or lower shell 12 or 11. As a result, the shutters 21 and 22 might be unable to be opened or closed so easily or dust might be stirred up due to the friction.

However, by providing the first type of recesses 86, gaps are provided under the disc holding portions 21a, 21b, 22a and 22b, thus reducing such friction. Then, the shutters 21 and 22 can always be opened or closed smoothly and the dust to be stirred up due to the friction can be reduced.

Figure 86:
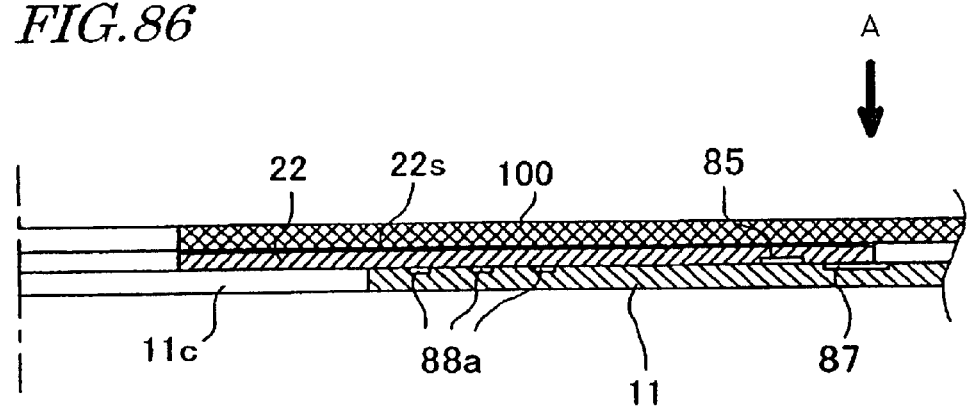
FIG. 86 is a cross-sectional view taken along the line D—D shown in FIG. 84.
Figure 87:
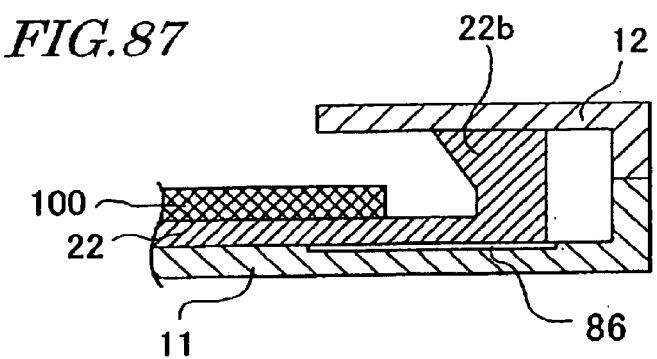
FIG. 87 is a cross-sectional view taken along the line E—E shown in FIG. 85.

The second type of recesses 87 are formed on those regions where the respective outer edges of the shutters 21 and 22 are located while the shutters 21 and 22 are closed. As shown in FIGS. 84 and 86, the second type of recesses 87 preferably include the lines on the inner lower surface 11u of the cartridge lower shell 11 that correspond to the outer edges of the shutters 21 and 22 and are preferably present both inside and outside the lines.

The disc cartridge 315 is supposed to store the disc therein with one side thereof exposed, and the disc 100 can be pressed in the direction indicated by the arrow A in FIG. 86. To protect the signal recording side 100A of the disc 100, the nonwoven fabrics 21s and 22s are provided but the outer edges of the shutters 21 and 22 are not completely covered with the nonwoven fabrics 21s and 22s. Accordingly, if the disc 100 is pressed in the arrowed direction A, then the outer edges of the shutters 21 and 22 contact with the signal recording side 100A of the disc 100, thus possibly scratching the signal recording side 100A.

However, if the second type of recesses 87 are provided, the shutters 21 and 22 may be deformed in such a manner that the outer edges thereof are partially forced into the second type of recesses 87. Then, the pressing force can be dispersed, and the outer edges of the shutters 21 and 22 will not contact with the signal recording side 100A of the disc 100 too strongly.

The third type of recesses include: the third type of recesses 88a that are provided on the inner lower surface 11u so as to surround the chucking and head openings 11c and 11h; the third types of recesses 88b that are formed on those regions of the inner lower surface 11u that are not overlapped by the shutters 21 and 22 being closed; and the third type of recess 88c that is provided on a region of the inner lower surface 11u that is overlapped by the shutters 21 and 22 being closed. The third type of recesses 88b and 88c are provided as arcs along the inner side surface of the disc storage portion. In this embodiment, the number of the recesses 88a of the third type is three.

This disc cartridge 315 is also provided with various types of structures (e.g., a disc receiving portion) for preventing dust from entering the disc cartridge or being deposited on the signal recording side of the disc. However, it is difficult to totally eliminate that entering or deposition of dust.

Thus, the third type of recesses are provided to accumulate the dust that has entered the disc cartridge 315. Specifically, as the shutters 21 and 22 are going to be opened or closed, the dust is collected in these recesses of the third type. Once collected in the third type of recesses, the dust never contacts with the shutters 21 and 22 and remains in the third type of recesses without going out of the third type of recesses. Accordingly, by accumulating the dust in the third type of recesses in this manner, the dust will not interfere with the operation of the shutters or will be stirred up to a much lesser degree due to the friction.

It should be noted that these effects are also achievable by the first type of recesses 86 or the second type of recesses 87. Accordingly, the disc cartridge 315 does not have to include all of the first, second and third types of recesses 86, 87, 88a, 88b and 88c but may include just one type of recesses. Even so, the shutters will not be interfered with their operation by the dust and almost no dust will be stirred up due to the friction to say the least.

Also, to remove the dust that has entered the gap between the shutters 21 and 22 and the inner lower surface 11u of the cartridge lower shell 11 and accumulate it in the second type of recesses 87, for example, even more effectively, the respective lower surfaces 21v and 22v of the shutters 21 and 22 may be provided with the recesses 85 along the outer edges thereof. In that case, when the shutters 21 and 22 are closed, these recesses 85 are preferably located inside the second type of recesses 87 (i.e., closer to the center of the cartridge) as shown in FIG. 84. Also, as shown in FIG. 86, while the shutters 21 and 22 are closed, the recesses 85 of the shutters 21 and 22 are preferably discontinuous from the second type of recesses 87 on the inner lower surface 11u of the cartridge lower shell 11.

When the recesses 85 are provided, the outer edge portions of the shutters 21 and 22 are deformed more easily. Accordingly, even when a force is externally applied to the disc 100 in the arrowed direction A, the outer edge portions of the shutters 21 and 22 will much less likely contact with the signal recording side 100A so strongly as to scratch it. Optionally, a nonwoven fabric, for example, may be welded or adhered to these recesses 86, 87, 88a, 88b and 88c. Then, the gaps of the cartridge body can be filled and entering of extraneous dust can be prevented with even more certainty.

In this embodiment, the various types of recesses are provided for the disc cartridge 314 of the fourteenth embodiment. Alternatively, these recesses may also be provided for the disc cartridge according to any of the eighth through thirteenth embodiments.

Embodiment 16

Hereinafter, a disc cartridge 316 according to a sixteenth embodiment of the present invention will be described with reference to FIGS. 88 through 93. In the disc cartridge 316 of this embodiment, the same member as the counterpart of the disc cartridge 313 of the thirteenth embodiment is identified by the same reference numeral.

Figure 88:
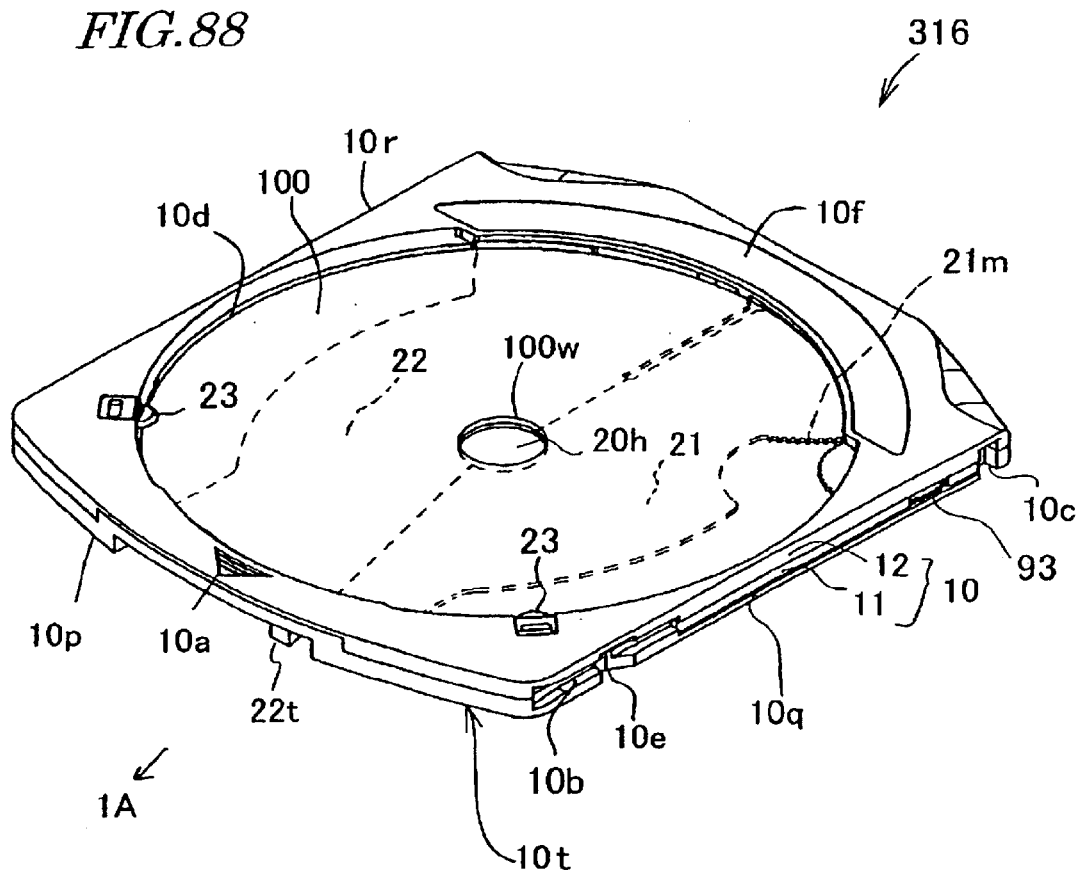
FIG. 88 is a perspective view illustrating an overall configuration for a disc cartridge according to a sixteenth embodiment of the present invention.

As shown in FIG. 88, the disc cartridge 316 of this embodiment includes: a first opening/closing portion 22t on a first side surface 10p of the cartridge body that extends substantially vertically to the direction 1A in which this disc is inserted; and a second opening/closing portion 93 on a second side surface 10q thereof. The first opening/closing portion 22t has the same structure as the opening/closing portion 22t of the disc cartridge of the thirteenth embodiment.

Figure 89:
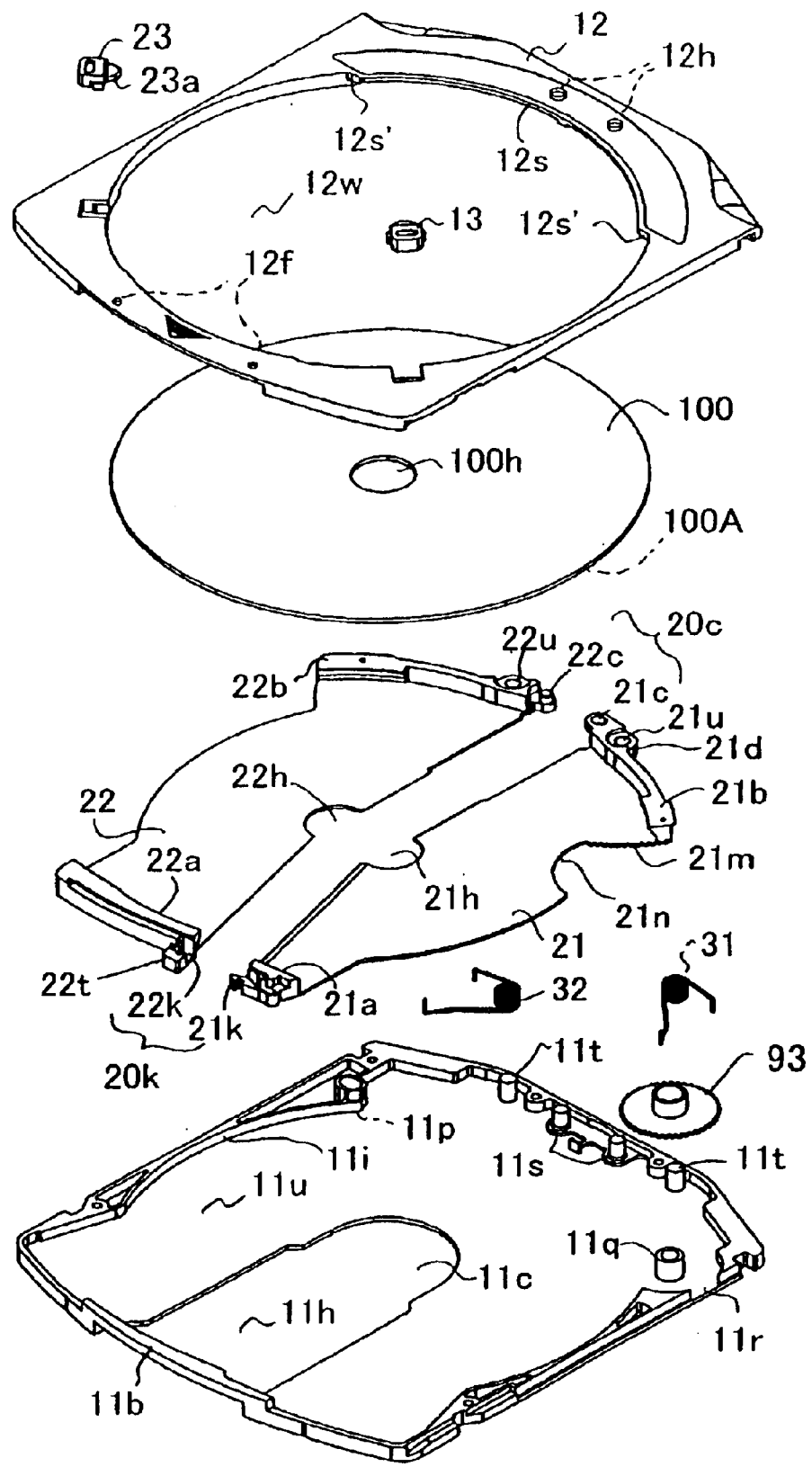
FIG. 89 is an exploded perspective view illustrating an exploded state of the disc cartridge shown in FIG. 88.

As shown in FIG. 89, the second opening/closing portion 93 is formed in the shape of a gear having a hole that can be inserted into a rotation shaft 11q provided for the cartridge lower shell 11. A side surface of the cartridge lower shell 11 has an opening 11r to expose a portion of the second opening/closing portion 93 through the second side surface 10q of the cartridge body 10 when the second opening/closing portion 93 is inserted into the rotation shaft 11q. Alternatively, the rotation shaft 11q may be provided for the cartridge upper shell 12.

Two shutters 21 and 22 are also provided to expose or cover the head and chucking openings 11h and 11c of the cartridge lower shell 11. The first opening/closing portion 22t forms an integral part of the shutter 22 (i.e., the first shutter member). On the other hand, a sector gear 21m, which engages with the second opening/closing portion 93 having the gear shape, is formed on the outer side surface of the shutter 21 (i.e., the second shutter member) and is located near the disc holding portion 21b. The center of the sector gear 21m is the rotation hole 21u of the shutter 21. A concave portion 21n is provided adjacent to the sector gear 21m. This concave portion 21n is formed to define a space in which the second opening/closing portion 93 having the gear shape engages with the sector gear 21m.

Figure 90:
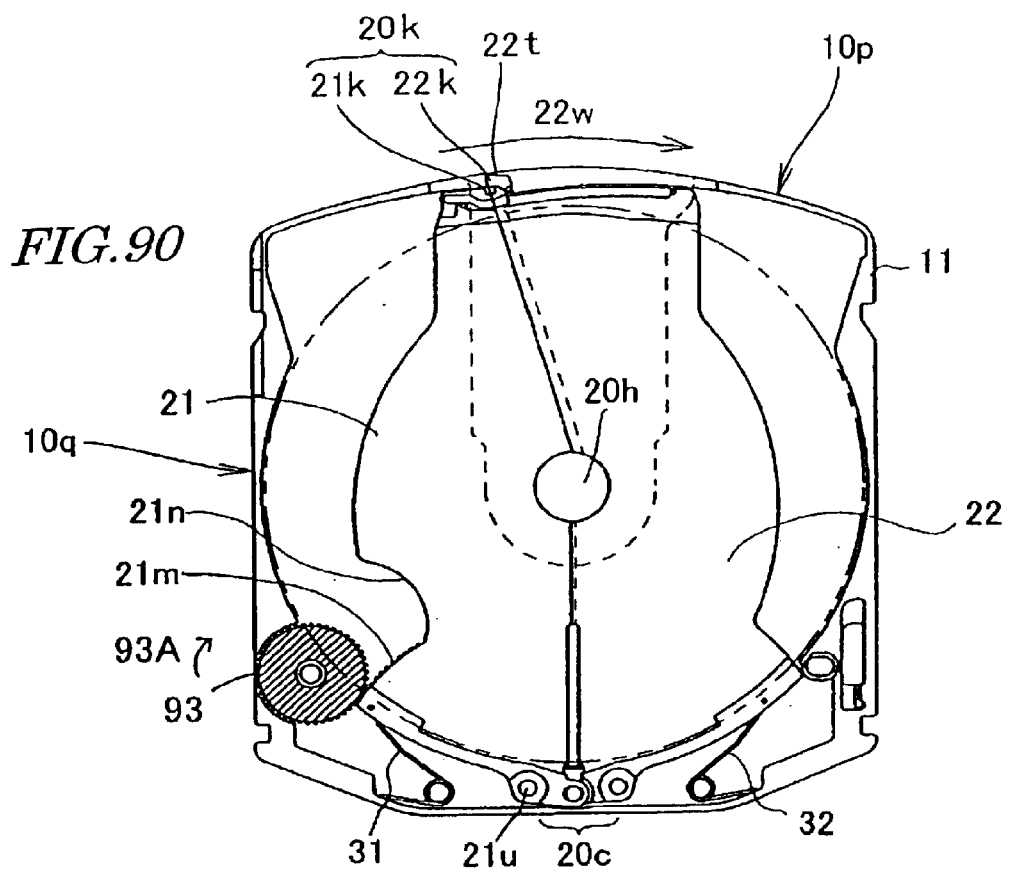
FIG. 90 is a schematic plan view illustrating a state of the disc cartridge shown in FIG. 88 in which its shutters are closed.
Figure 91:
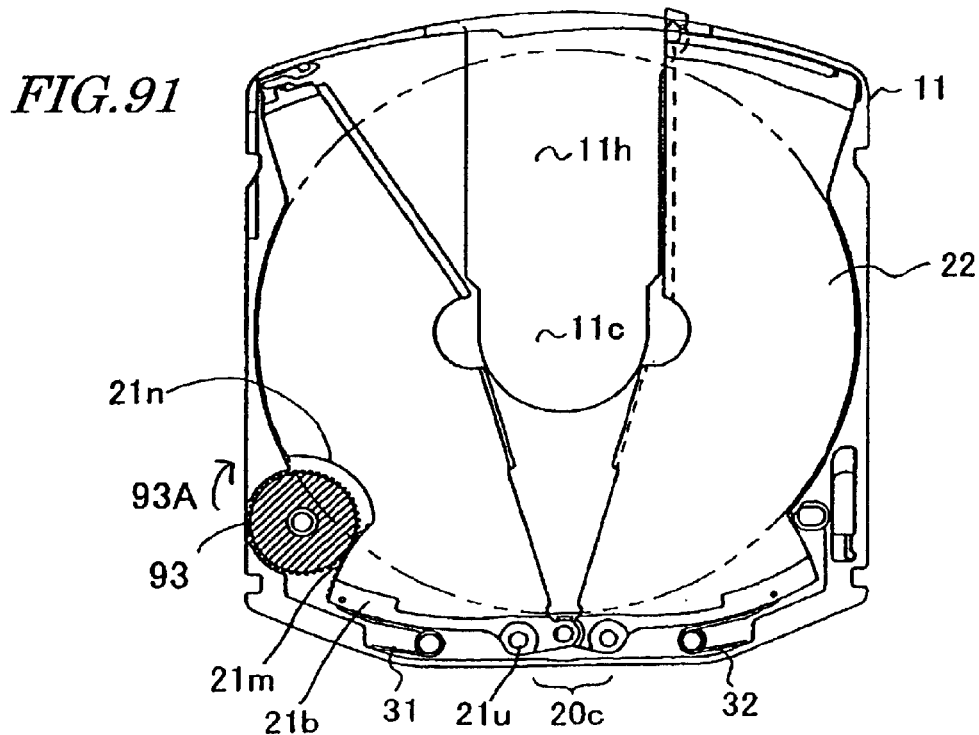
FIG. 91 is a schematic plan view illustrating a state of the disc cartridge shown in FIG. 88 in which its shutters are opened.

The shutters 21 and 22 may be opened or closed by using the first opening/closing portion 22t in the following manner. First, as shown in FIG. 90, the locking protrusion portion 21k and the locking engaging portion 22k, which together make up the locking mechanism 20k, are disengaged from each other. Then, the first opening/closing portion 22t is slid along the first side surface 10p of the cartridge as indicated by the arrow 22W. As a result, the movement of the shutter 22 is transmitted to the shutter 21 by way of the interlocking mechanism 20c and these two shutters 21 and 22 expose the head and chucking openings 11h and 11c cooperatively as shown in FIG. 91.

The shutters 21 and 22 may also be opened or closed by using the second opening/closing portion 93 in the following manner. First, the locking mechanism 20k is unlocked as shown in FIG. 90. Next, the second opening/closing portion 93 is rotated to the direction indicated by the arrow 93A. Then, the sector gear 21m gets engaged with the geared second opening/closing portion 93 and starts to rotate around the rotation hole 21u, thereby opening the shutter 21. Since the movement of the shutter 21 is transmitted to the shutter 22 by way of the interlocking mechanism 20c and these two shutters 21 and 22 expose the head and chucking openings 11h and 11c cooperatively. When the head and chucking openings 11h and 11c are completely exposed by the shutters 21 and 22 as shown in FIG. 91, a portion of the second opening/closing portion 93 is located inside the concave portion 21n of the shutter 21.

In closing the shutters 21 and 22, the first opening/closing portion 22t may be slid in the direction opposite to the direction 22W or the second opening/closing portion 93 may be rotated to the direction opposite to the direction 93A. In this embodiment, the shutter springs 31 and 32 are provided to apply an elastic force to the shutters 21 and 22 in such a direction as to close the shutters 21 and 22. Accordingly, unless a force that is strong enough to open, or keep opened, the shutters 21 and 22 against the elastic force of the shutter springs 31 and 32 is applied to the first or second opening/closing portion 22t or 93, the shutters 21 and 22 close themselves automatically even without performing the operations described above.

In the disc cartridge 316 of this embodiment, the opening/closing portions are provided for the shutters 21 and 22 both on a surface that is perpendicular to the disc inserting direction and on a surface that is parallel to the disc inserting direction. Accordingly, no matter whether the disc drive used is compatible with only a disc cartridge including a shutter opening/closing portion on a side surface that extends perpendicularly to the disc cartridge inserting direction or only a disc cartridge including a shutter opening/closing portion on a side surface that extends parallelly to the disc cartridge inserting direction, the disc drive can always write or read a signal on/from the disc in the disc cartridge of this embodiment.

Also, in the disc cartridge 316 of this embodiment, the second opening/closing portion 93, provided for the side surface parallel to the direction in which the disc cartridge 316 is inserted, has a gear shape. Accordingly, a shutter opening/closing mechanism to be provided for the disc drive may also be any of various shapes of gears that can engage with the second opening/closing portion 93. Thus, the disc drive may use a relatively simple mechanism to open or close the shutters 21 and 22 of the disc cartridge 316.

Figure 92:
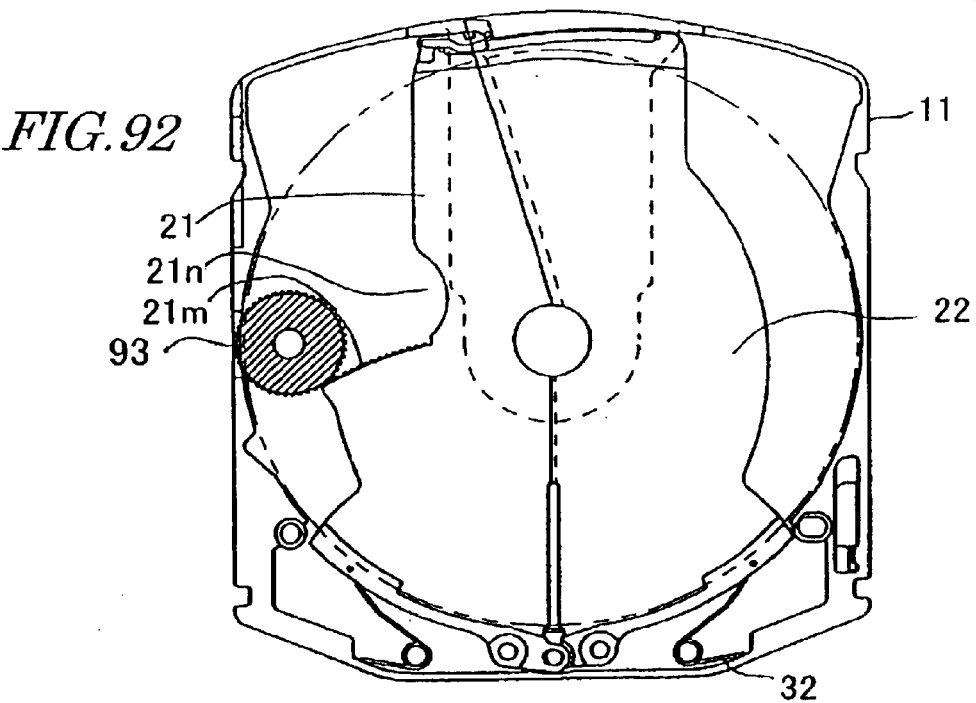
FIG. 92 is a schematic plan view illustrating a modified example of the disc cartridge shown in FIG. 88 to show a state where the shutters of the disc cartridge are closed.
Figure 93:
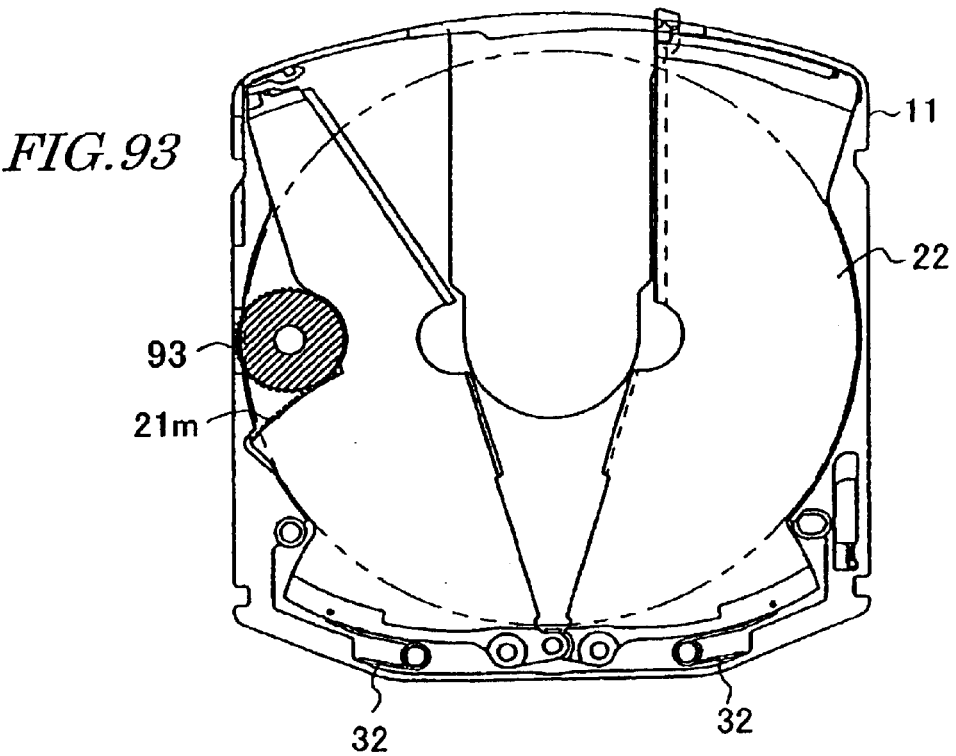
FIG. 93 is a schematic plan view illustrating a state of the disc cartridge shown in FIG. 92 in which its shutters are opened.

In the embodiment described above, the sector gear 21m is provided near the disc holding portion 21b. This is because the distance between the sector gear 21m at such a position and the rotation hole 21u of the shutter 21 is relatively short and because the sector gear 21m needs to have a relatively short length to open the shutter 21 fully. However, the sector gear 21m does not have to be provided at this position. Alternatively, the sector gear 21m and the second opening/closing portion 93 may also be provided at such positions as shown in FIGS. 92 and 93. In FIGS. 92 and 93, the sector gear 21m is located at such a position that when extended, a circular trace drawn by the sector gear 21m will substantially intersect with the center of the disc, while the second opening/closing portion 93 is provided at such a position as to engage with the sector gear 21m. When the second opening/closing portion 93 is provided at such a position, the sector gear 21m should be relatively long to open the shutter 21 fully, but the distance between the sector gear 21m and the rotation hole 21u may also be relatively long. That is to say, since there is a longer distance between the fulcrum and the application point in that case, a lighter force is needed to rotate the second opening/closing portion 93 and open or close the shutters 21 and 22.

Embodiment 17

Hereinafter, a disc cartridge 317 according to a seventeenth embodiment of the present invention will be described with reference to FIGS. 94 through 97. In the disc cartridge 317 of this embodiment, the same member as the counterpart of the disc cartridge 316 of the sixteenth embodiment is identified by the same reference numeral.

Figure 94:
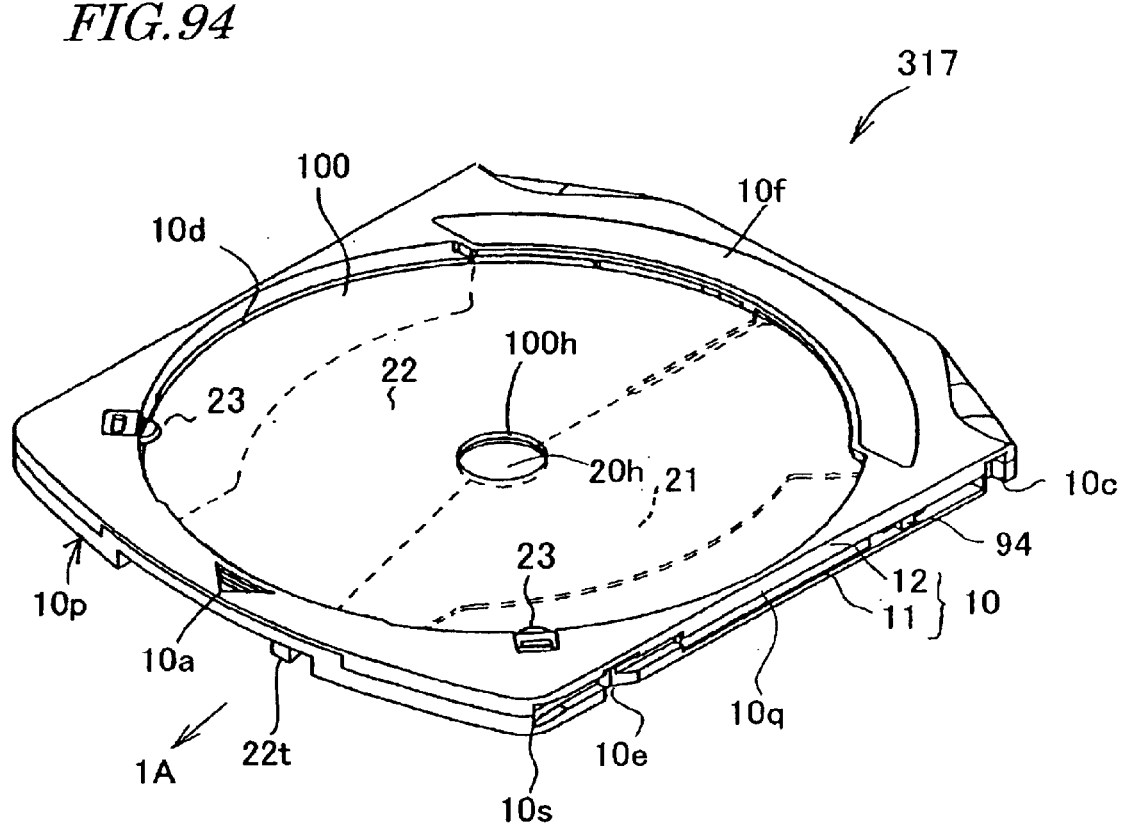
FIG. 94 is a perspective view illustrating an overall configuration for a disc cartridge according to a seventeenth embodiment of the present invention.

As shown in FIG. 94, the disc cartridge 317 of this embodiment includes a second opening/closing portion 94 on its second side surface 10q instead of the second opening/closing portion 93 of the disc cartridge 316 of the sixteenth embodiment.

Figure 95:
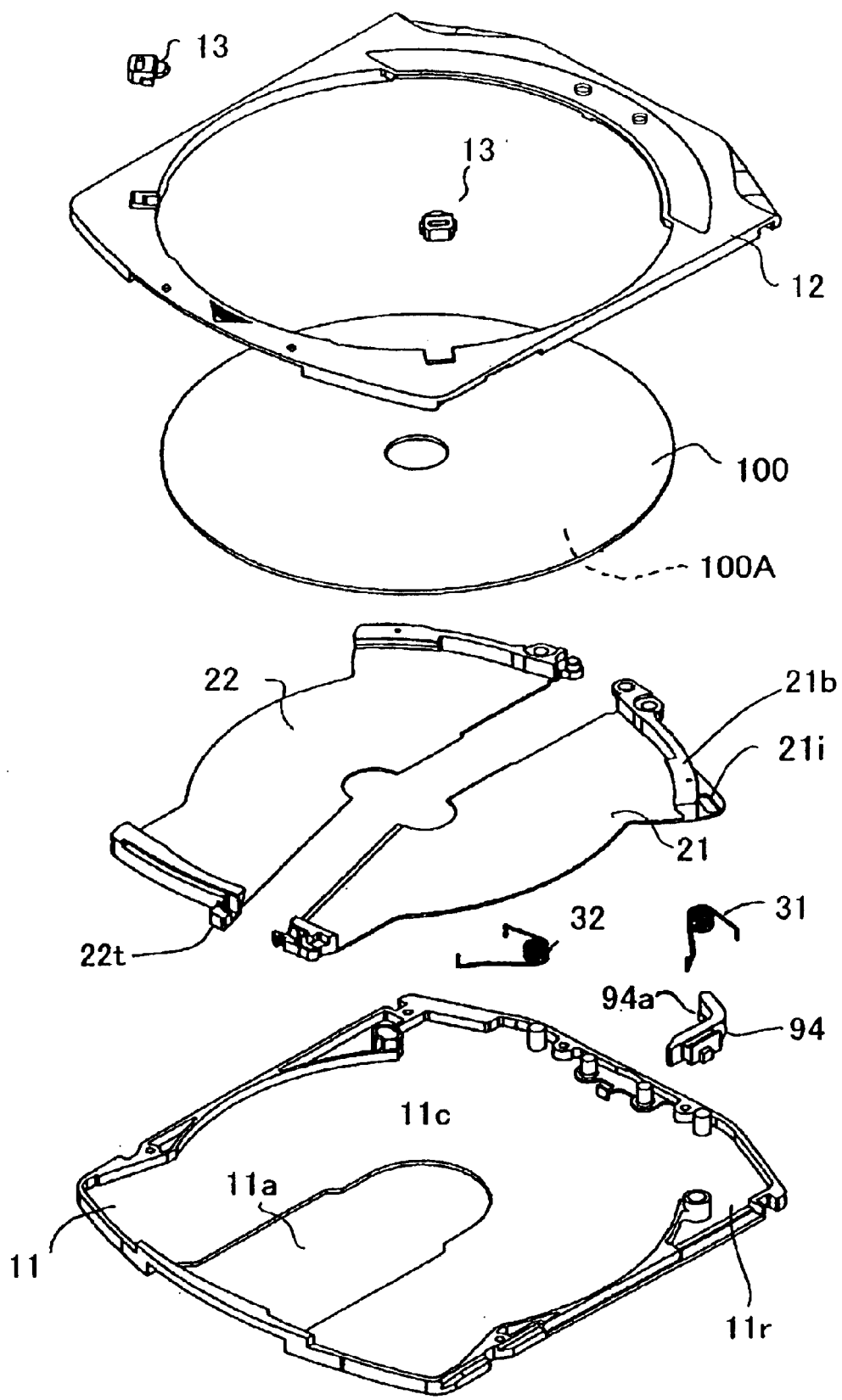
FIG. 95 is an exploded perspective view illustrating an exploded state of the disc cartridge shown in FIG. 94.

As can be seen from FIG. 95, the second opening/closing portion 94 is a link member that can slide along the opening 11r on the side surface of the cartridge lower shell 11 and is bent approximately at the center thereof. Also, the second opening/closing portion 94 includes a protrusion 94a at one end thereof. This protrusion 94a engages with a groove 21i that is provided on the shutter 21 near the disc holding portion 21b thereof.

Figure 96:
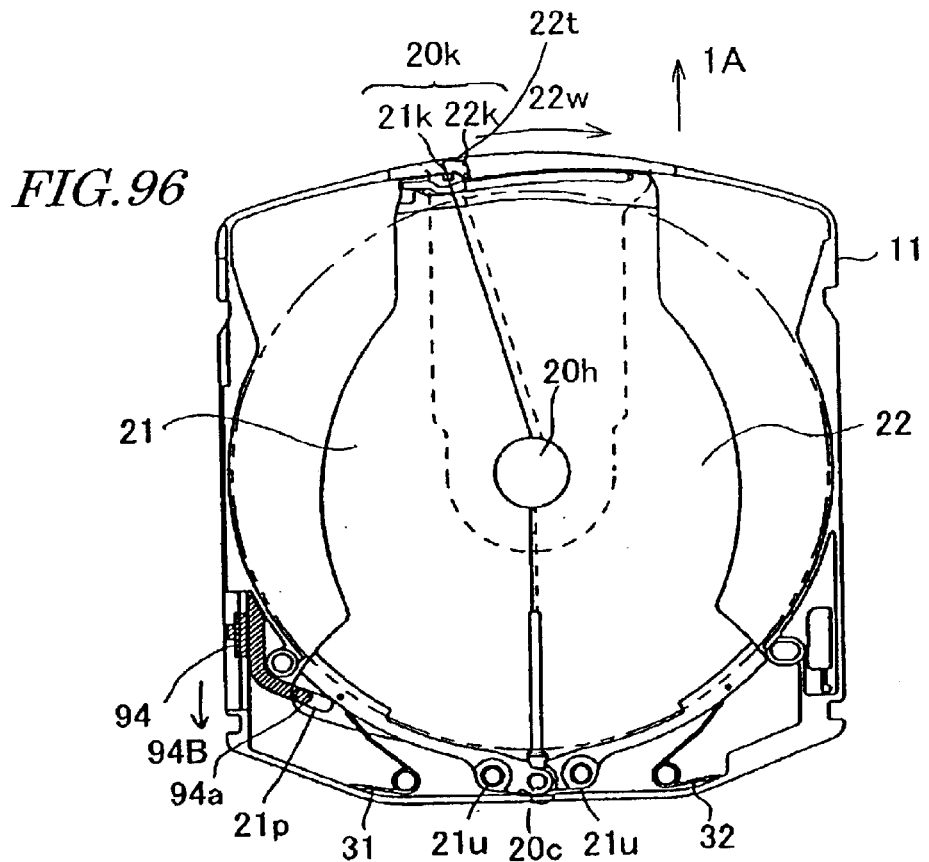
FIG. 96 is a schematic plan view illustrating a state of the disc cartridge shown in FIG. 94 in which its shutters are closed.
Figure 97:
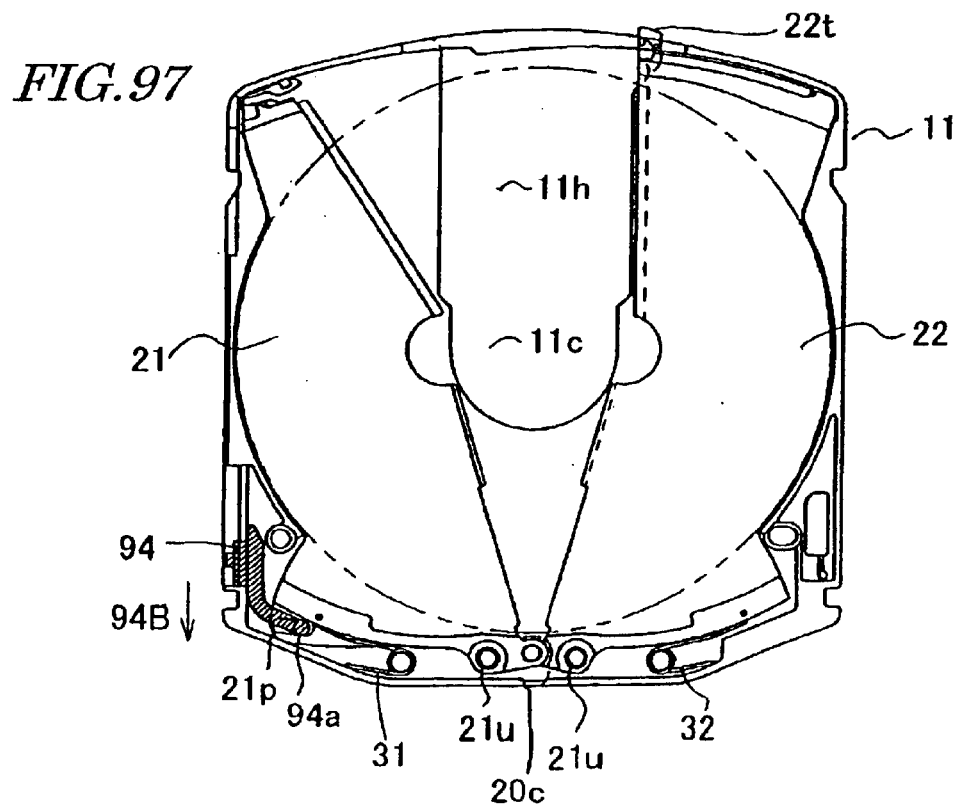
FIG. 97 is a schematic plan view illustrating a state of the disc cartridge shown in FIG. 94 in which its shutters are opened.

FIGS. 96 and 97 illustrate two states of the disc cartridge 317 in which the shutters 21 and 22 thereof are closed and opened, respectively. As already described for the thirteenth and sixteenth embodiments, the shutters 21 and 22 can be opened or closed by sliding the first opening/closing portion 22t in the direction indicated by the arrow 22w.

The shutters 21 and 22 may also be opened or closed by using the second opening/closing portion 94 in the following manner. First, the locking mechanism 20k is unlocked as shown in FIG. 96. Next, the second opening/closing portion 94 is slid in the direction indicated by the arrow 94B. As a result of this operation, a force is applied to the second opening/closing portion 94 in such a direction as to move the protrusion 94a of the second opening/closing portion 94 in the direction indicated by the arrow 94B. Thus, the shutter 21 is rotated around the rotation hole 21u and opened. Since the movement of the shutter 21 is transmitted to the shutter 22 by way of the interlocking mechanism 20c, these two shutters 21 and 22 expose the head and chucking openings 11h and 11c cooperatively. As in the sixteenth embodiment, the shutters 21 and 22 can also be closed by sliding the second opening/closing portion 94 in the direction opposite to the direction 94B, and the shutter springs 31 and 32 also apply an elastic force to the shutters 21 and 22 in the same direction.

Just like the disc cartridge of the sixteenth embodiment, no matter whether the disc drive used is compatible with only a disc cartridge including a shutter opening/closing portion on a side surface that extends perpendicularly to the disc cartridge inserting direction or only a disc cartridge including a shutter opening/closing portion on a side surface that extends parallelly to the disc cartridge inserting direction, the disc drive can always write or read a signal on/from the disc in the disc cartridge of this embodiment.

Also, as shown in FIGS. 96 and 97, the direction 94B in which the second opening/closing portion 94 is slid to open the shutters 21 and 22 is antiparallel to the disc cartridge inserting direction 1A. Accordingly, if a protrusion that engages with the second opening/closing portion 94 is provided for a disc drive, that protrusion engages with the second opening/closing portion 94 and opens the shutters 21 and 22 of the disc cartridge while the disc cartridge of this embodiment is going to be inserted into the disc drive. Thus, a simplified shutter opening/closing mechanism may be provided for the disc drive.

Embodiment 18

Hereinafter, a disc cartridge 318 according to an eighteenth embodiment of the present invention will be described with reference to FIGS. 98 through 101. In the disc cartridge 318 of this embodiment, the same member as the counterpart of the disc cartridge 316 of the sixteenth embodiment is identified by the same reference numeral.

Figure 98:
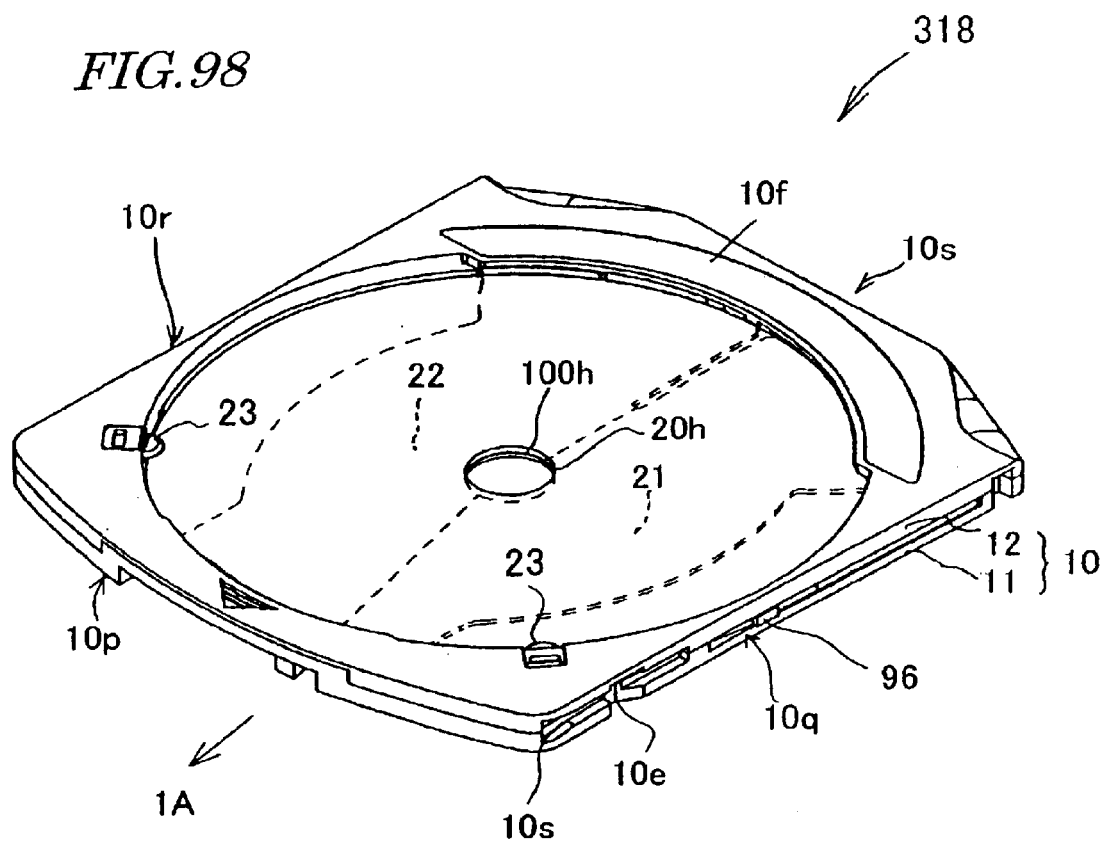
FIG. 98 is a perspective view illustrating an overall configuration for a disc cartridge according to an eighteenth embodiment of the present invention.

As shown in FIG. 98, the disc cartridge 318 of this embodiment includes a second opening/closing portion 96 on its second side surface 10q instead of the second opening/closing portion 93 of the disc cartridge 316 of the sixteenth embodiment.

Figure 99:
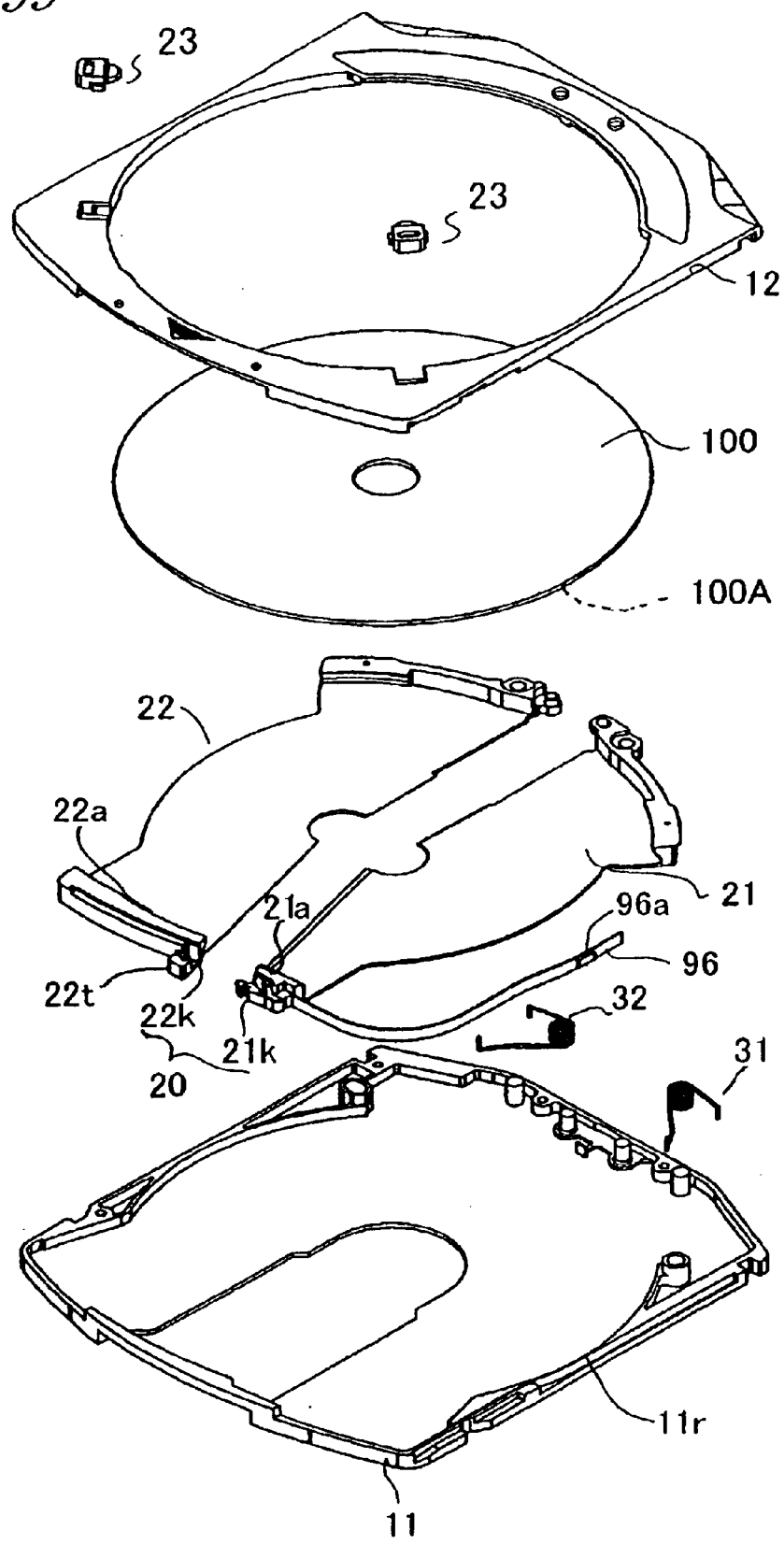
FIG. 99 is an exploded perspective view illustrating an exploded state of the disc cartridge shown in FIG. 98.

As can be seen from FIG. 99, the second opening/closing portion 96 is a belt member that is connected to the disc holding portion 21a of the shutter 21. This belt member has a protrusion 96a at one end thereof. And the protrusion 96a can slide along the opening 11r on the side surface of the cartridge lower shell 11. Alternatively, the second opening/closing portion 96 may form an integral part of the shutter 21.

Figure 100:
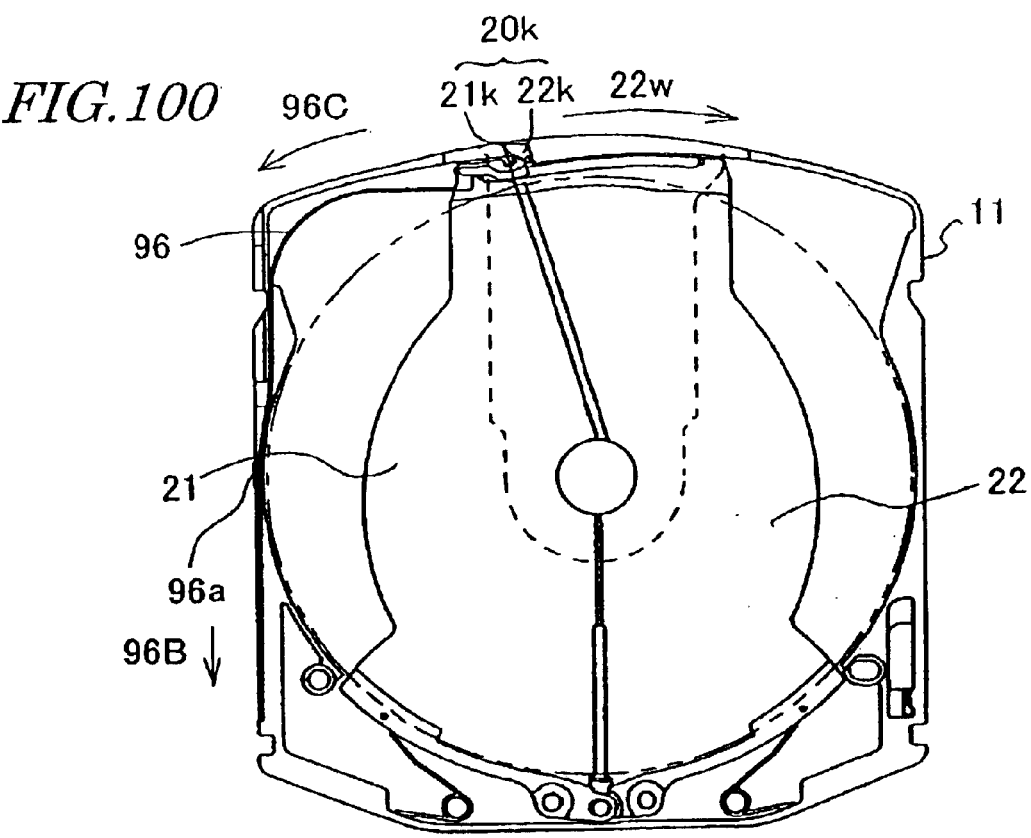
FIG. 100 is a schematic plan view illustrating a state of the disc cartridge shown in FIG. 98 in which its shutters are closed.
Figure 101:
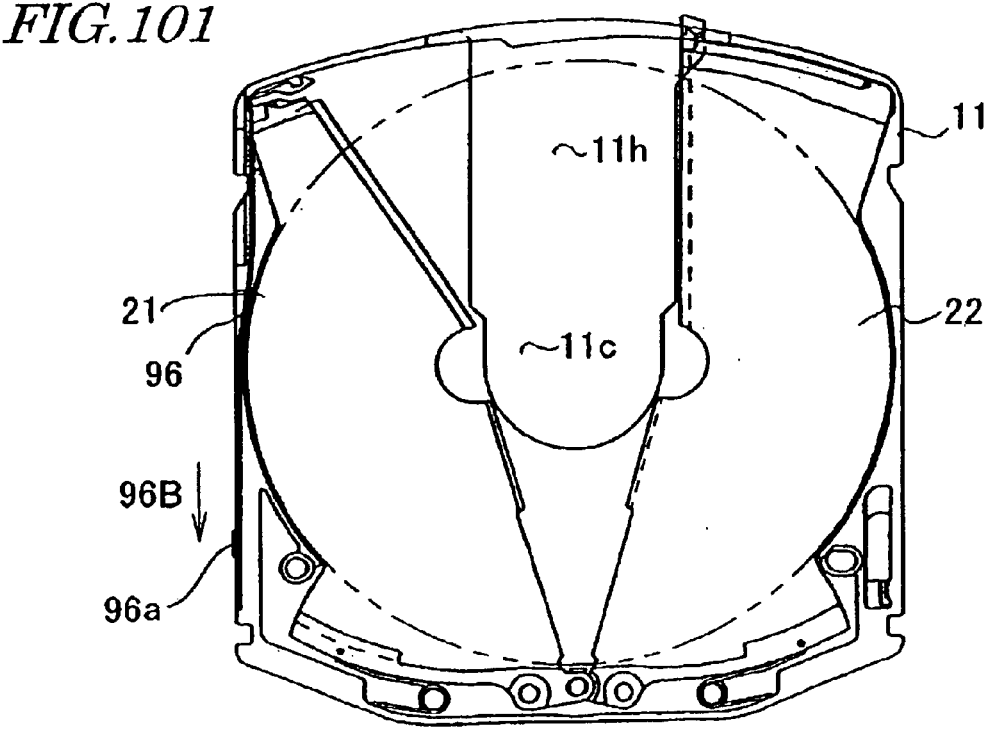
FIG. 101 is a schematic plan view illustrating a state of the disc cartridge shown in FIG. 98 in which its shutters are opened.

FIGS. 100 and 101 illustrate two states of the disc cartridge 318 in which the shutters 21 and 22 thereof are closed and opened, respectively. As already described for the sixteenth and seventeenth embodiments, the shutters 21 and 22 can be opened or closed by sliding the first opening/closing portion 22t in the direction indicated by the arrow 22w.

The shutters 21 and 22 may also be opened or closed by using the second opening/closing portion 96 in the following manner. First, the locking mechanism 20k is unlocked as shown in FIG. 100. Next, the protrusion 96a of the second opening/closing portion 96 is slid in the direction indicated by the arrow 96B. As a result of this operation, a force is applied to the shutter 21 in such a direction as to rotate the shutter 21 on the rotation hole 21u and pull the end of the shutter 21 to the direction indicated by the arrow 96C. Since the movement of the shutter 21 is transmitted to the shutter 22 by way of the interlocking mechanism 20c, these two shutters 21 and 22 expose the head and chucking openings 11h and 11c cooperatively. To close the shutters 21 and 22, the opposite operation is performed.

Just like the disc cartridge of the sixteenth embodiment described above, no matter whether the disc drive used is compatible with only a disc cartridge including a shutter opening/closing portion on a side surface that extends perpendicularly to the disc cartridge inserting direction or only a disc cartridge including a shutter opening/closing portion on a side surface that extends parallelly to the disc cartridge inserting direction, the disc drive can always write or read a signal on/from the disc cartridge of this embodiment.

If the second opening/closing portion 96 forms an integral part of the shutter 21, the number of members that make up the disc cartridge can be reduced. As a result, the manufacturing cost of the disc cartridge can be reduced or the manufacturing process thereof can be simplified.

In the sixteenth through eighteenth embodiments described above, the second opening/closing portion is provided on the left-hand side with respect to the disc cartridge inserting direction. However, the location of the second opening/closing portion is not limited to the left-hand side described above. Alternatively, the second opening/closing portion may be provided on the right-hand side 10r with respect to the disc inserting direction as shown in FIG. 88. As another alternative, the second opening/closing portion may also be provided on the back surface 10t of the disc cartridge as shown in FIG. 88. In that case, the belt-shaped second opening/closing portion 96 of this eighteenth embodiment is preferably used because the disc cartridge can have the second opening/closing portion on its back surface without changing its details so much.

Embodiment 19

Hereinafter, a disc cartridge 319 according to a nineteenth embodiment of the present invention will be described with reference to FIGS. 102 and 103. In the disc cartridge 319 of this embodiment, the same member as the counterpart of the disc cartridge 313 of the thirteenth embodiment is identified by the same reference numeral.

The disc cartridge 319 of this embodiment is characterized by providing rotation stopper members 97 for the disc holding portions 21b, 22a and 22b and concave portions 89 for the shutters 21 and 22, respectively. The concave portions 89 are used to ultrasonic weld a nonwoven fabric to the shutters 21 and 22.

More specifically, the disc holding portions 21b, 22a and 22b include holes 21q, 22r and 22q, in which the rotation stopper members 97 are embedded. As shown in FIG. 103, the rotation stopper member 97 partially protrudes from the slope 21b', (22a' or 22b') of the disc holding portion 21b, (22a or 22b) and contacts with the outer edge of the disc 100 while the disc 100 is held by the disc holding portions 21a, 21b, 22a and 22b. The rotation stopper members 97 are preferably made of a material that has some elasticity and a large coefficient of friction. For example, rotation stopper members 97 made of rubber are preferably used.

It should be noted that at least one of the disc holding portions 21a, 21b, 22a and 22b should be provided with the rotation stopper member 97 to stop the rotation effectively. However, to prevent the unintentional rotation of the disc 100 with more certainty, the three rotation stopper members 97 are preferably provided as shown in FIG. 102.

In this structure, while the disc 100 is held by the disc holding portions 21a, 21b, 22a and 22b, the rotation stopper members 97 that are in tight contact with the disc 100 do not allow the operator to rotate the disc 100 so easily. Accordingly, even if the operator tries to rotate the disc 100 intentionally while pressing the disc 100 against the shutters 21 and 22, the disc 100 will not rotate. Thus, even if relatively stiff dust has adhered to the nonwoven fabric provided for the shutters 21 and 22, the disc will not get scratched by the operator's operation such as that described above.

In addition, by providing the rotation stopper members 97, it is also possible to prevent the disc 100 from moving inconstantly inside the disc holding portions.

Figure 102:
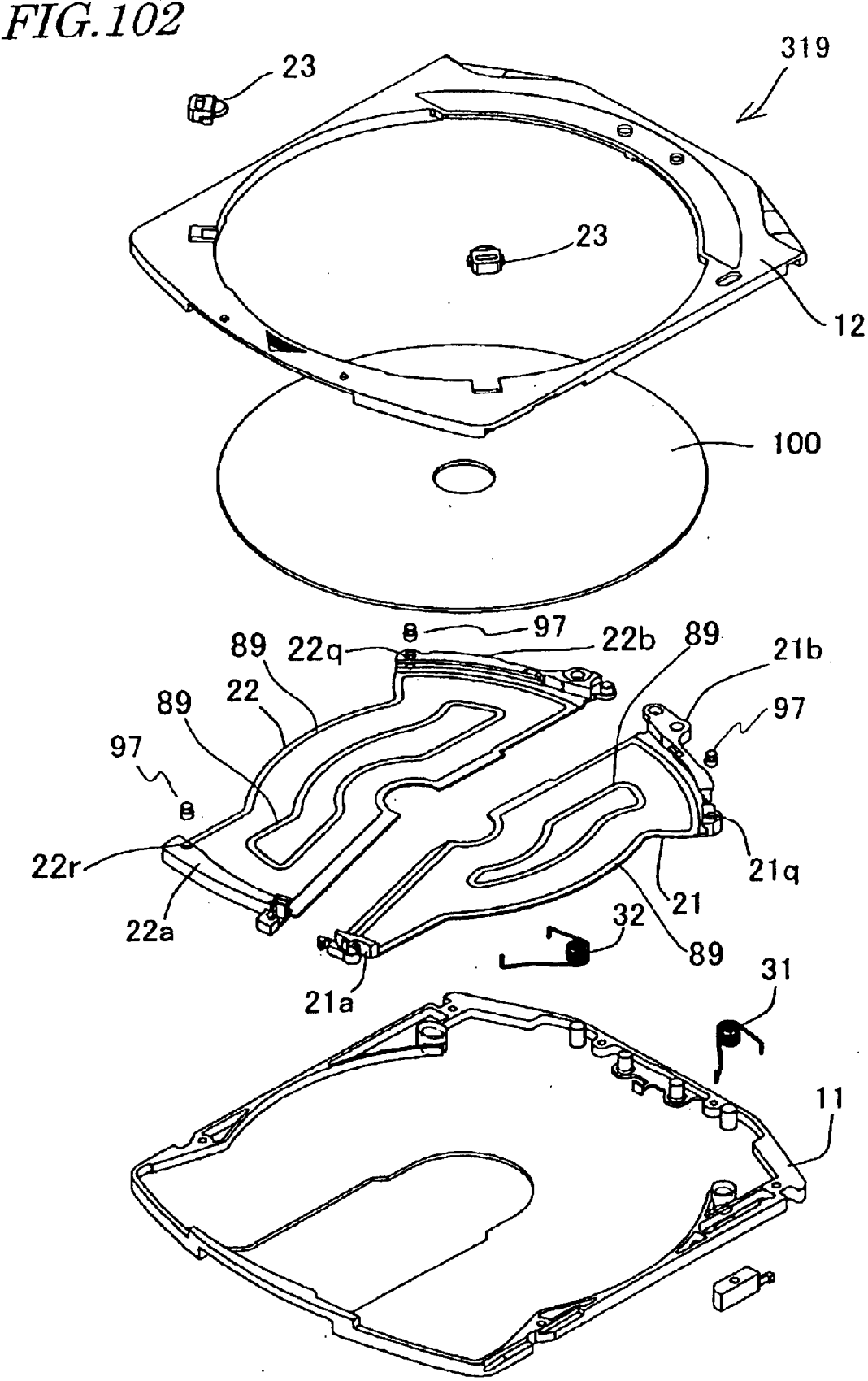
FIG. 102 is an exploded perspective view illustrating an exploded state of a disc cartridge according to a nineteenth embodiment of the present invention.
Figure 103:
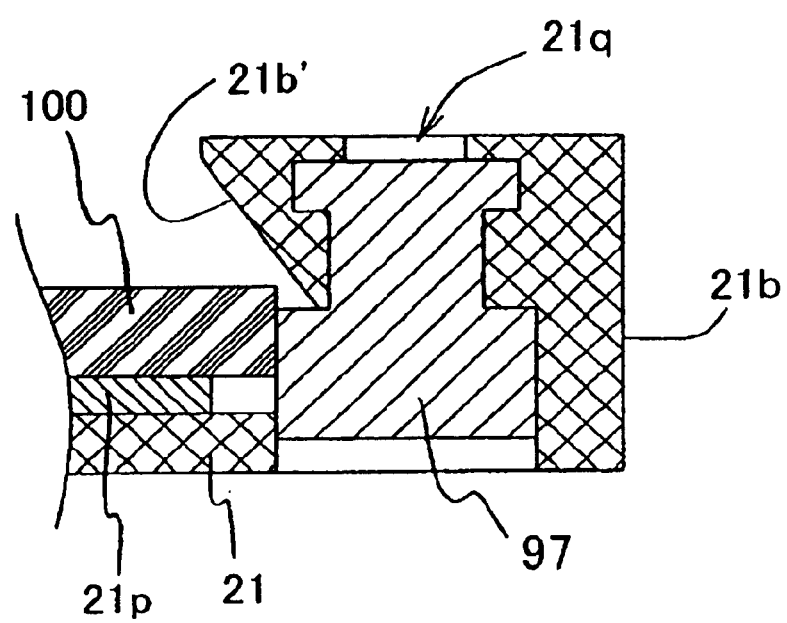
FIG. 103 is an enlarged cross-sectional view illustrating a disc holding portion and its surrounding members of the disc cartridge shown in FIG. 102.

As shown in FIG. 102, the shutters 21 and 22 include the concave portions 89, which are used to ultrasonic weld a nonwoven fabric to those portions of the shutters 21 and 22 that will contact with the signal recording side of the disc 10. In FIG. 102, the concave portions 89 are formed so as to surround the outer periphery of those portions of the shutters 21 and 22 that will contact with the signal recording side. The concave portions 89 are also formed inside the concave portions 89 that surround the outer periphery. However, the regions where the concave portions 89 are provided are not limited to those illustrated in FIG. 102 as long as the nonwoven fabric can be adhered to the shutters 21 and 22 just as intended. At these concave portions 89, the nonwoven fabric is ultrasonic welded to the shutters 21 and 22. The nonwoven fabric might be partially cured or the resin material of the shutters 21 and 22 might partially protrude from the nonwoven fabric during the ultrasonic welding process. Even so, when these concave portions 89 are provided, those cured or protruding portions are received by the concave portions 89 and do not contact with the disc. Thus, the disc does not get scratched. When a nonwoven fabric is provided, these concave portions 89 are also preferably formed on the shutters in any of the first through eighteenth embodiments described above.

In the first through nineteenth embodiments described above, a nonwoven fabric is ultrasonic welded or adhered to the shutters. However, if the disc has some anti-scratching structure (e.g., if the signal recording side of the disc is covered with a stiff hard coating), then the nonwoven fabric does not have to be attached thereto, but the shutters may contact with the disc directly. Also, not the entire surface of the shutters has to be in plane contact with the signal recording side of the disc, but the shutters may have such a structure that at least a portion of the shutters contacts with the signal recording side of the disc. That is to say, not the entire surface but just a portion of the surface of the shutters may be in plane contact with the disc. In that case, some anti-scratching structure (e.g., a nonwoven fabric) may be provided for only that portion being in plane contact with the disc.

In the first through nineteenth embodiments described above, the disc 100 to be stored in the disc cartridge has just one signal recording side. However, a single-sided disc like this is used for illustrative purposes only. This is because the disc cartridge of the present invention has such a structure as to expose one side of the disc and because a single-sided disc is best suited to a structure of that type. Thus, even a disc having two signal recording sides may be appropriately stored in the disc cartridge of the present invention and may be loaded into a disc drive to write or read a signal thereon/therefrom. It should be noted, however, that where a double-sided disc is stored and housed in the disc cartridge of the present invention, dust may be deposited on the exposed one of the two signal recording sides. Accordingly, in that case, some mechanism for preventing the unwanted dust deposition should preferably be provided.

Also, in the first through nineteenth embodiments described above, the size of the disc 100 is not particularly specified. However, the present invention may be implemented as a disc cartridge for accommodating a disc having a size of 12 cm or any of various other sizes.

Furthermore, in the first through nineteenth embodiments described above, the disc cartridge is illustrated as having an outer dimension that is slightly greater than the size of the disc. However, the size relationship between the disc and the disc cartridge is not limited to the illustrated one. For example, even when the disc cartridge has an outer dimension that is large enough to store a 12 cm disc therein, the disc storage portion and the disc holding portions of the disc cartridge may have their sizes and structures defined in such a manner as to store an 8 cm disc. Such a disc cartridge may be used as an adapter for getting write and read operations performed on an 8 cm disc by a disc drive for writing or reading a signal on/from a 12 cm disc.

The various features as described for the first through nineteenth embodiments may be combined appropriately. For example, the rotation stopper members as described for the nineteenth embodiment may be provided for the disc cartridge of the sixteenth embodiment. Also, the recesses for use to collect dust therein as described for the fifteenth embodiment may be provided for the disc cartridge of the sixteenth embodiment. As can be seen, the first through nineteenth embodiments may be combined in numerous other ways and not all of those possible combinations of embodiments have been described herein. However, it is quite possible for those skilled in the art to carry out those various possible combinations of embodiments by reference to the description of the present application. Thus, it is intended that all of those various possible combinations of embodiments fall within the scope of the present invention.

The disc cartridge of the present invention can be used particularly effectively to store a disc having only one recording side. The cartridge body thereof has such a structure as to cover only the signal recording side of the disc and expose the other side thereof. Thus, the cartridge can have a reduced thickness. Also, the shutters thereof are formed in such a shape as to cover just one side of the disc cartridge. Accordingly, the shutters can have a simplified structure and can be formed at a lower cost. In addition, the disc holding portions or disk holding members thereof hold a disc thereon by pressing the disc against the shutters or the cartridge body. Thus, the disc will not move inconstantly inside the cartridge body and no dust will be deposited on the signal recording side of the disc. Furthermore, since the label side of the disc is displayed inside the disc window, the disc cartridge can also have a good design.

Thus, the present invention provides a thinner and highly dustproof disc cartridge of a good design that is applicable for use in various types of disc drives.

What is claimed is:

1. A disc cartridge comprising:
   a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed through the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;
   a shutter, which is supported to, and movable with respect to, the cartridge body between the disc and the bottom of the disc storage portion so as to expose or cover the chucking opening and the head opening;
   a disc holding portion provided at a portion of the shutter for fixing the disc onto the shutter or the cartridge body synchronously with a movement of the shutter, by pressing the disc toward the bottom of the disc storage portion when the shutter covers the chucking opening and the head opening.

2. The disc cartridge of claim 1, wherein the disk holding portion has a downwardly tapered slope, and by bringing the slope into contact with an outer edge of the disc, the disk holding portion grips the disc thereon so as to fix the disc and holds the disc so as to press the disc toward the bottom of the disc storage portion.

3. The disc cartridge of claim 2, wherein the shutter includes a disc holding portion for fixing the disc onto the shutter when the shutter covers the chucking opening and the head opening synchronously with opening or closing of the shutter.

4. The disc cartridge of claim 2, wherein the disc cartridge comprises multiple disk holding portions, which include the disk holding portion and which are disposed on the shutter so as to hold the outer periphery and its surrounding portion of the disc.

5. The disc cartridge of claim 2, wherein the disc cartridge comprises a plurality of shutters, including the shutter, the plurality of shutters cooperating with each other to expose or cover the chucking opening and the head opening.

6. The disc cartridge of claim 5, wherein the disc cartridge comprises multiple disk holding portions, which include the disk holding portion and which are disposed on the shutter so as to hold the outer periphery and its surrounding portion of the disc.

7. The disc cartridge of claim 2, wherein the disc is brought into plane contact with the shutter by the disk holding portion.

8. The disc cartridge of claim 7, wherein the disc cartridge includes a protective layer for preventing the disc from getting scratched on a portion of the shutter that contacts with the second side of the disc.

9. The disc cartridge of claim 8, wherein the protective layer is selected from the group consisting of an anti-scratching nonwoven fabric, a dustproof nonwoven fabric, an anti-scratching coating layer and a dustproof coating layer.

10. The disc cartridge of claim 9, wherein the dirt of the disc is removed by the opening or closing operation that is performed by the shutter to expose or cover the chucking opening and the head opening.

11. The disc cartridge of claim 8, wherein the dirt of the disc is removed by rotating the disc while the disc is in plane contact with the shutter.

12. The disc cartridge of claim 1, further comprising an erroneous insertion preventing mechanism for the disc cartridge.

13. The disc cartridge of claim 12, wherein the erroneous insertion preventing mechanism includes convex portions or concave portions that are provided on outer side surfaces of the cartridge body so as to be asymmetrically disposed in a direction in which the disc cartridge is inserted into an external apparatus.

* * * * *